(12) United States Patent
Tsyganskiy et al.

(10) Patent No.: US 7,941,463 B2
(45) Date of Patent: May 10, 2011

(54) METHODS OF TRANSFORMING APPLICATION LAYER STRUCTURE AS OBJECTS

(75) Inventors: Igor Tsyganskiy, Los Galos, CA (US); Vitaliy Stulski, San Matso, CA (US); Dmitri Liakh, Foster City, CA (US); Eugene Satsuta, Saratoga, CA (US); Luiz Scheinkman, Sunnyvale, CA (US)

(73) Assignee: SAP AG, Walldorf (DE)

( * ) Notice: Subject to any disclaimer, the term of this patent is extended or adjusted under 35 U.S.C. 154(b) by 141 days.

(21) Appl. No.: 12/396,870

(22) Filed: Mar. 3, 2009

(65) Prior Publication Data

US 2009/0172633 A1    Jul. 2, 2009

Related U.S. Application Data

(63) Continuation of application No. 11/203,225, filed on Aug. 15, 2005, now abandoned, which is a continuation-in-part of application No. 11/111,794, filed on Apr. 22, 2005.

(51) Int. Cl.
  *G06F 7/00* (2006.01)
(52) U.S. Cl. ......... 707/803; 707/796; 707/802; 707/810
(58) Field of Classification Search .................. 707/626, 707/796, 802, 803, 810; 717/121; 726/2
See application file for complete search history.

(56) References Cited

U.S. PATENT DOCUMENTS

| | | |
|---|---|---|
| 4,559,614 A | 12/1985 | Peek et al. |
| 5,481,711 A | 1/1996 | Sotani |
| 5,499,371 A | 3/1996 | Henninger et al. |
| 5,542,078 A | 7/1996 | Martel et al. |
| 5,577,244 A | 11/1996 | Killebrew et al. |
| 5,596,746 A | 1/1997 | Shen et al. |
| 5,659,723 A | 8/1997 | Dimitrios et al. |
| 5,812,850 A | 9/1998 | Wimble |
| 5,872,970 A | 2/1999 | Pickett et al. |
| 5,917,730 A | 6/1999 | Rittie et al. |
| 5,974,568 A | 10/1999 | McQueen |
| 5,983,020 A | 11/1999 | Sweeney et al. |
| 6,023,578 A | 2/2000 | Birsan et al. |
| 6,031,993 A | 2/2000 | Andrews |

(Continued)

FOREIGN PATENT DOCUMENTS

EP    726537 A1    8/1996

OTHER PUBLICATIONS

"Eclipse Platform Technical Overview," IBM Corp. and the Eclipse Foundation, Dec. 2005 (23 pages).

Fahrner, Christian, "A survey of database design transformations based on the Entity Relationship model," Data & Knowledge Engineering 15 (1995) pg. 213-250.

(Continued)

*Primary Examiner* — Thuy N Pardo
(74) *Attorney, Agent, or Firm* — Finnegan, Henderson, Farabow, Garrett & Dunner, LLP

(57) ABSTRACT

Embodiments consistent with the invention transform business application logic entities or structures into OOP structures that represent the data, relationships, and operations of the business application structures. The business application structures are transformed from the application level, including consideration of the business application logic and relationships. In one embodiment, transformation is done using a set of automated transformation rules. The resulting OOP structure model of the business application structure may be used with OOP tools to analyze, maintain, debug, modify, and revise the business application structure, and to create new structures for the business application.

3 Claims, 61 Drawing Sheets

U.S. PATENT DOCUMENTS

| Patent No. | Date | Inventor(s) | Ref |
|---|---|---|---|
| 6,115,646 A | 9/2000 | Fiszman et al. | |
| 6,128,771 A | 10/2000 | Tock et al. | |
| 6,163,781 A | 12/2000 | Wess, Jr. | |
| 6,269,475 B1 | 7/2001 | Farrell et al. | |
| 6,298,354 B1 | 10/2001 | Saulpaugh et al. | |
| 6,339,838 B1* | 1/2002 | Weinman, Jr. | 717/104 |
| 6,360,223 B1* | 3/2002 | Ng et al. | 707/626 |
| 6,374,252 B1 | 4/2002 | Althoff et al. | |
| 6,374,256 B1 | 4/2002 | Ng et al. | |
| 6,430,562 B1 | 8/2002 | Kardos et al. | |
| 6,467,079 B1 | 10/2002 | Ettritch et al. | |
| 6,502,098 B2 | 12/2002 | Lau | |
| 6,542,937 B1 | 4/2003 | Kask et al. | |
| 6,591,272 B1 | 7/2003 | Williams | |
| 6,625,651 B1 | 9/2003 | Swartz et al. | |
| 6,633,878 B1* | 10/2003 | Underwood | 707/626 |
| 6,643,664 B1 | 11/2003 | Yaung | |
| 6,668,370 B1 | 12/2003 | Harmon et al. | |
| 6,681,383 B1 | 1/2004 | Pastor et al. | |
| 6,754,670 B1 | 6/2004 | Lindsay et al. | |
| 6,769,095 B1 | 7/2004 | Brassard et al. | |
| 6,772,172 B2 | 8/2004 | Leong et al. | |
| 6,785,882 B1 | 8/2004 | Goiffon et al. | |
| 6,862,711 B1 | 3/2005 | Bahrs et al. | |
| 6,976,144 B1* | 12/2005 | Trefler et al. | 711/170 |
| 6,990,656 B2 | 1/2006 | Ersek et al. | |
| 7,003,781 B1 | 2/2006 | Blackwell et al. | |
| 7,007,029 B1 | 2/2006 | Chen | |
| 7,047,524 B1 | 5/2006 | Braddock, Jr. | |
| 7,072,913 B2 | 7/2006 | Jans et al. | |
| 7,072,934 B2 | 7/2006 | Helgeson | |
| 7,076,766 B2* | 7/2006 | Wirts et al. | 717/121 |
| 7,099,887 B2 | 8/2006 | Hoth et al. | |
| 7,100,195 B1* | 8/2006 | Underwood | 726/2 |
| 7,120,896 B2 | 10/2006 | Budhiraja et al. | |
| 7,124,134 B2* | 10/2006 | Buzzeo et al. | 707/796 |
| 7,194,475 B2 | 3/2007 | DelMonaco et al. | |
| 7,194,485 B2 | 3/2007 | Kaipa et al. | |
| 7,231,400 B2 | 6/2007 | Cameron et al. | |
| 7,296,070 B2 | 11/2007 | Sweeney et al. | |
| 7,334,197 B2 | 2/2008 | Robertson et al. | |
| 7,434,229 B2 | 10/2008 | Barinov et al. | |
| 7,480,893 B2 | 1/2009 | Berenbach et al. | |
| 7,536,406 B2 | 5/2009 | Haselden et al. | |
| 7,562,351 B2 | 7/2009 | Haas et al. | |
| 7,680,818 B1 | 3/2010 | Fan et al. | |
| 2002/0023261 A1* | 2/2002 | Goodwin et al. | 717/146 |
| 2003/0023950 A1 | 1/2003 | Ma et al. | |
| 2003/0034989 A1 | 2/2003 | Kondo | |
| 2003/0061266 A1 | 3/2003 | Ouchi | |
| 2003/0084127 A1 | 5/2003 | Budhiraja et al. | |
| 2003/0110446 A1 | 6/2003 | Nemer | |
| 2004/0003369 A1 | 1/2004 | Gonos | |
| 2004/0006506 A1 | 1/2004 | Hoang | |
| 2004/0025171 A1 | 2/2004 | Barinov et al. | |
| 2004/0030716 A1 | 2/2004 | Hoth et al. | |
| 2004/0111702 A1 | 6/2004 | Chan | |
| 2004/0168124 A1 | 8/2004 | Beisiegel et al. | |
| 2004/0225678 A1* | 11/2004 | Buzzeo et al. | 707/999.103 |
| 2005/0015377 A1 | 1/2005 | Wan | |
| 2005/0027732 A1 | 2/2005 | Kalima | |
| 2005/0050477 A1 | 3/2005 | Robertson et al. | |
| 2005/0060650 A1 | 3/2005 | Ryan et al. | |
| 2005/0076328 A1 | 4/2005 | Berenbach et al. | |
| 2005/0165822 A1 | 7/2005 | Yeung et al. | |
| 2005/0234916 A1 | 10/2005 | Bergman et al. | |
| 2005/0234976 A1 | 10/2005 | Oara et al. | |
| 2005/0262107 A1 | 11/2005 | Bergstraesser et al. | |
| 2005/0262378 A1 | 11/2005 | Sleeman et al. | |
| 2005/0278358 A1 | 12/2005 | Doughan | |
| 2005/0289167 A1 | 12/2005 | Haselden et al. | |
| 2006/0009869 A1 | 1/2006 | Sasaki et al. | |
| 2006/0010106 A1 | 1/2006 | Gerea et al. | |
| 2006/0106626 A1 | 5/2006 | Jeng et al. | |
| 2006/0149790 A1 | 7/2006 | Rusch | |
| 2006/0168565 A1 | 7/2006 | Gamma et al. | |
| 2006/0240396 A1* | 10/2006 | Foo et al. | 434/350 |
| 2006/0241999 A1 | 10/2006 | Tsyganskiy et al. | |
| 2006/0242170 A1 | 10/2006 | Tsyganskiy et al. | |
| 2006/0242171 A1 | 10/2006 | Tsyganskiy et al. | |
| 2006/0242172 A1 | 10/2006 | Tsyganskiy et al. | |
| 2006/0242173 A1 | 10/2006 | Tsyganskiy et al. | |
| 2006/0242174 A1 | 10/2006 | Tsyganskiy et al. | |
| 2006/0242175 A1 | 10/2006 | Tsyganskiy et al. | |
| 2006/0242176 A1 | 10/2006 | Tsyganskiy et al. | |
| 2006/0242177 A1 | 10/2006 | Tsyganskiy et al. | |
| 2006/0242188 A1 | 10/2006 | Tsyganskiy et al. | |
| 2006/0242196 A1 | 10/2006 | Tsyganskiy et al. | |
| 2006/0242207 A1 | 10/2006 | Tsyganskiy et al. | |
| 2006/0271911 A1 | 11/2006 | Palapudi et al. | |
| 2006/0282458 A1 | 12/2006 | Tsyganskiy et al. | |
| 2006/0293934 A1 | 12/2006 | Tsyganskiy et al. | |
| 2006/0293935 A1 | 12/2006 | Tsyganskiy et al. | |
| 2006/0293940 A1 | 12/2006 | Tsyganskiy et al. | |
| 2006/0294158 A1 | 12/2006 | Tsyganskiy et al. | |
| 2007/0061732 A1 | 3/2007 | Bobbin et al. | |
| 2007/0214173 A1 | 9/2007 | Ohashi et al. | |

OTHER PUBLICATIONS

Shareware connection, "Software Listing: Schema Compare," Apr. 26, 2008 (8 pp.) <http://www.sharewareconnection.com/titles/schema-compare.htm>.

SQLDBCompare, "The powerful database schema comparison tool for SQL Server databases!," Best SoftTool, Apr. 1, 2004 (4 pages) <http://web.archive.org/web/20040401202050/http://www.bestsofttool.com/SQLDBCompare/SDC_Introduction.aspx>.

Stulski, Vitaliy, "Diagnosing Application Failures in WebLogic," WebLogic Developer's Journal, Sep. 10, 2003 (10 pages) <http://weblogic.sys-con.com/read/42977.htm>.

Tichelaar, Sander, "Modeling Object Oriented Software for Reverse Engineering and Refactoring," Inauguraldissertation der Philosophisch-naturwissenschaftlichen fakultat der Universitat Bern; Dec. 2001 (198 pages).

De Lucia, A. et al., "Migrating Legacy Systems Towards Object Oriented Platforms," IEEE, 1997, pp. 122-129.

Ducasse, Stephane, "Logic and Trace-based Object-Oriented Application Testing," WOOR 2004, pp. 1-11.

Sinha, Atish P. et al., "An empirical investigation of entity-based and object-oriented data modeling" a development life cycle approach, ACM, Jan. 1999, pp. 229-244.

Tarau, Paul, "Fluents: A Refactoring of Prolog for Uniform Reflection and Interoperation with External Objects," 2000, Springer, pp. 1225-1239.

Tokuda, Lance, et al., "Evolving Object-Oriented Designs With Refactorings," Kluwer Academic Publishers, 2001, pp. 89-120.

Ajila, S., "Software Maintenance: An Approach to Impact Analysis of Objects Change," Software—Practice and Experience, vol. 25, No. 10, Oct. 1995, pp. 1155-1181.

Bishop, L., "Incremental Impact Analysis for Object-Oriented Software," M.S. Thesis, Iowa State University, 2004. (69 pages).

Daou, B. et al., "Regression Testing of Database Applications," Proceedings of the 2001 ACM Symposium on Applied Computing (SAC 2001), 2001, pp. 285-290.

de Boer, F.S. et al., "Change Impact Analysis of Enterprise Architectures," Proceedings of the 2005 International Conference on Information Reuse and Integration (IRI-2005), Aug. 2005. (5 pages).

Deruelle, L. et al., "A Change Impact Analysis Approach for CORBA-Based Federated Databases," Database and Expert Systems Applications (DEXA), LNCS vol. 1873, 2000, pp. 949-958.

Deruelle, L. et al., "Local and Federated Database Schemas Evolution—An Impact Propagation Model," Database and Expert Systems Applications (DEXA), LNCS vol. 1677, 1999, pp. 902-911.

Ibrahim, S. et al., "Integrating Software Traceability for Change Impact Analysis," International Arab Journal of Information Technology, vol. 2, No. 4, Oct. 2005, pp. 301-308.

Ren, X. et al., "Chianti: A Change Impact Analysis Tool for Java Programs," Proceedings of the 27th International Conference on Software Engineering (ICSE'05), May 15-21, 2005, pp. 664-665.

Ryder, B.G. et al, "Change Impact Analysis for Object-Oriented Programs," Proceedings of the 2001 ACM SIGPLAN-SIGSOFT Workshop on Program Analysis for Software Tools and Engineering (PASTE'01), Jun. 18-19, 2001, pp. 46-53.

* cited by examiner

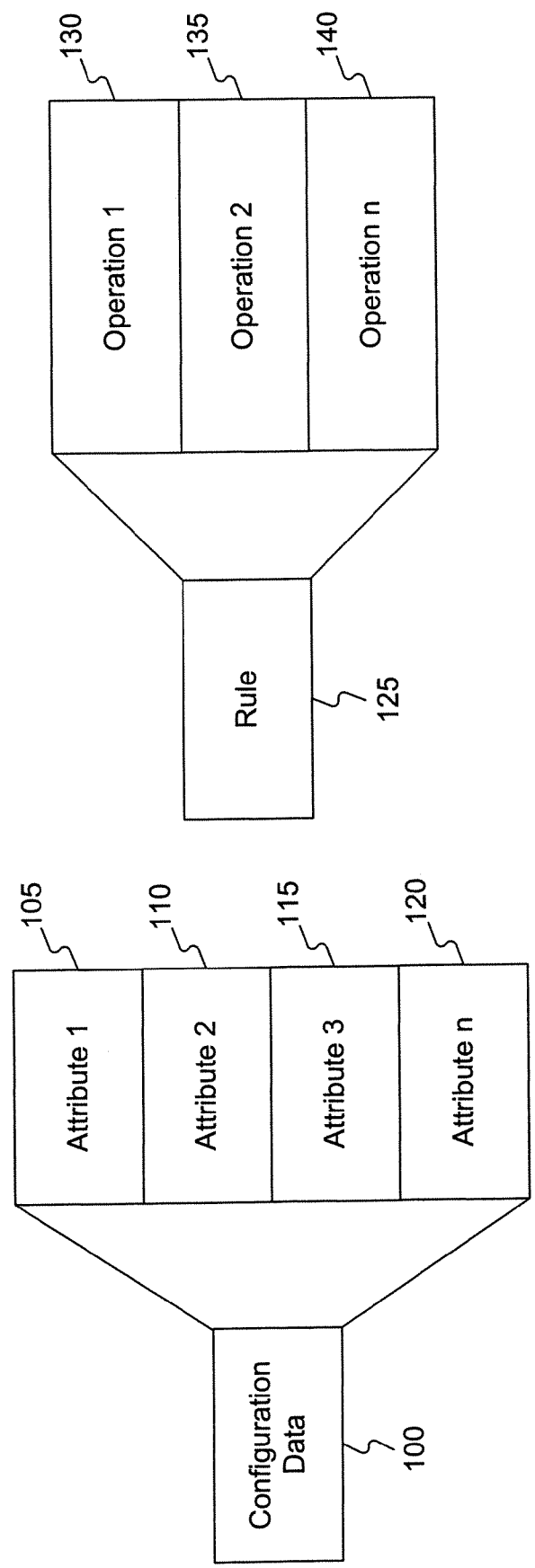

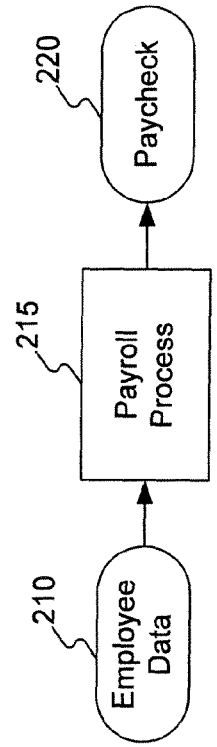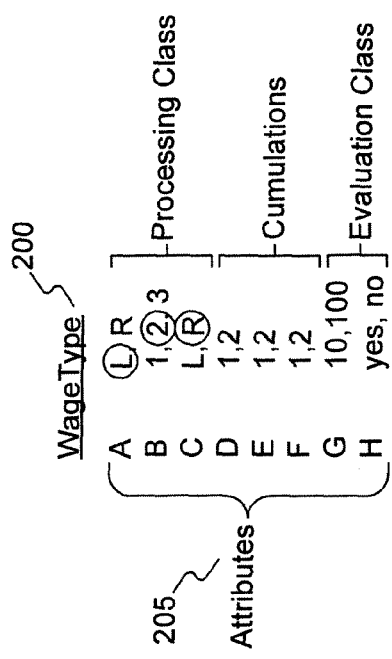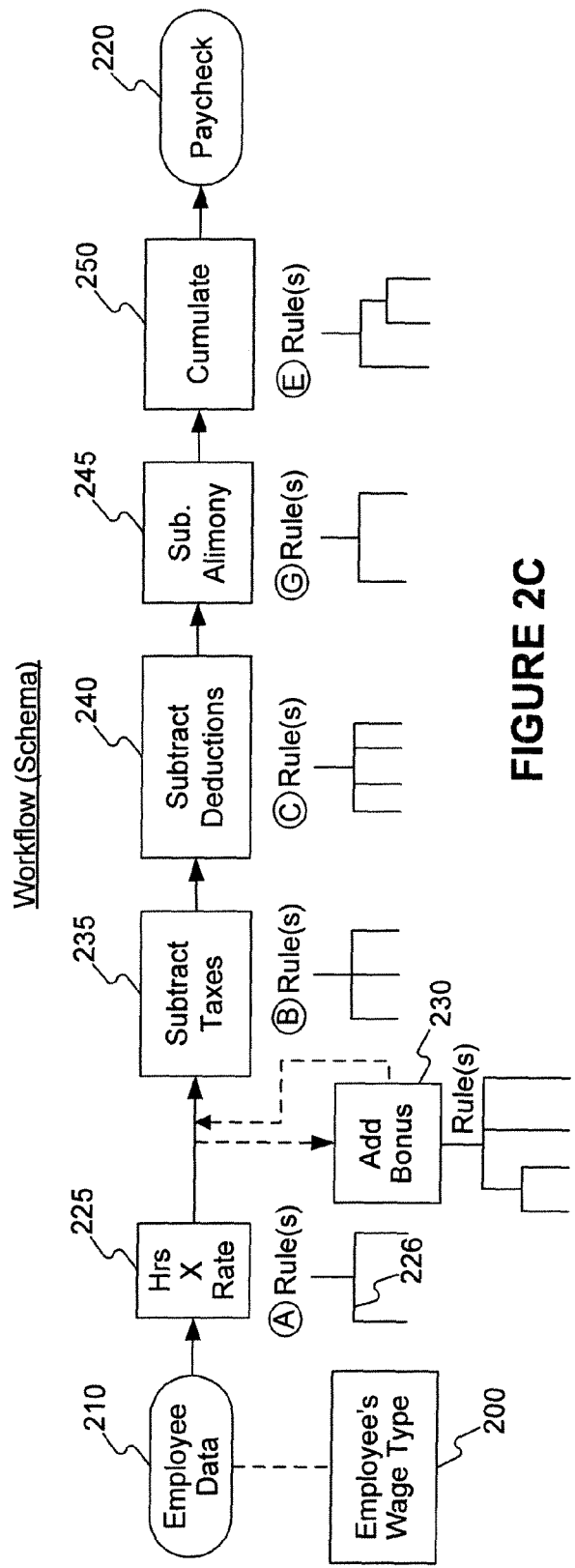

Business Application
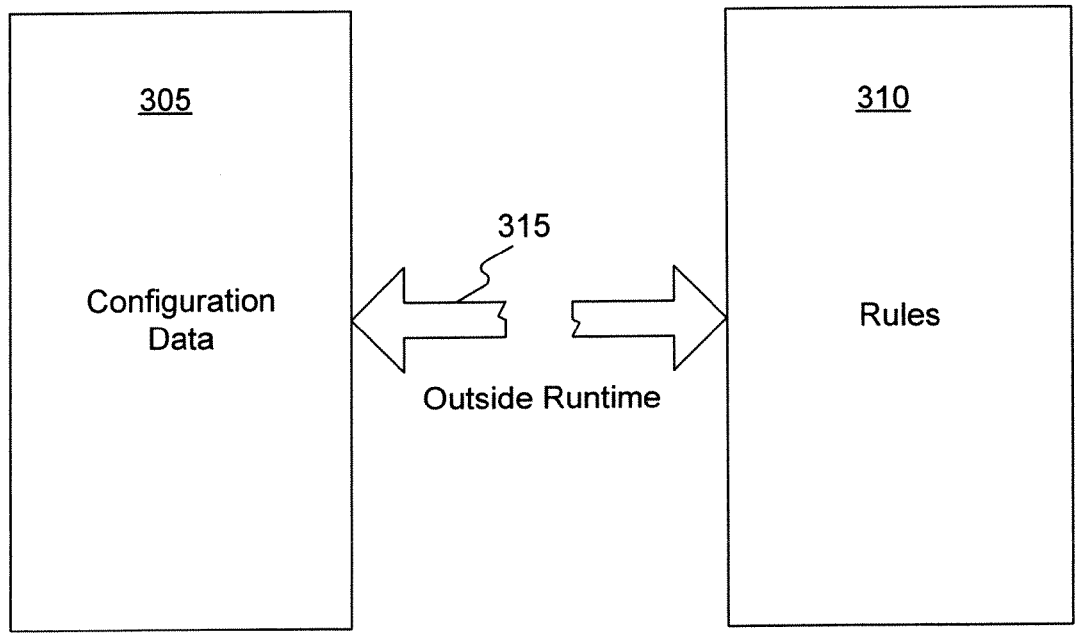
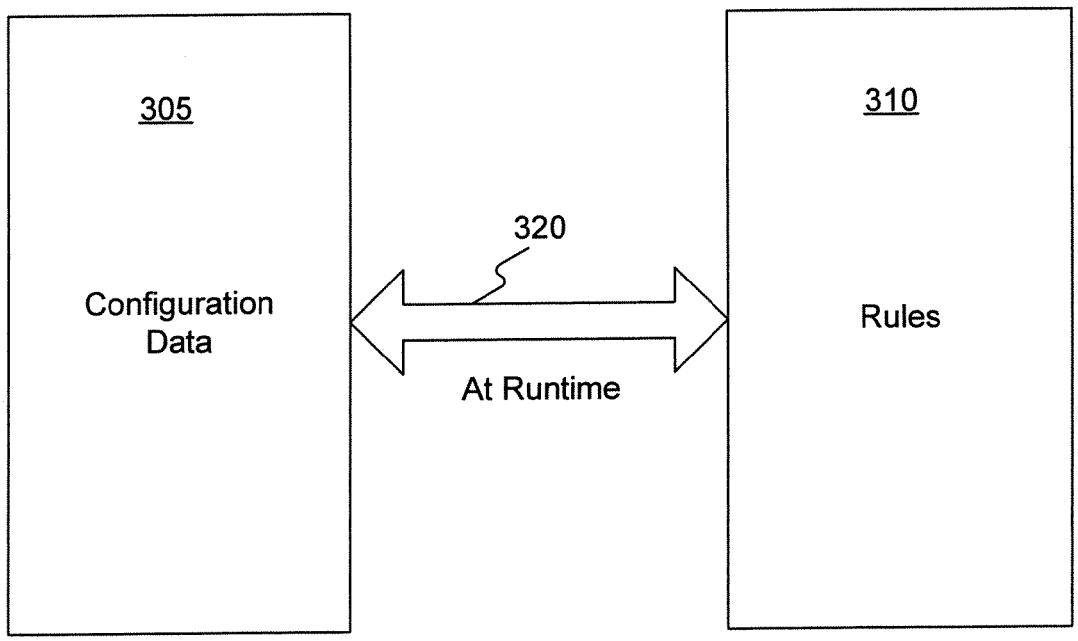
FIGURE 3A

```
1   package wagetypes
2   /* Start Attribute Section - DO NOT DELETE
3   @depreciated ("Does not exist in the R3 system")
4   @name (*/123-"cumulated EEP")
5   @virtualgroups ("Cumulation: Technical")
6   End Attribute Section */
7   /** /123 - Cumulated EEP */
8   public final class WageType_s123 extends WageType (
9       public final static String id = "/123";
10
11      public WageType_s123() (super();)
12      public WageType_s123 (Wage Type wagetype) (super(wagetype);)
13
14      public static final class CONFIG_99991231 extends Configuration (
15          public static final String START_DATE-"19010101";
16          public static final String END_DATE-"99991231";
17
18          public static final char ProcessingClass03 = processingclasses.ProcessingClass03.Value0;
19          public static final char ProcessingClass04 = processingclasses.ProcessingClass04.Value0;
20          public static final char ProcessingClass05 = processingclasses.ProcessingClass05.Value0;
21          public static final char ProcessingClass06 = processingclasses.ProcessingClass06.Value0;
22          public static final char ProcessingClass10 = processingclasses.ProcessingClass10.Value0;
23          public static final char ProcessingClass20 = processingclasses.ProcessingClass20.Value7;
24          public static final char ProcessingClass22 = processingclasses.ProcessingClass22.Value_w;
25          public static final char ProcessingClass30 = processingclasses.ProcessingClass30.ValueT;
26          public static final char ProcessingClass31 = processingclasses.ProcessingClass31.Value0;
27          public static final char ProcessingClass32 = processingclasses.ProcessingClass32.Value0;
28
29          public static final String EvaluationClass02 = evaluationclasses.EvaluationClass02.Value00;
30      )
31
32  )
```

FIG. 49

METHODS OF TRANSFORMING APPLICATION LAYER STRUCTURE AS OBJECTS

RELATED APPLICATIONS

This is a continuation of application Ser. No. 11/203,225 filed Aug. 15, 2005, now abandoned which is a continuation-in-part of application Ser. No. 11/111,794, filed Apr. 22, 2005, the disclosures of which are incorporated by reference herein in their entirety.

BACKGROUND

1. Relevant Field

The present inventions generally relate to business application software. More particularly, the inventions relate to systems, methods and computer readable media for object-oriented programming (OOP) modeling of business applications and the use of an OOP model to create, improve, and maintain a business application.

2. Background Information

One drawback with legacy business application systems stems from how business data and rules are often contained in physically separate table data structures, with little user-friendly representation of the organization or relationships of those structures. Such table-driven systems are difficult to work with. For example, a business object may be defined across ten or more different database tables that are not easily accessed, displayed, or understood together.

Furthermore, as shown in the example of FIG. 3A, a table-driven business application typically stores its configuration data 305 and its rules 310 in multiple, physically separate tables. Considered statically, there is no obvious or easily determined relationship or connection 315 between configuration data 305 and rules 310. At runtime, however, configuration data 305 and rules 310 interrelate 320 because the configuration data 305 and the rules 310 affect each other. For example, some configuration data 305, may affect the execution of rules 310. The physical separation between related data and between data and rules, the lack of static indications of runtime interactions between data and rules, and other factors make the data and processes of a business application difficult to understand, difficult to create, difficult to debug, and difficult to modify without causing unexpected effects.

In view of the foregoing, it is desirable to take business application structures and translate them into user-friendly objects that can be more easily understood, manipulated, debugged, designed, redesigned, analyzed, and/or modified.

SUMMARY

Consistent with embodiments of the present inventions, systems, methods and computer readable media are disclosed for modeling of business applications and the use of an OOP model to create, improve, and maintain a business application.

Embodiments and implementations consistent with the present invention provide systems and methods for transforming a business application structure using object-oriented programming structures. The system and method embodiments may perform operations comprising: identifying a plurality of related table-based data structures in the business application; defining a transformation rule for converting the related table-based data structures into an object-oriented structure, wherein the object-oriented structure reflects data relationships defined by the plurality of table-based data structures; converting the related table-based data structures into the object-oriented structure based upon the transformation rule; and expressing the object-oriented structure as an object-oriented programming structure that models the business application structure.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 1 to 3B illustrate exemplary business structures of a business application;

FIG. 7A illustrate an exemplary processes consistent with the present invention;

FIGS. 17 to 56 illustrate exemplary user interface displays consistent with the present invention.

DETAILED DESCRIPTION

Figure 3B:
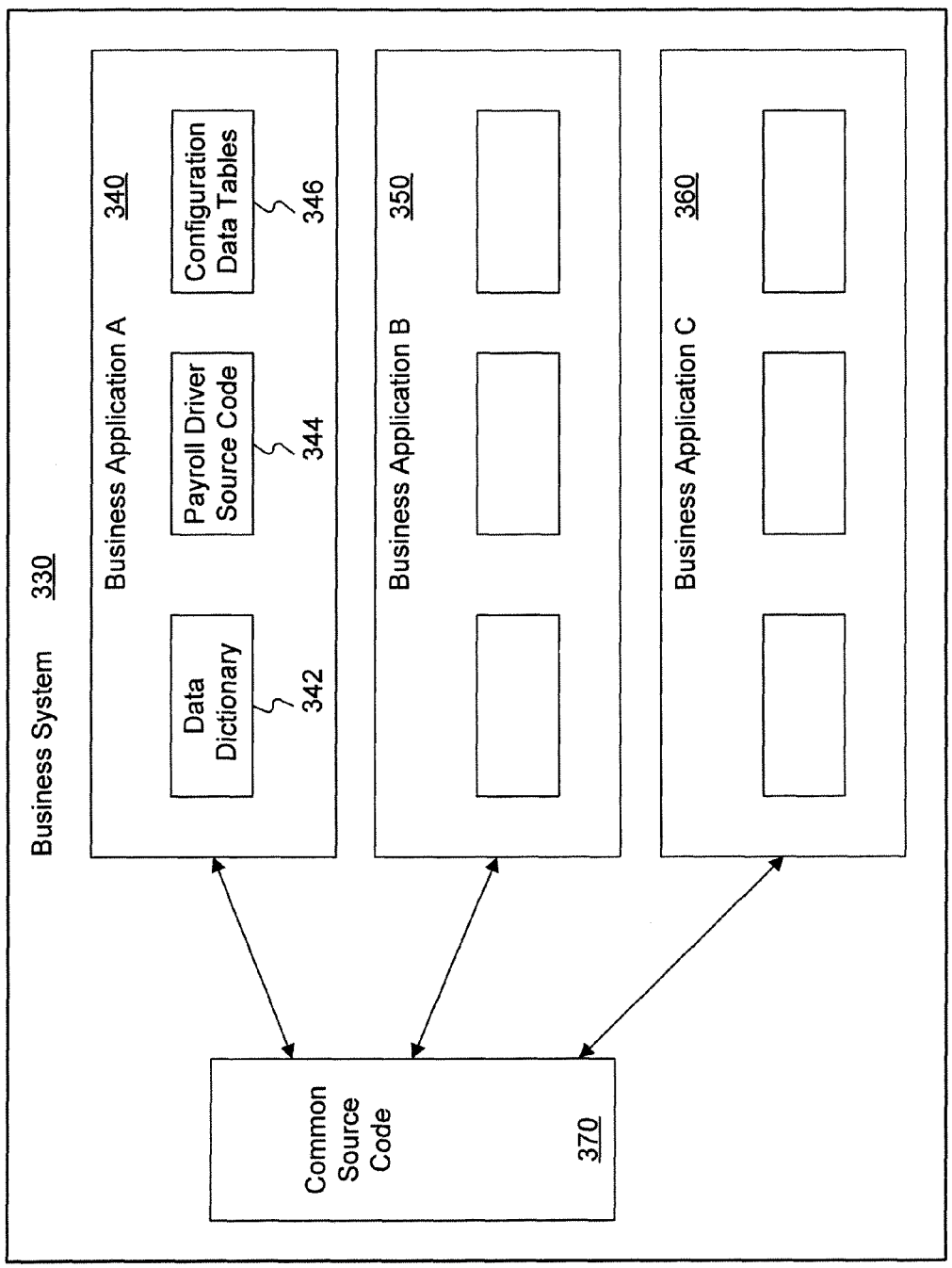

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Overview

Systems and methods consistent with the invention generally relate to business application software. Exemplary business applications include those offered by SAP, built around the SAP R/3 system. These business applications may provide the capability to manage financial asset and cost accounting, as well as production operations and materials, personnel, plants, and archived documents. The R/3 system runs on a number of platforms including Windows 2000 and uses the client/server model. The R/3 system is a comprehensive set of integrated business applications. R/3 provides the ability to store, retrieve, analyze, and process corporate data used for financial analysis, production operation, human resource management, and other business processes. At one level, an R/3 system (or other legacy business application system) may be thought of as a collection of legacy business structures or business objects held primarily in databases (as tables) that are manipulated by business processes or workflows.

For example, as shown in FIG. 1A, an exemplary business structure includes configuration data 100, which may be one or more business data objects containing data used by a business process. Configuration data 100 may include several data fields called attributes, such as "attribute 1" 105 through "attribute n" 120. For example, configuration data 100 may include data such as an employee's name, an hourly wage rate, and indicators for directing processing of data for the employee. Exemplary business structures also include business rules, such as rule 125, which are typically made up of multiple operations, such as "operation 1" 130 through "operation n" 140. Rule 125 may reflect a series of operations that when executed will, for example, cease deducting social security payments after an employee's cumulative salary reaches a specified amount.

In systems such as R/3, configuration data and rules control the business application software. As shown in FIG. 2A, in an exemplary payroll processing business application, the business structures may include a wagetype 200, which may be a business data object containing configuration data used to configure portions of a paycheck. For payroll processing purposes, each employee may have associated with him or her one or more wagetype structures containing data about the employee that is used to perform the payroll functions. For example, an employee may have a wagetype for hourly rate, a wagetype for union fees, a wagetype for deductions, etc. Each wagetype may include one or more attributes 205 that act as configuration elements, shown as attributes A-H. The attributes themselves may be of different types. For example, as shown, attributes A-C may be processing class attributes, which control the processing path used by the business application when performing processing (rules) for the employee. Attributes D-F may be cumulation attributes, which identify wage types that relate to one another and are processed together in some instances. Attributes G and H may be evaluation class attributes, which control processing paths like processing class attributes, but for different rules. A wage type 200 may include other types of attributes 205, as well.

As shown in FIG. 2B, as one of its functions, an exemplary payroll processing application 215 takes employee data 210 as input and produces a paycheck 220 as output. At runtime, each employee record is processed based on the employee's data 210 to produce the employee's paycheck 220.

FIG. 2C illustrates the exemplary process of FIG. 2B in greater detail. As shown in this example, employee data 210 is contained in the employee's wagetype(s) 200 or in one or more similarly organized data structures. These data structures contain the data used by, and to control, process 215 that calculates and produces a paycheck 220.

More specifically, employee data 210 from the employee wage type 200 may be used by a workflow or schema that implements payroll process 215. In the example shown, the first function of payroll process 215 may be the "HRS× RATE" function 225, which may multiply the employee's hours worked by the employee's hourly wage rate. The data specifying the hours and hourly rate may be derived from the employee's wage type 200. As shown in this example, information regarding how to perform the "HRS×RATE" function 225 is specified by a rule(s) 226 (rule "A" in FIG. 2C) associated with function 225. The functioning of the rule(s) 226, and thus the functioning of the "HRS×RATE" function 225, may be affected by attributes 205 contained in the employee's wage type 200. For example, as shown in FIG. 2A, a processing class attribute 205, such as attribute A, may have "L" selected for this employee and "R" unselected. Selecting "L" may cause rule(s) 226 associated with the "HRS×RATE" function 225 to calculate the product in a different manner than if "R" were selected for attribute A. For example, "L" may cause the hourly rate to increase by 1.5 for hours greater than 40, such that the employee gets paid time and a half for overtime beyond 40 hours, while "R" would not use an hourly rate increase, for an employee who is not eligible for increased overtime pay.

As shown in FIG. 2C, the next function to be performed in the workflow may be either the "ADD BONUS" function 230 or the "SUBTRACT TAXES" function 235. Typically, data from the employee's wage type 200 will indicate whether the employee is to receive a bonus and control the workflow to determine which of the two functions is performed next. As explained with respect to the "HRS×RATE" function 225, the rules associated with the "ADD BONUS" function 230 or the "SUBTRACT TAXES" function 235 (rules "B" and "C," respectively, of FIG. 2C) determine how those functions are performed, and attributes 205 from the employee's wage type 200 may affect the functioning of the rules.

Similarly, the "SUBTRACT DEDUCTIONS" function 240, "SUBTRACT ALIMONY" function 245, and "CUMULATE" function 250 are performed as the illustrated workflow progresses, and the rules associated with each function may be similarly affected by the corresponding attributes 205 in the employee's wage type 200. As shown in FIG. 2C, rules "D," "E," and "F" correspond to functions 240, 245, and 250, respectively. After all the workflow functions are completed, the payroll process shown produces a paycheck 220 for the employee reflecting the results of the operations carried out by the various functions.

Other business applications, such as financial applications, asset accounting applications, cost accounting applications, production operations applications, etc., use business structures and workflows comparable to the payroll processing application illustrated in FIGS. 2A-2C.

FIG. 3B illustrates an exemplary business system architecture to which embodiments of the invention may be applied. As shown, a business system 330, such as an SAP R/3 system, may include several business applications, such as business application A 340, business application B 350, and business application C 360. A business application, may be, for example, a payroll application that calculates the payroll for a company, generates paychecks or payslips for each employee, etc.; a human resources application that manages employee data, adds new employee records, deactivates retired employee records, etc.; or some other type of business application.

A typical legacy business application, such as a payroll application exemplified in this example by business application A 340, is table-driven. In other words, the data which controls execution of the application is contained in database tables. The application is designed to read and traverse the tables and execute business functions or processes according to the contents of the database tables. Multiple applications run on the same physical hardware and from data contained in the same relational database(s).

At a high level, payroll business application A 340 may be thought of as consisting of basically three major logical parts: (1) a data dictionary 342 that describes all the tables related to the application, (in this case payroll), (2) source code 344 that is the driver of the business processes within the business application, and (3) configuration data 346 that control the operation of the business processes within the business application. Each application in business system 330, such as business application B 350 and business application C 360, typically has its own data dictionary, source code, and configuration data. Configuration data is typically very application specific, while some data dictionary business objects and some source code may be shared among business applications.

Data dictionary 342 contains information about the business that is used by the business application, such as information about the employees used by the payroll application, for example, information regarding when a new employee joined the company. Configuration data 346 contains information controlling the operation of business application A 340 and is typically stored in database tables accessible to users who can customize the payroll application for their business needs by modifying configuration data 346. Some embodiments consistent with the invention focus on modeling configuration data 346, which controls the operation of business application source code 344, such as the payroll driver.

In one embodiment, configuration data 346 may be logically modeled by several major business objects. For example, an SAP R/3 business system payroll application may be modeled as major business objects such as wagetypes, schemas, and rules. Further, major business objects may be logically modeled as containing one or more sub-objects such as processing class, evaluation class, and cumulations, for an R/3 wagetype. The configuration data in the modeled objects describes how the business application is configured for a specific user, such as a specific company.

Source code 344 represents a driver for the business processes within the business application. The application source code driver of the business application is essentially just a framework that needs the configuration data to tell it how to operate. Without the configuration data to tell it how to work, the source code cannot work meaningfully. The source code driver 344 knows how to execute any schema, which is part of configuration data 346, and a schema is required to run an application; e.g., a payroll schema is required to run a payroll business application.

Payroll driver 344 knows how to read a schema table and do what the schema table says. A schema may be considered a work flow description. For example, in an R/3 system, the business application source code, such as payroll driver source code 344, is basically designed to navigate or traverse the configuration database tables that stores a schema(s). Business application driver 344 reads the schema table row by row, takes the data out of the schema tables, and executes the rules associated with a specific function of the schema. These rules are affected by the data in the associated wagetypes. So a schema, and it's associated rules, needs a wagetype to direct it's functioning. These business objects are all interrelated.

In a table-driven business system application, such as an R/3 payroll business application, a wagetype business object (or its equivalent) may modify the functionality of a schema, and the data in the wagetype can be configured by a user or whoever configures the payroll application. For example, consider a simple schema to calculate A and calculate B. The calculate B function and calculate A function are executable by driver source code 344 running the schema. But the order of execution of function A and function B, that is, whether to calculate A and then calculate B, or calculate B and then calculate A, is determined by the schema business object in configuration data 246, which is consulted by payroll application source code 344 when executing. A user can modify the schema business object and thus modify the configuration of business application 340. Source code may contain the executable statements implementing the algorithms of how to calculate A and how to calculate B, but the connection and the order is determined by the configuration data.

For another example, consider a rule business object that includes five calculation algorithms for a particular value. Configuration data, (e.g., in a wagetype object), may be set so that one algorithm is used for a specific group of employees at time X. At time Y, some legislation change or a union negotiation for the group of employees may take place and cause a need for a change for this particular group to switch to another calculation algorithm. To make the change, a user may modify a wagetype for this group employees in the business application by changing their processing class values so that they use another algorithm in their payroll calculations.

Common source code 370 represents code (and other business objects) that are stored in a common code base that business applications share among themselves. Consequently, in legacy business systems, including R/3, there may be no clear separation between the logical instances of execution or the logical instances of the data in a business application. Thus, when a user configures a part of a business application that is common to other applications, e.g., in common source code 370, the user may affect many different instances of objects at execution. It is very difficult to verify that the changes made to the common code are correct for each and every business application that uses it, because they all must be tested to be sure.

In addition, configuration data 346 may be changed or created that causes the unintended and/or incorrect use of objects stored in common source code 370. For example, in an SAP R/3 payroll business application, a user may configure a United States schema to use a Brazilian tax calculation function, which is accessible from common source code 370. This is not correct, however, as the Brazilian tax function will perform a different calculation than a United States tax function.

As noted above, the data structure business objects, like wagetypes, and the functional business objects, like rules, are very interconnected and changes to one will typically affect the other. For example, changing part of a payroll application data structure object, such as a wagetype or a processing class of a wagetype, will likely affect the calculations for multiple employees done by multiple rules and related to multiple other wagetypes. And vice-versa. Consequently, in the table-based and table-organized form native to business system 330, data structure business objects and functional business objects are difficult to understand, maintain, modify, debug, optimize, and correctly manipulate.

Some embodiments of systems and methods consistent with the invention represent business application objects as object-oriented programming language elements, building a model of the business application in some respects, and applying object-oriented programming language tools to the model. The model and the tools improve a user's ability to understand, maintain, modify, debug, optimize, and correctly manipulate the business application, as represented by the object-oriented programming language model.

In some embodiments consistent with the invention, anything that is related to the configuration of the business application may be considered a business object for transformation to an object-oriented programming language element(s). In one embodiment, a designer may select and define the business objects that are to be modeled as OOP objects. This selection and definition of business objects may be done using one or more different techniques, but generally the designer's goal should be to define business-application-layer objects, which are logical collections of things (data, operations, etc.) reflecting the design and functionality of the business application, and not objects based on the implementation or data structures that implement the business application, such as data-dictionary-layer structures. A business application typically uses a relational database model, but business object definition typically should not be based on the database relationships as they usually do not coincide with the logical business functionality.

In one technique, a designer may analyze the outputs of a business application and decide that the output data structures should be business objects in the business application model. For example, running a payroll application on an SAP R/3 system produces a table of result wagetypes, making wagetypes a clear candidate for a business object to be transformed into an OOP object. Smaller data structures that are part of larger data structures, such as processing classes, cumulations, and evaluation classes that are part of a wagetype, are also obvious candidates for transforming into OOP objects.

A designer may also analyze the business application to identify business entities that are treated as logical collections of data and/or associated operations by the business application, as these are also logical candidates for definition as business objections. For example, an SAP R/3 payroll application provides user interfaces to configure wagetypes, schemas, and rules to customize the application, treating them as logical entities. Thus, wagetypes, schemas, and rules may be considered business objects for modeling by OOP language elements. Logical business entities that encompass other logical entities may be decomposed to model as objects the encompassed logical entities that comprise them, such as decomposing wagetypes into processing classes, cumulations, and evaluation classes business objects.

Figure 25:
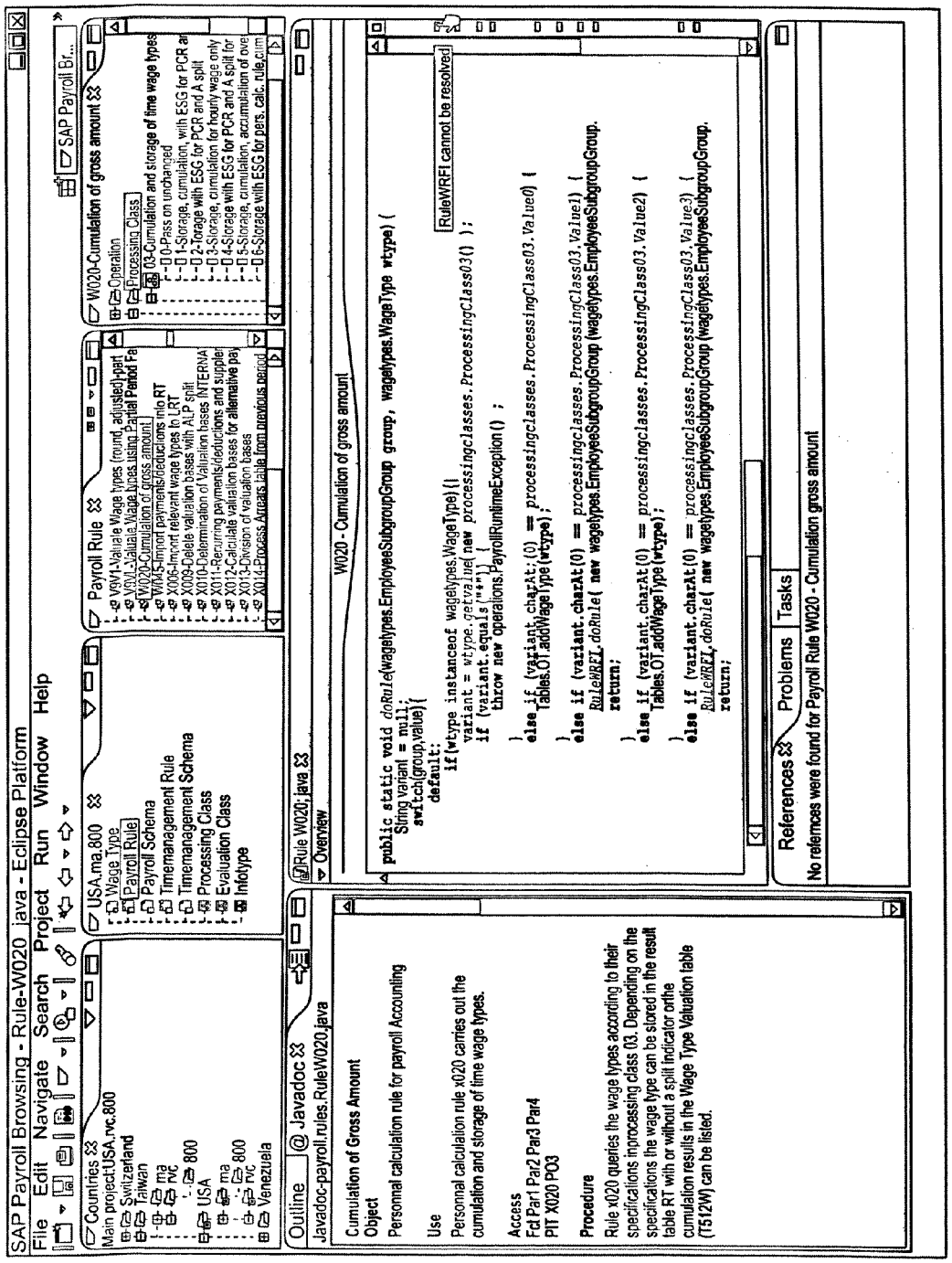

After the business objects that comprise a model of a business application are defined, embodiments of systems and methods consistent with the invention may map them to specific object-oriented objects and elements. This may be done by analyzing the attributes of a business object and transforming them into an object-oriented language element, such as a Java™ language element that appropriately models the business object attributes. This process involves finding a corresponding construct, structure, or other element within the destination object-oriented language to represent each important attribute, element, or relationship of the business object being transformed. For example, an object-oriented language class, such as Java™ class, may be used as a starting point to represent most business objects. Business objects that are basically data structures, such as wagetypes in an R/3 payroll application, may be represented using static OOP elements in an OOP object such as a class, for example, as shown in FIG. 7A (and explained further below). Business objects which contain executable code constructs, such as rules and schemas in an R/3 payroll application, may be represented using OOP objects having code, such as a class with methods or functions, for example, as shown in FIG. 25 (and explained below). Other object-oriented language features may also be used to model business object attributes. For example, object-oriented language superclasses and subclasses may be used to model the hierarchy and inheritancy attributes of business objects, and object-oriented language scope elements, such as public and private, may be used to model the scope attributes of business objects, etc.

This mapping process may be automated by defining a set of mapping rules used by a conversion engine to take input business object data for business objects and convert it into a corresponding object-oriented language object as described further below.

In addition to transforming business objects into corresponding object-oriented language objects, elements, etc., embodiments of systems and methods consistent with the invention may also use code-development-project-organization-tool features to model a business application. For example, as noted above, a legacy business system 330 typically shares common code and data structures 370 among business applications, so if something is changed in the common code, i.e., in the common parts, it affects every object or structure that uses that common part. One way to represent this feature of a business application in an object-oriented model may be to use code development project features and shared folders. For example, in many legacy table-based business systems like R/3, many business objects have a common configuration across runtime instances of the application, but each instance itself is independent, and different, at runtime. For a specific example, consider a business application used for a division of a business in Argentina and a division of the business in the United States. The application is configured using the same type of configuration tools for Argentina and the United States, but the running configurations of the application for each country are totally separate, and the same configuration objects within the context of the Argentine run of the application can mean different things than within the context of the United States run. They are like separate universes. Both universes, however, have a common foundation of business objects that are shared. These relationships and behaviors of the business application may be modeled using separate projects to hold, delimit, and manage the United States instances of the application objects and the Argentine instances of the application objects and by using shared folders to hold, delimit, and manage the common objects. Similarly, other OOP language development environment features, in addition to projects and shared folders, could also be used to model business application/business system features.

A designer modeling such aspects of a business system and business application may look at the relationships within the business system/application to identify "vertical dimensions" and "foundation" elements for projects and folders. A dimension may be thought of as an instance of all the objects involved in a process. A foundation element may be thought of as a common element that is used by many instances. So if an application uses the same structure more than once, but the data is different each time (i.e., there are many instances of the same structure), then these may be modeled as different dimensions (projects) with a common foundation (shared folder). Thus an object-oriented model of a business application/system organized by projects and shared folders enables demonstration and evaluation of the effects to the dimension(s) of modifying a foundation element. Put in object-oriented terms, a foundation element may perhaps be analogized to a class definition for an object, while a vertical dimension may be analogized to an instance of the class object. Each instance may be the same architecturally, yet the data in each one is different. Such analogies and may be useful to a designer modeling complex table-driven business applications and systems having shared code and data structures and building transformation rules for converting business application objects and applications into object-oriented language representations.

Systems and methods consistent with the invention analyze a business application's data, operations, and relationships and create a corresponding object oriented programming (OOP) model corresponding to the business application entities. In one embodiment the OOP model may be realized in the Java programming language and may include OOP objects, functions, and operators. Each OOP model accurately represents the data, relationships, and rules associated with the corresponding business entity. Once converted to an OOP model, systems and methods consistent with the invention may use standard OOP tools to understand, manipulate, design, redesign, analyze, and modify the business application. This can be done independently of the native business application system, as the OOP model is separate and independent from the business application entities. Modifications made to the OOP model may then be converted back into business application entities and installed in the native system.

Detaching Application into Offline Mode

Figure 4A:
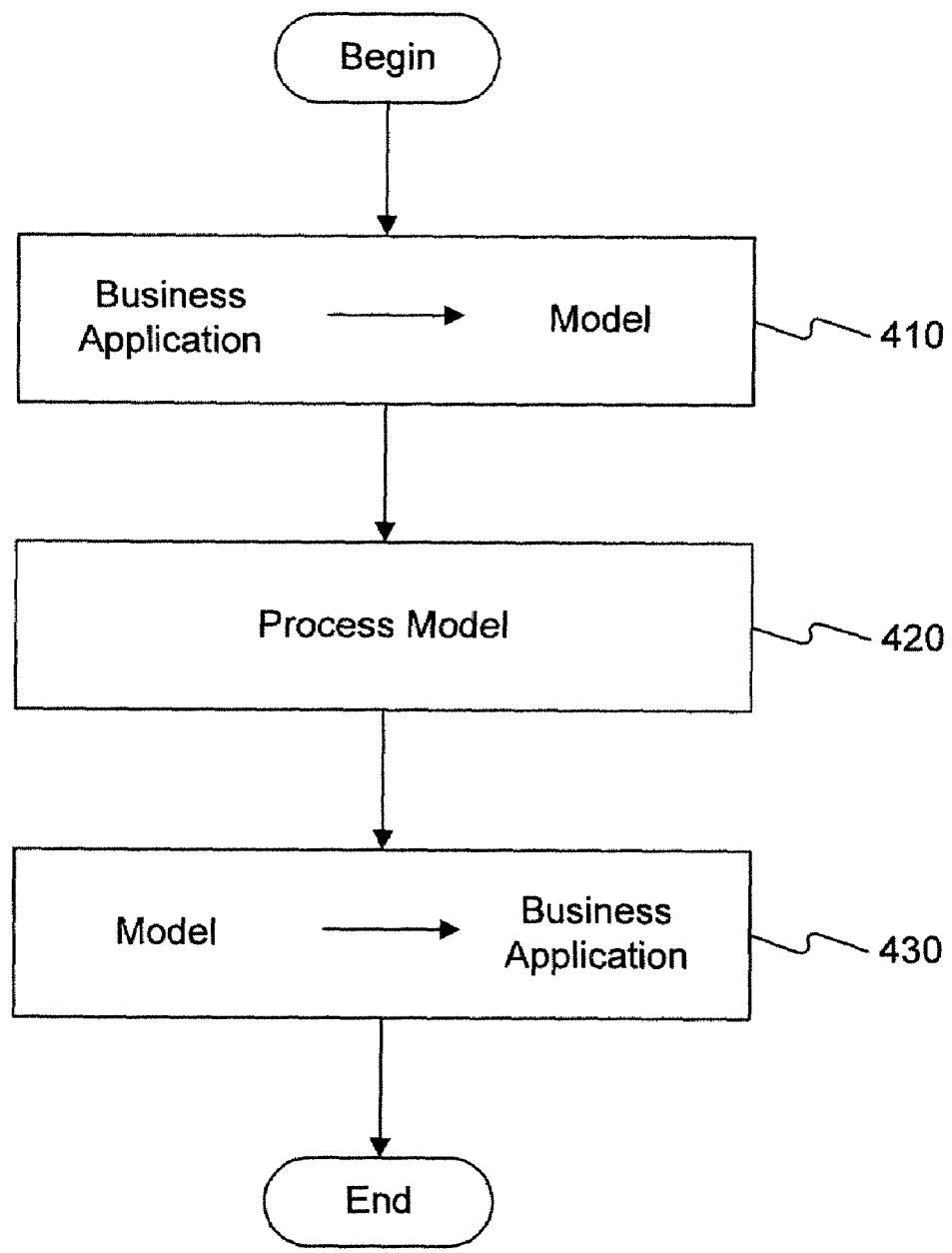
FIG. 4A illustrates a flowchart illustrating an overview of an exemplary process 400 for creating an off-line model of a business application, consistent with the present invention.

FIG. 4A illustrates a flowchart illustrating an overview of an exemplary process 400 for creating an off-line model of a business application, consistent with the present invention. The exemplary process is applied to a business application composed in a first programming format. The programming format for such business applications are often specialized programming formats unique to each particular business application and, as described above, typically have limited flexibility in how a programmer may conduct efficient programming or debugging tasks.

As shown in FIG. 4A, systems consistent with the invention may translate the business application into a model representing the business application (stage 410). More particularly, the model reflects a representation of the business application in a second programming format different than the original or first programming format of the business application. In preferred embodiments of the invention, the second programming format may be an OOP language, such as Java or C++. The process for translating the business application into a model is described in greater detail below with respect to FIGS. 5 to 8.

Once the system has generated the model of the business application, the system may then enable a user to process the model in a processing environment or platform corresponding to the second programming format (stage 420). For example, as described above, the second programming format may be an OOP language, such as Java. Systems consistent with the invention may thus enable a user to program, debug, or analyze the programming code of the model by using an OOP editor or other type of OOP processing environment or platform. Because the user may process the model, as opposed to the actual business application, the user may do so while business application is still running. Thus, systems consistent with the invention allow a user to process a business application without interfering with normal business activities.

Figure 4B:
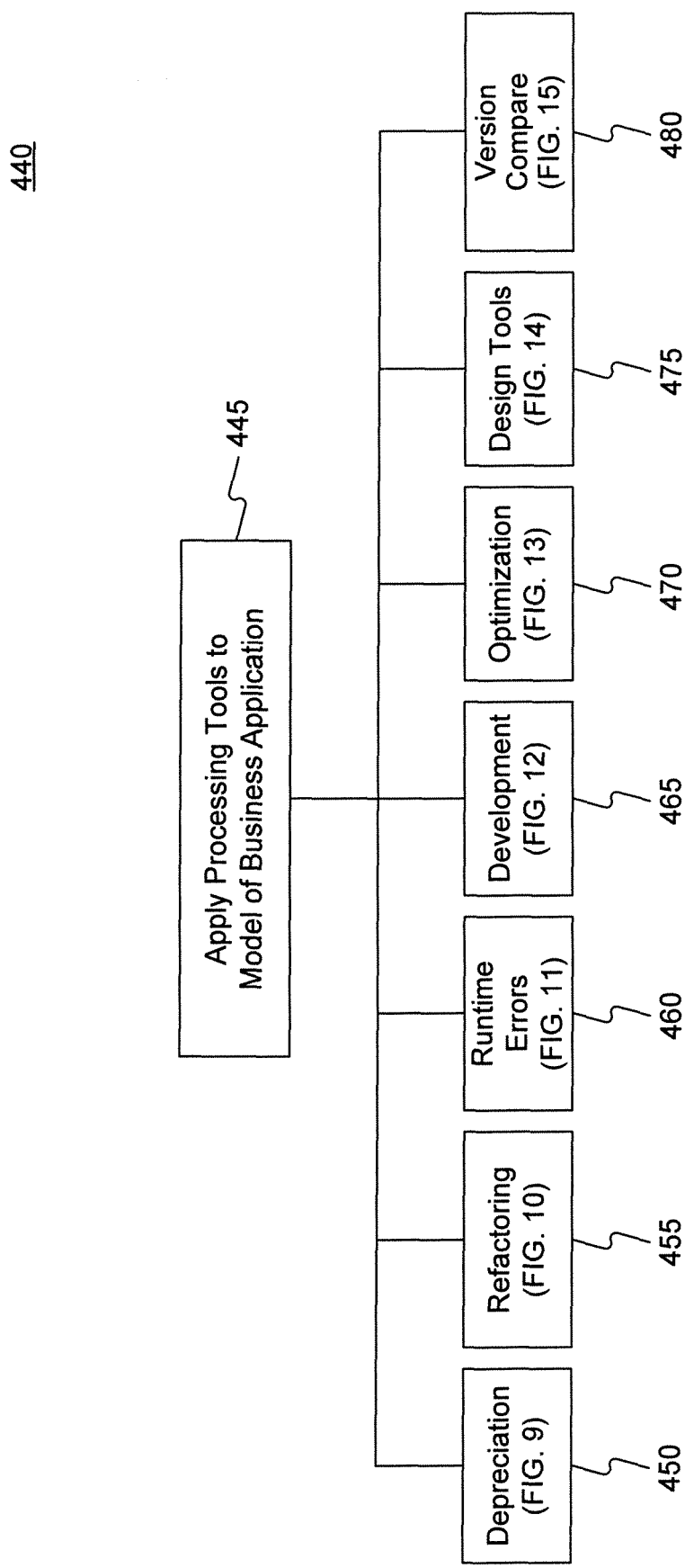
FIG. 4B is an exemplary illustration 440 of the various processing tools consistent with the invention.

Further, by taking advantage of processing tools available with such OOP processing environments, the system may enable a user to use one or more tools to process the model. FIG. 4B is an exemplary illustration 440 of the various processing tools consistent with the invention. As shown in FIG. 4B, the system may enable a user to apply the processing tools to the model of the business application (stage 445). These processing tools may include a deprecation process (stage 450), a refactoring process (stage 455), a runtime error process (stage 460), a development process (stage 465), an optimization process (stage 470), a design tools process (stage 475), and a version compare process (stage 480). These and other processing tools consistent with the invention are described in greater detail below with respect to FIGS. 9 to 15. Further, FIGS. 17 to 56 illustrate exemplary user interface screens enabling a user to process the model representing the business application.

The system may then re-translate the model representing the business application in the second programming format back to the first programming format (stage 430). As described below, systems consistent with the invention may translate the model in such a way that any modifications made to the model in the second programming format are automatically reflected in the re-translated business application composed in the first programming format. The process for re-translating the model back to the first programming format is essentially the reverse of the forward translation process described above with respect to stage 410, and as illustrated below with respect to FIGS. 5 to 8.

Figure 5:
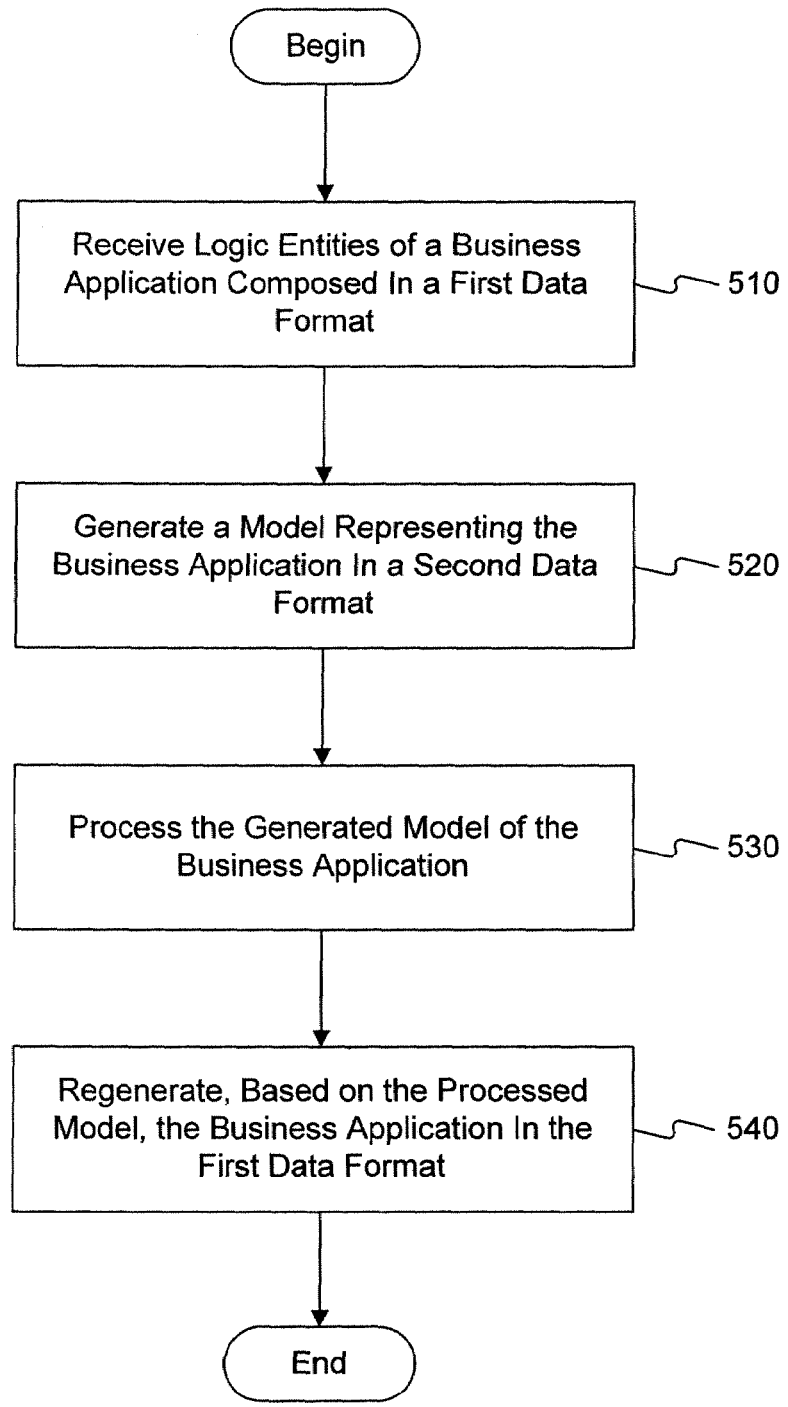
FIGS. 5, 6A, and 6B illustrate exemplary processes consistent with the present invention.

FIG. 5 illustrates the exemplary modeling process 500 of FIG. 4 in greater detail. As shown in FIG. 5, to translate the business application into the second programming format, the system receives the logic entities of the business application composed in the first programming format (stage 510). As described above with respect to FIG. 1, these logic entities may be the business data structures (e.g., configuration data 100 and business rules 125) of the business application. Based on the received logic entities of the business application, the system may then generate a model representing the business application in the second programming format (stage 520). As also describe above, the second programming format may be, for example, an OOP language such as C++ or Java. The system may then, as described above with respect to FIG. 4, process the generated model of the business application (stage 530). The system may then re-translate the processed model to regenerate the business application in the first programming format (stage 540).

Generating A Model of a Business Application

Figure 6A:
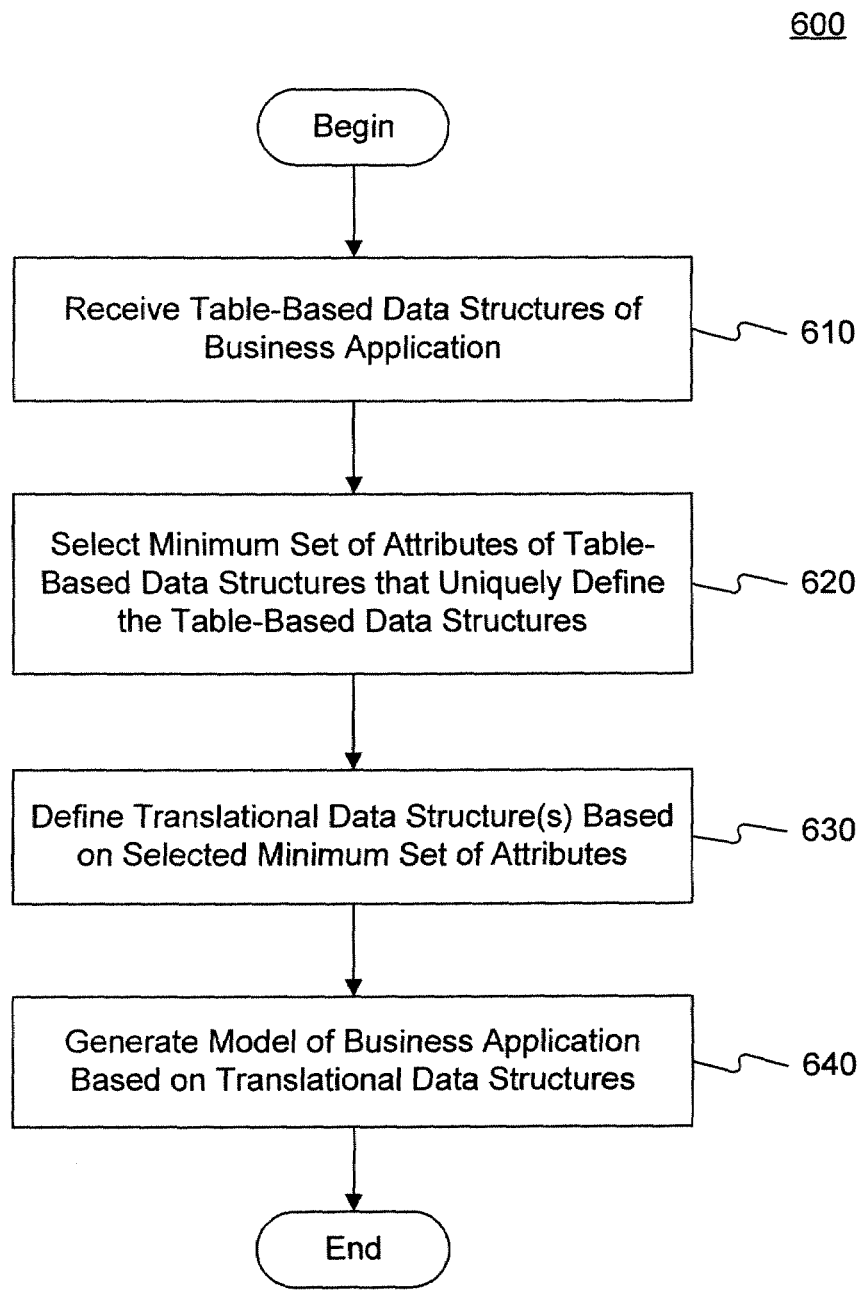

FIG. 6A illustrates an exemplary process 600, consistent with the invention, for translating the business application into a model composed in the second programming format. As shown in FIG. 6A, the system may receive the data structures, which may be table-based data structures, of the business application (stage 610). In this regard, the system may scan the business application to identify the table-based data structures, which may be any group or segment of data reflecting data stored in a table-based format of the business application. The table-based data structures may, for example, correspond to the configuration data and rules of the business application. Further, each table-based data structure may include attributes of the data stored in the respective table-based data structure. For instance, as explained above with respect to FIG. 1, a table-based data structure may include configuration data 100 having attributes 105 to 120 or a rule 125 having operation attributes 130 to 140.

The system may then select the minimum set of attributes of table-based data structures that uniquely define the table-based data structures (stage 620). To this end, the system may first identify those attributes of, for example, the configuration data (e.g., attributes 105 to 120) and any rules (e.g., operation attributes 130 to 140). The system may then identify those attributes that are common to each table-based data structure. From the identified common attributes, the system may then select the least number of these common attributes that uniquely defines each translational data structure.

Based on the selected minimum set of attributes, the system may then define one or more translational data structure(s) (stage 630). In systems consistent with the invention, a translational data structure may be an identified data or business structure of the business application that is converted into an object-oriented structure. For example, in an R/3 payroll application, the minimum set of attributes may include a geographic attribute (e.g., "New Zealand"), a version reference attribute (e.g., "rna"), and a client reference attribute (e.g., "800"). The corresponding translational data structure may thus be defined as NewZealand.rna.800. In OOP terms, the defined translational data structures may include at least one translational data structure that respectively corresponds to a project, an object, and an object instance. The system may then generate the model of the business application based on the defined translational data structures (stage 640).

Figure 6B:
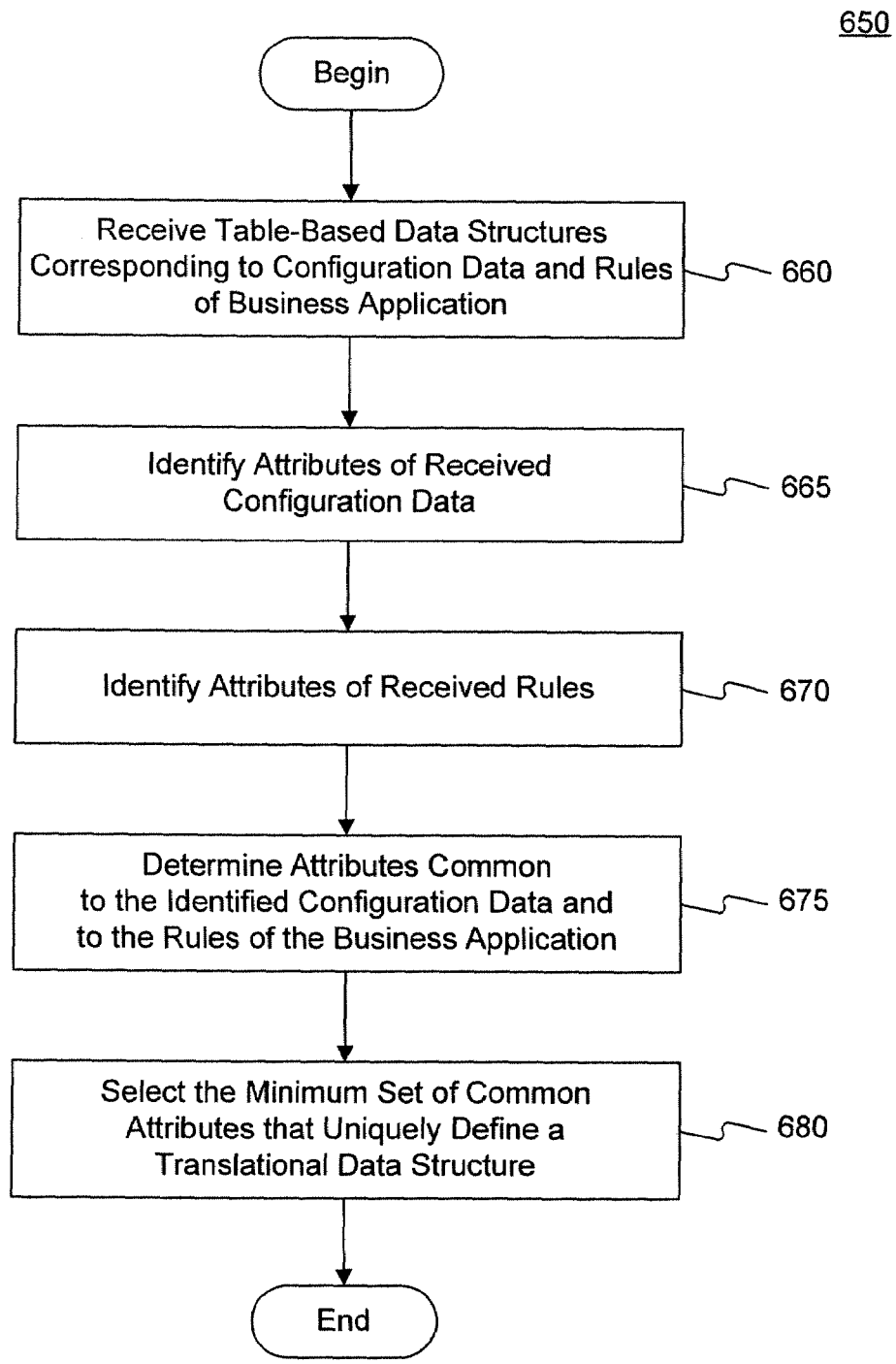

FIG. 6B illustrates an exemplary process 650 further describing the processing stages of FIG. 6A. As shown in FIG. 6B, the system may receive table-based data structures corresponding to configuration data and rules of business application (stage 660). The system may then identify the attributes of received configuration data (stage 665) and identify the attributes of received rules (stage 670). The system may then determine those attributes common to the identified configuration data and to the rules of the business application (stage 675). From these common attributes, the system may then select the minimum set of common attributes that uniquely define a translational data structure (stage 680).

As noted above, methods and systems consistent with the invention may transform business application logic entities or structures into OOP structures that represent the data, relationships, and operations of the business application structures. In one embodiment, the business application structures are transformed at the application level, including consideration of application logic, as opposed to the database table level. Thus, a complex business structure comprising ten or more related database tables, such as a wagetype in an SAP R/3 payroll processing application, may be transformed into a single OOP structure, such as a Java class, that encompasses all the information in the ten or more related database tables.

In some embodiments consistent with the invention, business structures are transformed into a hierarchical object-oriented class structure. For example, as described above, all the related business structures in a business application may be analyzed to identify common elements or attributes, and transformation involves defining an OOP superclass that represents the common elements. Then, specific business structures are analyzed to identify their unique elements, and each specific business structure is transformed into an OOP structure by defining subclass instances of the superclass, which add representations of the unique elements of each specific business structure to the superclass. This exposes the hierarchy of the business structures to a user or administer viewing the OOP structures, and allows manipulation of the OOP representations of the business structures by OOP design and development tools. In one embodiment, included in the transformation to OOP subclasses is extraction of the data from the business structure for inclusion in the subclass. Thus, the values of various fields are also exposed to users and OOP tools.

Processes consistent with the invention for generating an OOP model of a business application are described in further detail below with respect to FIGS. 7 and 8. FIG. 7A, for example, illustrates an exemplary OOP structure consistent with the invention. Referring briefly back to FIG. 2A, recall the example of a wagetype business structure 200 from a payroll application of an SAP R/3 system, which may have several attributes 205, such as several processing class attributes. An implementation consistent with the invention may transform the data from a specific wagetype business structure 200, for example the wagetype structure known as "/123," into an OOP structure such as a subclass that extends a "wagetype" superclass as shown in FIG. 7A. The transformation process creates a valid OOP language name "wagetype_s123" 792 based on the business structure name "/123" and declares it as a subclass of the superclass wagetype 794. The OOP structure corresponding to business application wagetype /123 contains and models the data and relationships 796 of the business application wagetype /123 extracted from the database tables of the business application. In the example shown, included in the OOP structure are code lines that model the processing class attributes 798 of the business application structure wagetype /123. Also included in the example shown is documentation 795 related to the business application structure wagetype /123, which may be used and displayed by OOP tools such as JavaDoc™.

In some embodiments, transformation may be based on a set of rules mapping or defining what OOP structure may create or define each business structure encountered in the business application. In one embodiment, the set of transformation rules may be defined manually. The rules for translating a business application structure into an OOP structure may create syntactically correct OOP structures (e.g., in Java™ code) useful for processing at the business application level. For example, one transformation rule for mapping various business structures into OOP structures may be to group them according to whether they share operations that can be performed on them. Another rule may be to create a subclass for each different time period attribute of a business structure based on start date and end date value of the time period attribute. Another rule may be to, within a subclass, define each business structure configuration element, such as processing class attribute, as an OOP operation in that class. Yet other rules may define when to use a public, private, or shared OOP class attributes to determine the scope and visibility of each OOP structure. Yet another rule may be to take each business structure as defined by the business application and create a corresponding OOP structure, effecting a one-to-one conversion mapping.

Figure 7B:
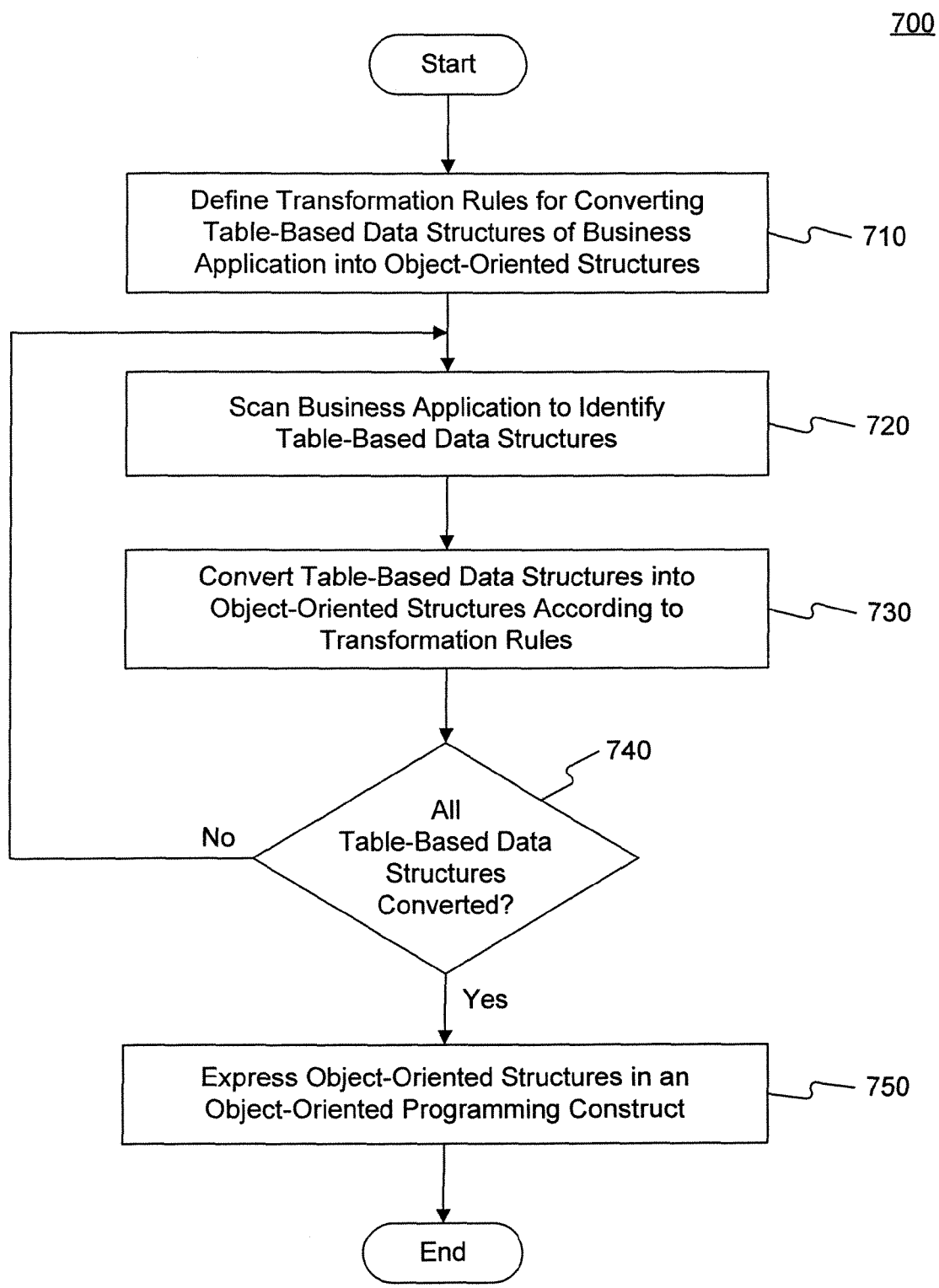
FIG. 7B illustrates an exemplary OOP structure consistent with the invention.

FIG. 7B illustrates an exemplary process consistent with the invention for translating, for example, configuration data. As shown, the process begins by defining transformation rules for converting table-based data structures of a business application into object-oriented structures (stage 710). Next, the process scans the business application to identify a table-based data structure (stage 720). Next, the process converts the identified table-based data structure into an object-oriented structure, according to the transformation rules (stage 730).

The process then determines whether all the table-based data structures in the business application have been converted into object-oriented structures (stage 740). If not (stage 740, No), the process loops up and continues to identify and convert. If so (stage 740, Yes), then the process expresses the object-oriented structures in an object-oriented programming construct, such as an OOP class (e.g., a Java™ class) that represents the table-based data structure.

Figure 7C:
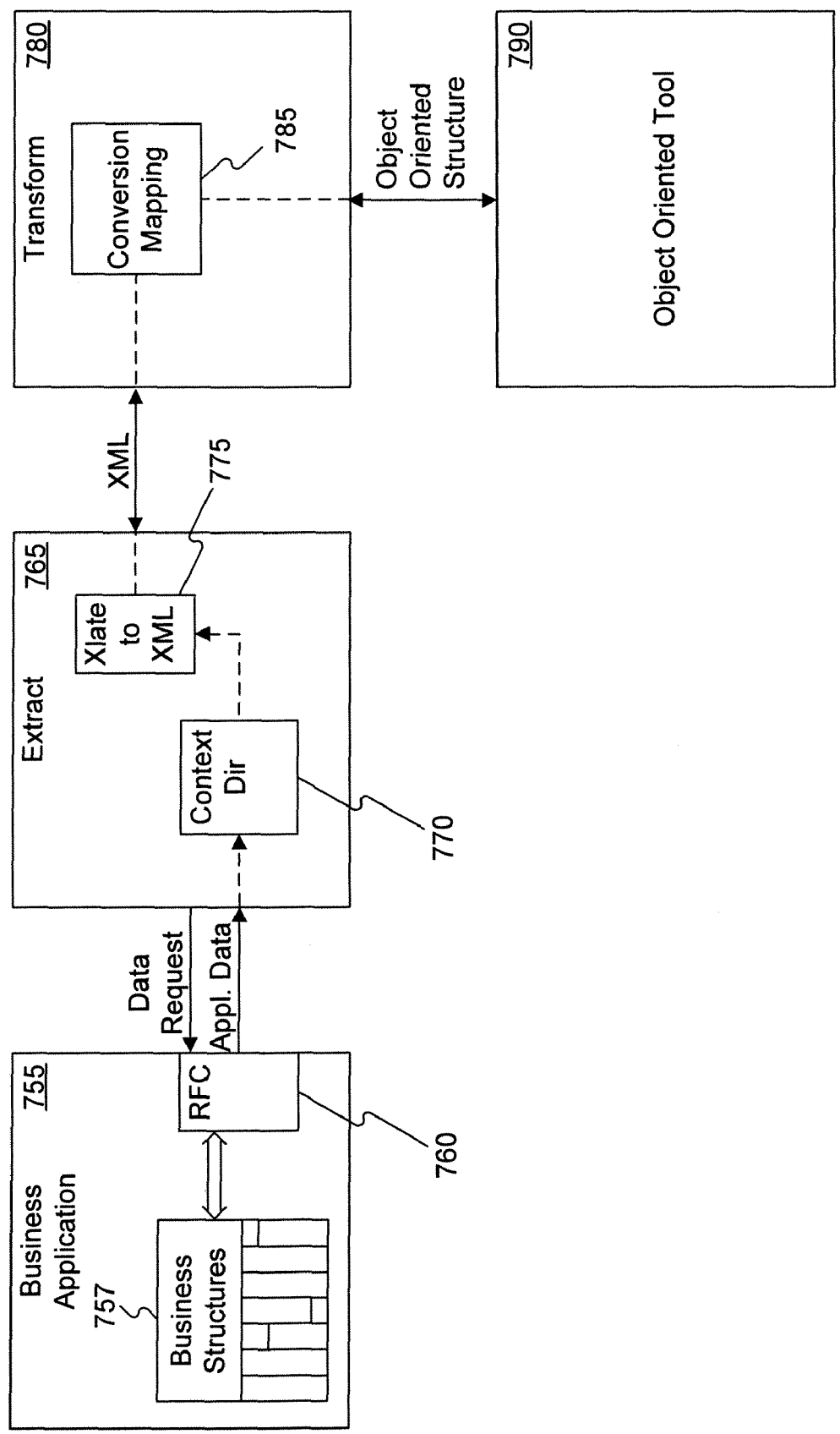
FIG. 7C illustrates a block diagram of an exemplary architecture consistent with an embodiment of the invention.

FIG. 7C is a block diagram of an exemplary architecture, consistent with an embodiment of the invention, for transforming a business application. As shown, a business application 755, such as the Payroll application in an SAP R/3 system, includes business application structures 757, which are logical entities embodied in various database tables or other data formats. In one embodiment, business application 755 is a preexisting application (such as the an application in an SAP R/3 system) that has been modified by adding remote function calls 760 that retrieve business application structures at the request of an outside application.

In the embodiment shown, extract module 765 implements a process that retrieves business application structure data from the business application and readies the data for transformation into an object-oriented structure. For example, extract module 765 may send a data request via remote function call 760 to business application 755 and receive, in response, all the appropriate application data about a business structure 757, including context data about business structure 757. The application data from business application 755 may also include information about the data, e.g., documentation describing the data. In the embodiment shown, extract module 765 maintains a context directory 770 containing information regarding what context is needed for each activity and a translation module 775 that translates the business application data into XML, or a similar markup language.

Transform module 780 receives the XML-formatted business application data from extract module 765. Transform module 780 contains an embedded conversion mapping component 785 that is used in transforming the XML-formatted business application data into an object-oriented structure. Conversion mapping component 785 includes transformation rules, as described above. For example, a business application structure logic entity, such as a "standard deduction" application structure (which may consist, in business application 755, of a number of physical database tables containing various content data), may be mapped with a conversion algorithm into a Java™ class or a set of Java classes. In one embodiment, the name of the resulting object-oriented structure may typically correspond to the name of the logic entity from business application 755. For example, the model representing business application 755 may include a "standard deduction" Java™ class, and instances of the class representing each type of standard deduction in business application 755. Documentation information describing the business application structure from business application 755 may be transformed into comments, such as Java™ language source code comments, or the like and associated with the OOP construct created to represent the business application structure.

Transform module 780 provides the object-oriented structure representing a business application structure to an object-oriented language tool 790, such as a Java™ integrated development environment tool, a Java™ code optimizer, a configuration management tool, etc or an integrated development environment, such as Eclipse™ (www.eclipse.org), that incorporates many software development tools. Object-oriented language tool 790 may be used to understand, maintain, develop, design, redesign, modify, configure, or otherwise manipulate the OOP model of business application 755. For example, a customized wagetype editor/viewer may be included as part of an integrated development environment for an SAP R/3 system, presenting object-oriented structures such as the class shown in FIG. 7A on easy to understand, use, and navigate user interfaces, such as the examples shown in FIGS. 22 and 23.

In one embodiment consistent with the invention, extract module 765, transform module 780, and object-oriented language tool 790 may be implemented on a computer(s) separate from the computer implementing business application 755, such that business application 755 can be modeled, and the OOP model manipulated, without interfering with the ongoing operation of business application 755. Further, one of ordinary skill will recognize that Java™ is merely used as one example of an OOP language, and that the scope of the invention includes other OOP languages, such as C++, C#, Visual Basic, etc.

As with data structures (e.g., for configuration data) in legacy business applications, the operations, instructions, or business rules that implement the application are also typically table-based. That is, the operations that perform a business rule function, such as deducting payroll taxes from an employee's paycheck, (and some of the relationships between the operations), may be contained in database tables. The operations may be executed by application source code that traverses the tables when carrying out a particular rule. And, similar to business data structures, business rules or operations may be contained in many different database tables, which entail the same drawbacks described above for table-based business data structures. Perhaps worse, there may be no physical connection between the rules tables and the data tables they operate on and vice-versa. Just as with table-based business application structures, these table-centric rules and operations are difficult for users and administrators to comprehend, manage, create, revise, maintain, and debug.

Embodiments of methods and systems consistent with the invention transform business application operations, rules, and schemas into OOP constructs that represent the operation, rule, or schema, emulate its operation in terms of sequence with other operations, and represent its relationship(s) to the data it operates with and upon. A rule may be thought of as a sequence of operations that work on data structures to perform a business function. A schema may be thought of as a business process or workflow that connects a sequence of rules and data structures to perform a more complex business function, for example, as illustrated in FIG. 2C.

In one embodiment, an automated system determines each operation that makes up a schema or rule in the business application by analyzing the database table(s) that hold the schema or rule, for example, by analyzing the rule tables in an application in an SAP R/3 system or other business application. In one embodiment consistent with the invention, for each business operation found, the system transforms the operation into part of an OOP model by declaring or creating an empty OOP language construct with a similar name to that of the business operation, such as a Java™ function or method. The system may insert a standard number of parameters, or make other modifications, to make the syntax of the newly declared OOP construct valid for the programming format being used, such as the Java™ language. The system preferably puts the OOP constructs in the same sequence as the business application operations to form an OOP model object representing the rule, schema, etc. that encompasses the business application operations. Thus, in some embodiments consistent with the invention, the system produces a model that represents the configuration of the business application rules and schema, but not their functionality, as the OOP constructs are null functions.

In one embodiment, the OOP language code representing the business operations may contain function or method calls only, while the bodies of the functions or methods are empty. OOP languages such as Java™ allow a null function body and can compile a function call with a null function body. For example, a payroll business application for an SAP R/3 system may contain a business rule with the operation "NUM=." An embodiment of a system consistent with the invention may create a syntactically correct null Java function named "NUM=" when modeling the payroll business application. Thus, as noted, the system may produce a model that represents the configuration of the business application rules and schema, but not their functionality, as the OOP constructs are null functions. Since the OOP language syntax is correct, OOP language tools, such as compilers, analyzers, optimizers, etc. can be used to find errors or problems in the configuration model, such as errors in relationships, calls, interactions, design, etc. associated with the modeled null functions. This is useful because any errors associated with the model are also associated with the business rules and operations it represents. For example, if a modeled OOP function calls another OOP function that does not exist (because there is no corresponding business application operation that caused the called OOP function to be created in the model), this error will be exposed by the OOP language tools, such as a compiler or linker.

In some embodiments consistent with the invention, the OOP functions include documentation pulled from the business application to help users understand the function. In some embodiments consistent with the invention, the process that transforms business application operations or rules into OOP constructs that represent the operation or rule is controlled by a set of transformation rules. These transformation rules may be generated manually. The transformation rules should be designed such that the resulting OOP language function enforces the scope and other characteristics of the business application operation through OOP language techniques. For example, a business application rule (and therefore the operations that comprise it) may be valid for only one country, or in a few countries, or in all countries. To enforce this scope, the transformation rules may produce functions of appropriate scope, such as global, shared, or local. In some embodiments, an OOP project model may also be used to enforce the scope of OOP objects and functions.

In a manner similar to that explained above regard transforming business application data structures into OOP structures, the exemplary architecture shown in FIG. 7C may be used to implement a system that also transforms a sequence of business application operations (e.g., business application rules or schemas), into object-oriented language constructs. In the architecture shown, object-oriented tool 790 may include a customized rule editor/viewer (not shown) as part of an integrated development environment for an SAP R/3 system, presenting easy to understand, use, and navigate user interfaces, such as the examples shown in FIGS. 17 and 25. As explained further elsewhere in this application, the OOP constructs representing the business application rules and schemas may be modified, changed, optimized, etc. using OOP language tools, and then reverse transformed back to the business application format and the run in the business application.

As with data structures (e.g., configuration data) and operations (e.g., rules) in business applications, the relationships or links between business objects, such as business data and business operations, are also typically table-based, making the relationships difficult, at best, to discern statically. For example, as illustrated in FIG. 3, the relationships between configuration data 305 and business rules 310 may not be realized until runtime. This makes it difficult for users and administrators to detect errors in the relationships, such as missing business data that is referred to by other data or a business rule, especially when working with the tables at any time other than run time.

Methods and systems consistent with the invention transform business application relationships or links into OOP constructs that represent the relationship, tying together different types of business objects, such as data and operations, in an easily comprehensible and manageable manner, and in a manner that allows automated OOP tools to check the integrity of the relationships. In one embodiment, an automated system uses an object-oriented language construct, such as an assignment operator (e.g., "=" in Java), to link together OOP objects representing business data and business operations. The object-oriented language construct binds different OOP objects representing business application objects and shows and enforces a relationship between them. For example, as shown in the exemplary implementation of FIG. 7A, the processing class objects 798 of a wagetype object may be related to processing class value objects, and these relationship are represented by the Java assignment operator "=." The processing class object "WageType_s123.ProcessingClass03," for instance, is linked to the value of the business object "processingclasses.ProcessingClass03.Value0" by the equality operator "=."

Figure 27:
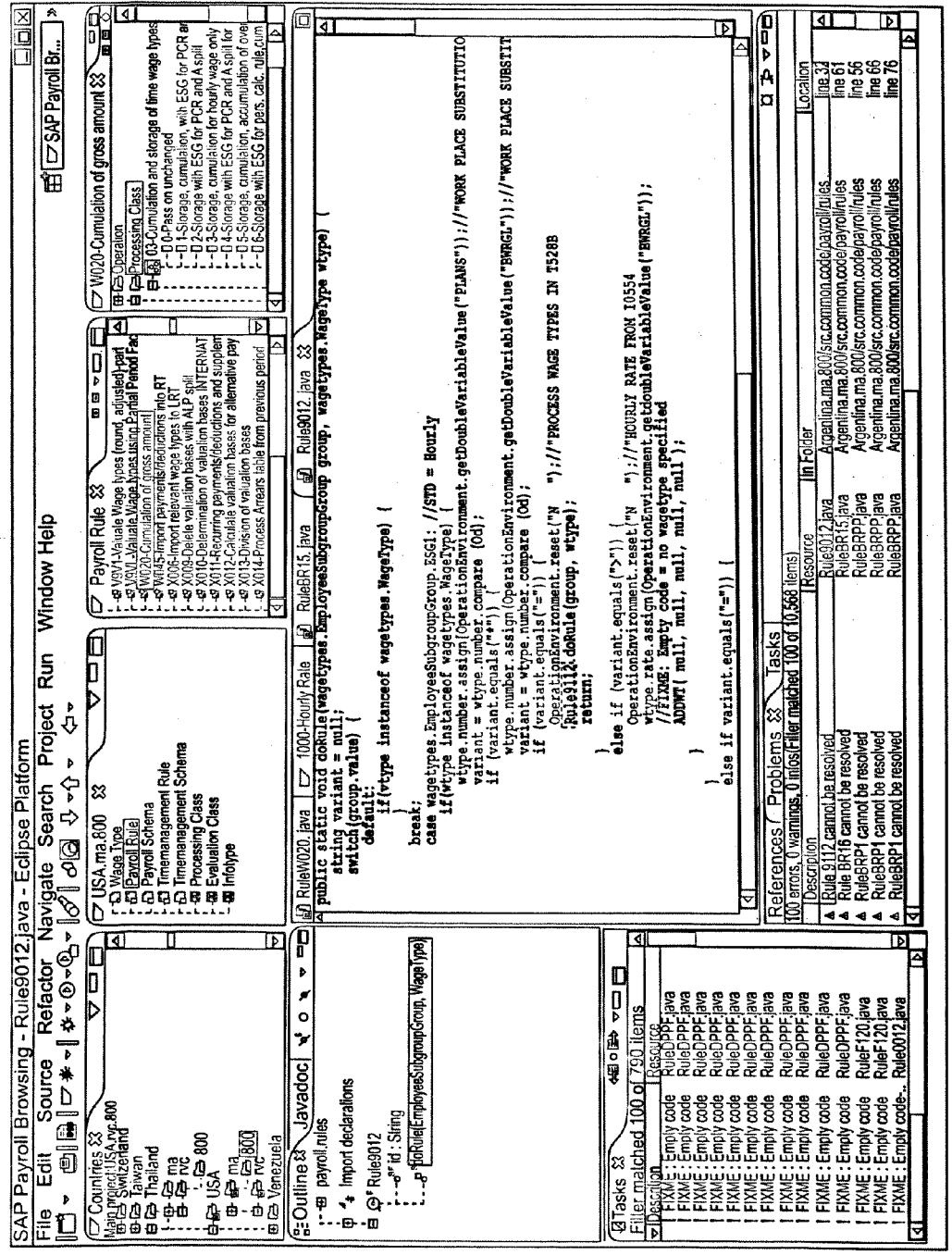

Other business objects may also be linked. For example, a business rule object may be linked to a wagetype object that it affects. For instance, as shown in the example of FIG. 27, a variable object in a rule may be linked to a wagetype processing class attribute, with that link represented by an assignment operator.

Representing the business object relationships as OOP language constructs, such as an assignment operator like "=," allows the use of a OOP language tool, such as a Java debugger, to walk through referential relationships and discover referential problems in the integrity of the business application layer. For example, as shown in FIG. 7A, if the value of processingclasses.ProcessingClass03.Value0 is not defined, then the compiler will flag a reference error when it processes the equality operator in the statement "WageType_s123.ProcessingClass03=processingclasses.ProcessingClass03.Value0." Thus, when trying to resolve the assignment operator relationship, a Java compiler will be able to identify broken links or references, which represent empty links in the corresponding modeled business application. Consequently, for an instance of wagetype, for example, a user can see from the Java code model what values are acceptable for each processing class. The model also lists exactly which processing classes are part of the wagetype, and thus any unlisted processing classes are not defined for that wagetype (and so not allowed). The assignment operator and processing classes included in the wagetype OOP structure are examples of integrity checks for the business application.

Figure 8:
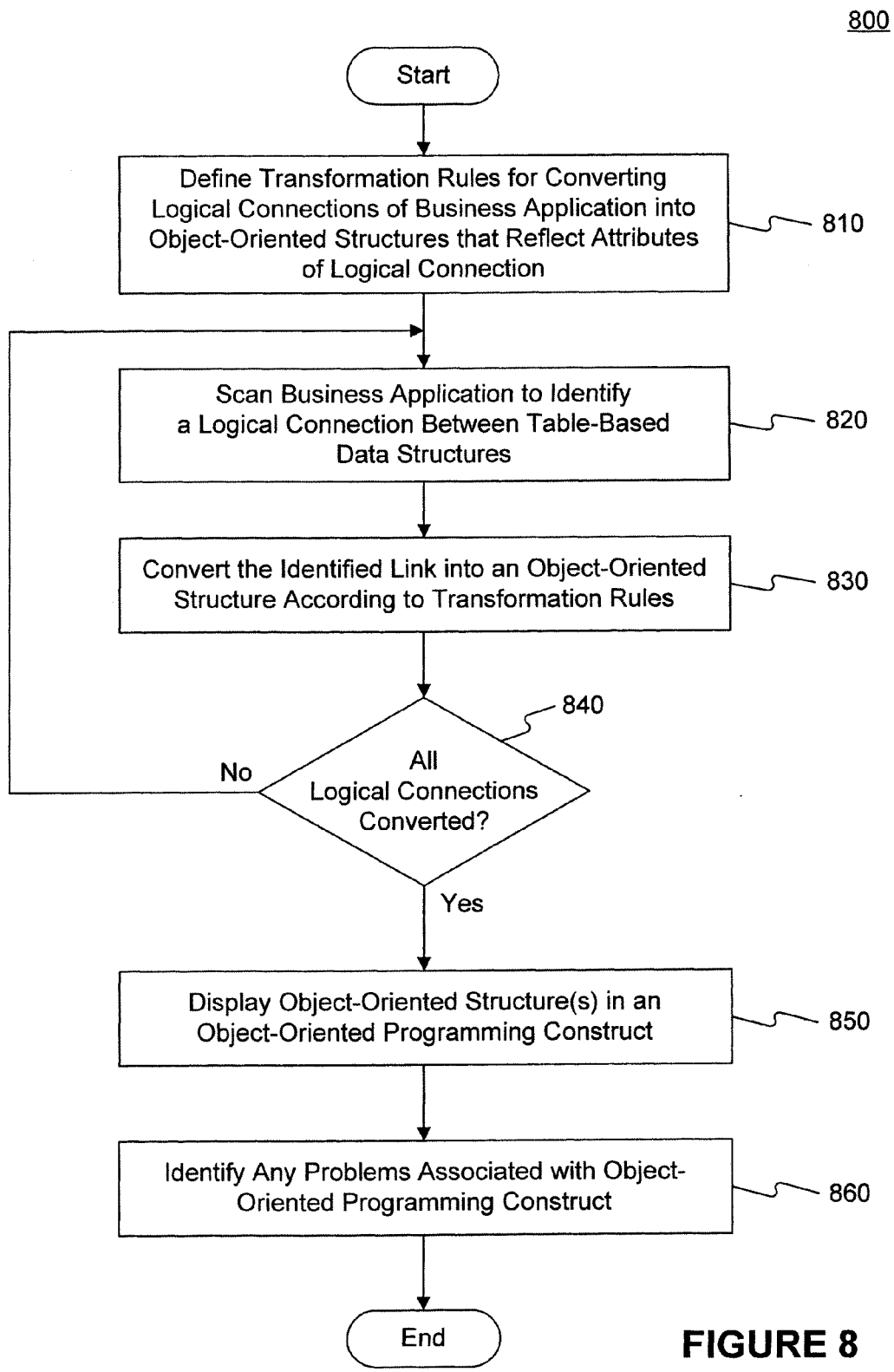
FIG. 8 illustrates an exemplary processes consistent with the present invention.

FIG. 8 illustrates an exemplary process consistent with the invention. As shown, the process may begin by defining transformation rules for converting logical connections from a business application into object-oriented structures that represent the logical connections (stage 810). Next, the process may scan a business application to identify a logical connection or link between table-based data structures or between table-based data structures and rules (stage 820). Next, the process may convert the identified logical connection or link into an object-oriented structure, according to the transformation rules (stage 830). In one embodiment, the transformation rules include using the equality operator of an OOP language as the object-oriented structure. In some embodiments, the transformation rules are defined manually according to criteria similar to that described for transforming business structures and business rules.

The process may then determine whether all the logical connections or links in the business application have been converted into object-oriented structures (stage 840). If not (stage 840, No), the process may loop back and continue to identify and convert logical connections. If so (stage 840, Yes), then the process may display the object-oriented structures as an object-oriented programming construct, such as an assignment operator, between related business data and/or business operation representations (stage 850).

In the exemplary embodiment shown, the process may then identify any problems associated with the object-oriented structure, such as an unresolved reference or other integrity problem (stage 860). Such problems may be identified by convention OOP language tools, such as compilers and linkers. Any such problem represents a problem in the corresponding business application structures and relationships, and the OOP language constructs model the relationships and behaviors of the business application from which they are derived.

As with data structures (e.g., configuration data) and operations (e.g., rules) in business applications, the relationships or links between the business data and business operations are typically table-based, making the relationships difficult, at best, to discern with the table-centric views and tools provided by a typical business application system. For example, as illustrated in FIG. 3, the relationships between configuration data 305 and business rules 310 may not be realized until runtime, making it difficult for users and administrators to comprehend, manage, create, revise, and debug such relationships, especially by working with the static tables before runtime. In another example, a single business rule may be stored in multiple tables. To determine all of the configuration data used by such a business rule, it may be necessary to study all of the multiple tables storing the rule. This process can be time-consuming and error-prone, just to understand the relationship between a business rule and the data on which it operates.

Embodiments of methods and systems consistent with the present invention transform business application objects and relationships into object-oriented programming constructs, making it possible to display business objects and their relationships in an easily comprehensible and manageable manner.

Using processes described above, an object-oriented model may be generated to represent a table-based business application. The object-oriented model may represent logical entities of the business application, such as rules, configuration data, and schema. The model may also represent links between the logical entities. In this way, object-oriented tools and graphical user interfaces may be used to display the links between the logical entities of the business application.

Figure 31:
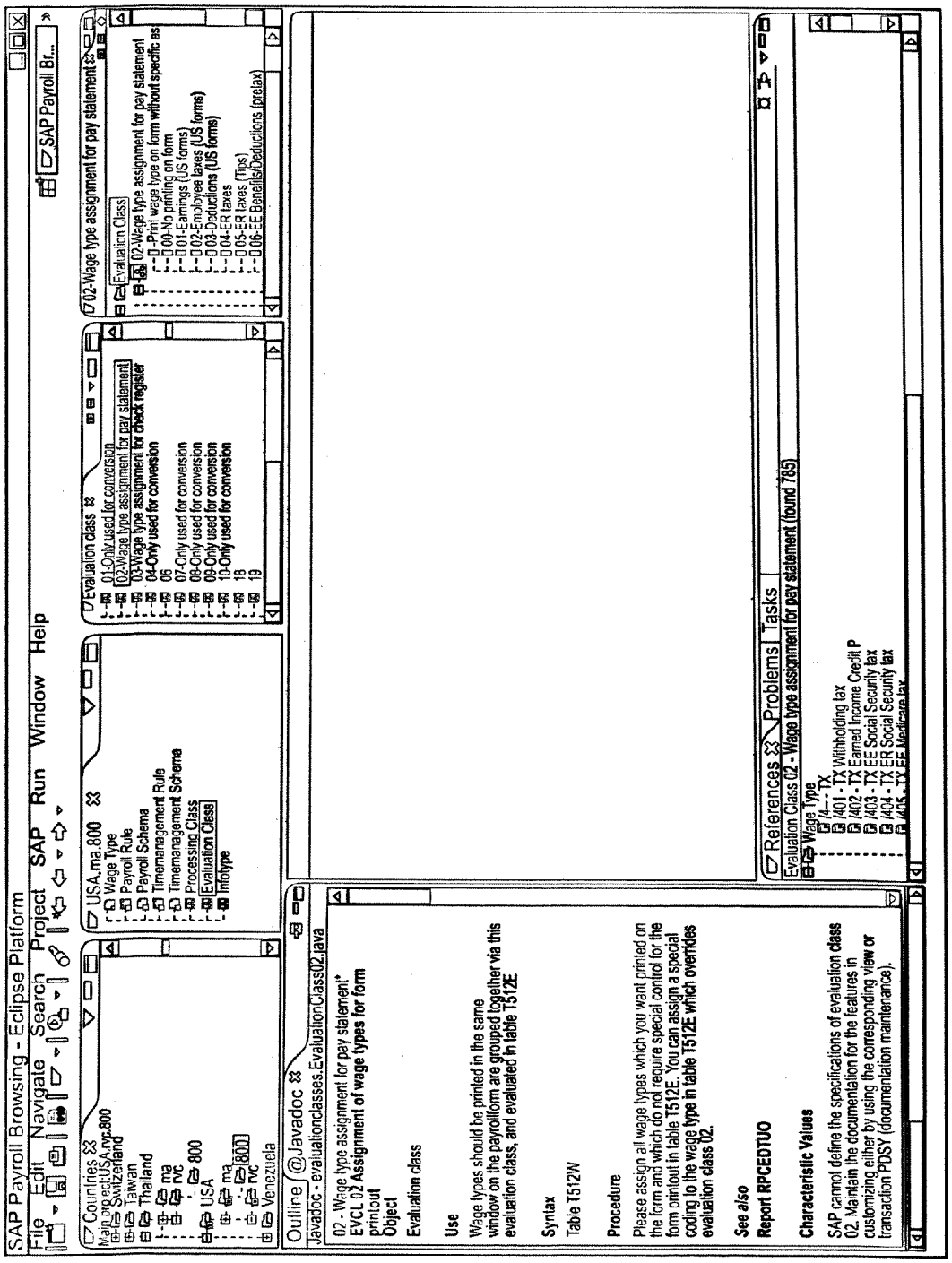

For example, as shown in FIG. 31, a user may select a business object such as an evaluation class, e.g., evaluation class 02, "Wage type assignment for pay statement." This business object may be chosen from a menu of available evaluation classes, as shown in the upper center right panel with the tab labeled "Evaluation Class." By processing the object-oriented model of the business application using common object-oriented tools and methods, all business application objects that reference evaluation class 02 may be determined and displayed. For example, the referencing objects may be displayed in a list of References, as shown in the bottom right hand pane with the tab labeled "References." A total number of referencing objects may be calculated and displayed, such as "(found 785)" in the bottom right hand pane with the tab labeled "References."

Thus, a user may easily see all the business objects that depend upon or are somehow related to the selected business object and gain awareness of the scope of objects in the business application that may be affected by a change to the selected business object. By using an object-oriented model of the complex, table-based business application, relationships not previously understandable may now be easily determined and displayed.

In another embodiment consistent with the invention, an outline may be generated and displayed to expose the structure of business objects within a business application. For example, in FIG. 17, a single integrated display shows information pulled from an R/3 system in a Javadoc displayed in the lower left pane. This information includes, for example, a name of a business application object (e.g., payroll.schemas), a use of the business application object (e.g., "This function retrieves employee health plan benefit information . . . "), business application syntax for the object (e.g., Fkt Par1 Par2 Par3 Par4), and an explanation of the parameters.

This information may be displayed simultaneously with an object-oriented model of the business object. In the lower right pane of the single integrated display shown in FIG. 17, pseudo-Java code is displayed that represents payroll.schemas as an object-oriented package. Drop-down lists and pop-up windows may be displayed with the integrated display to provide more information. For example, the information from R/3 shown in the lower left-hand pane may also be shown in a pop-up window over the object-oriented pseudo-code when a user selects a certain part of the object-oriented structure.

In these ways, methods and systems consistent with the present invention use object-oriented models and tools to determine and display the relationships between logical entities in a table-driven business application.

Processing a Model of a Business Application

The following sections describe exemplary embodiments for processing a model of a business application. While the description below provides headings.

Exposing Deprecated Entities

Business applications often involve large, complex legacy systems. Over time, these systems evolve to accommodate changing business rules, user needs, etc. Each change to a business application may affect many logic entities within the business application. For example, changing a processing rule may result in another logic entity, such as configuration data, that is no longer used by the business application. However, because the business application is large and complex, the user making the change may be unaware that the logic entity is now unused and could be deleted. Instead, the unused logic entity remains in the business application even though it is never again used.

As time passes, a business application may develop a great deal of unused, or "deprecated" logic entities, including configuration data and processing rules. Traditional table-based business applications do not have a mechanism for identifying or removing deprecated logic entities. This results in wasted storage space and unnecessary programming complexity associated with conventional business applications.

Using methods and systems consistent with the present invention, deprecated logic entities of a business application may be identified using an object-oriented model of the business application. By transforming business application structures into object-oriented structures, deprecated logic entities in the business application may be exposed using object-oriented referential integrity checking.

For example, an object-oriented code compiler checks syntax and identifies potential problems, such as mixed data types, broken references, etc. Because a compiler does not actually run the code, it can be used to analyze an object-oriented model consistent with the present invention. The potential problems identified by the compiler in the object-oriented model may correlate to deprecated logic entities in the business application. These potential problems may be marked in an integrated configuration environment to indicate deprecated logic entities that could be removed to streamline the corresponding business application.

Each logic entity in a business application may be transformed into a corresponding object-oriented structure. An object-oriented compiler may then be used to check the referential integrity of the object-oriented structures. Although the object-oriented compiler thinks it is finding problems, such as broken references, in object-oriented code, it is actually identifying problems in the underlying business application. For example, the object-oriented compiler may identify a reference to a branch of code that will never be executed. By correlating the identified branch of code with its corresponding logic entity in the business application, a deprecated logic entity is identified. In one embodiment, deprecated logic entities may be removed from the business application after they have been identified using the object-oriented model.

In one example, a business application logic entity, such as "wagetype," may not be defined in the business application for a certain country such as New Zealand. However, "wagetype" cannot be deleted from the business application altogether because it is defined for other countries. During transformation, the object-oriented structure corresponding to wagetype in New Zealand may be created but marked as deprecated to indicate that it is unused in the underlying business application. Deprecated structures may be marked, for example, using yellow underline in displayed object-oriented programming language. Yellow might be used because the deprecated structure is not an error that needs to be fixed (which might be shown in red). In this way, a user viewing the object-oriented structure is alerted to deprecated structures in the business application and can more readily study the effects of changes.

Figure 9:
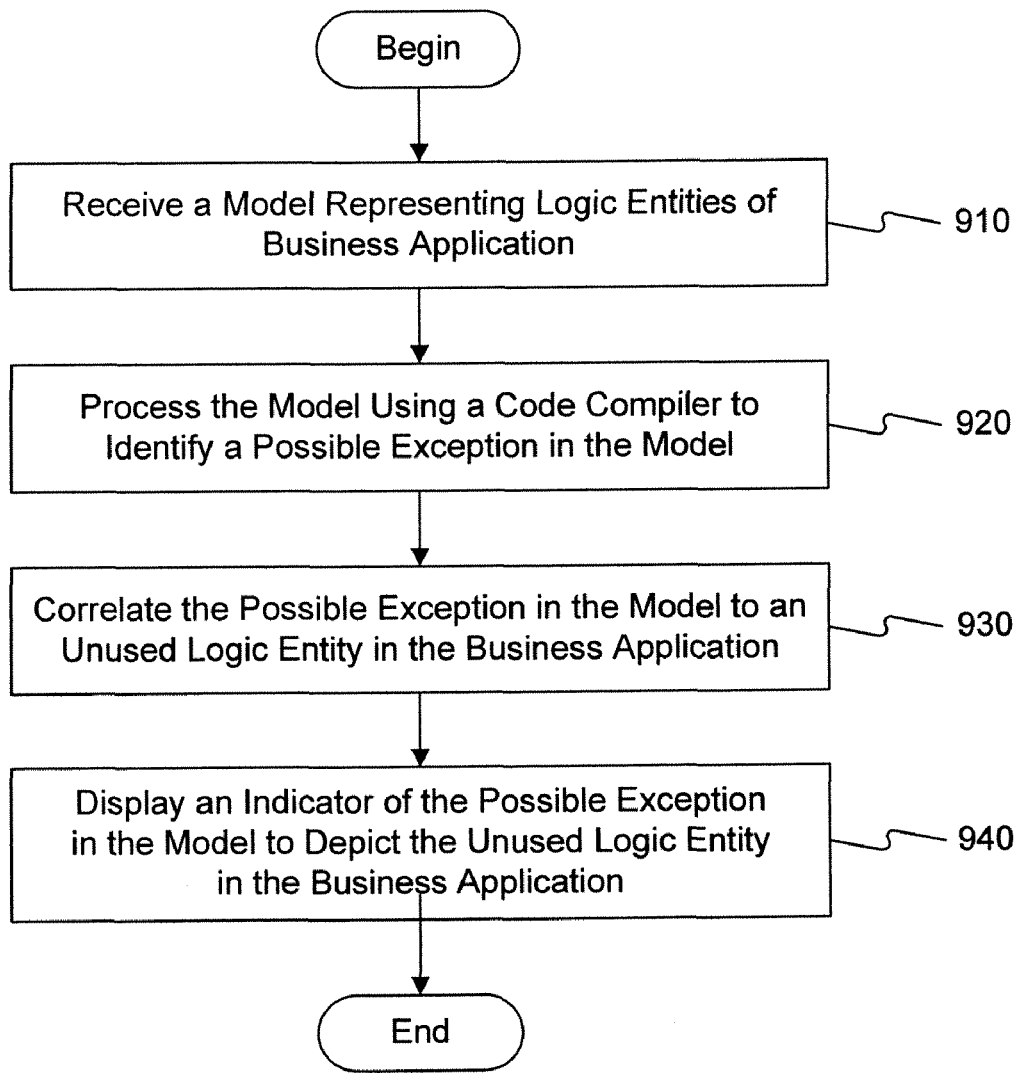
FIGS. 9 to 15 illustrate exemplary processing tool operations consistent with the present invention.

FIG. 9 is a flowchart of a method for exposing deprecated business application logic entities using an object-oriented model. In this embodiment of the present invention, a model representing logic entities of the business application is received (step 910). As discussed above, the model may be, for example, in an OOP format. The model is processed using a code compiler, such as an object-oriented code compiler, to identify a possible exception in the model (step 920). The possible exception in the model is correlated to an unused logic entity in the business application (step 930), and an indicator of the possible exception may be displayed with the model to depict the unused logic entity in the business application (step 940).

For example, a code compiler may identify a dead pointer in an object-oriented model of business application logic entities. The dead pointer may correlate to an obsolete rule (e.g., a repealed or expired tax) in the business application. When the model is displayed in an integrated configuration environment, the corresponding object-oriented code structure may be underlined or highlighted or otherwise marked to indicate the deprecated business application logic entity. Other possible exceptions include orphans, cost structures that do not exist, outdated regulations, expired taxes, etc.

One example of a display consistent with the present invention may be found in the screen shot shown in FIG. 25. A business application rule, "W020—Cumulation of gross amount," is displayed using an object-oriented model in a large window of a single integrated configuration display. To the right side of the large window is a series of rectangular flag markers indicating possible problems identified by a code compiler applied to the object-oriented model. When the cursor is placed over a flag marker, a pop-up box may be displayed reading, for example, "RuleWRFI cannot be resolved." This may indicate to a user that the business application logic entity corresponding to the object-oriented model may be deprecated.

Refactoring

Modifications made to a business application can make an already complex system even more unwieldy to understand and maintain. These difficulties are compounded by the fact that table-based business applications do not allow the use of design techniques available in other types of systems. Refactoring is a programming technique for improving the design of existing software code without altering the code's behavior. Refactoring may improve code by, for example, consolidating many statements into one, decomposing long methods into shorter ones, eliminating redundancies, etc. Refactored code may be easier to read and understand, simpler to debug, and more efficient to run and maintain.

Systems and methods consistent with the present invention enable the use of refactoring to reorganize the configuration of a business application. By transforming business application structures into object-oriented structures, object-oriented refactoring tools may be used to retool the underlying business application.

Program refactoring tools may be applied to object-oriented structures to edit the structures without affecting their behavior. Refactoring may be a recursive process, taking several passes through a structure or code section in order to optimize and improve it. Refactoring might be performed on an ongoing basis to maintain code and structures, or it might be applied for a specific purpose, such as preparing an application for a major upgrade.

Using this invention, any number of object-oriented refactoring tools may be applied to the business application through application to an object-oriented model of the business application. These tools might include:

(1) Rename refactoring: This function enables the renaming of any package, class, method or variable, and automatically finds and corrects all references to it. By applying the rename tool to the object-oriented model, the tables and references in the underlying business application may be better organized or named.

(2) Extract method refactoring: This function analyzes a selected piece of code and transfers it into a separate method in order to aid program modularization and break code into manageable pieces. By applying the extract method tool to the object-oriented model, the underlying business application may be better organized and easier for users to understand.

(3) Inline variable refactoring: This feature replaces all references of a variable with a declaration expression, then deletes the older variable text. This can save time and effort when rearranging code or introducing upgrades, such as new tax laws or new employees. By applying the inline variable tool, the business application may be updated with a minimum of potential referencing errors.

(4) Clean imports refactoring: This function allows a user to scan code in order to find and remove unnecessary import statements. Applying this tool may assist with identifying and cleaning up superfluous elements in the underlying business application.

A skilled artisan will recognize that these and may other refactoring tools and methodologies may be applied to the object-oriented structures in order to effectively refactor the corresponding business application.

Using methods and systems consistent with the present invention, each logic entity in a business application may be transformed into a corresponding object-oriented structure. An object-oriented refactoring tool may then be used to refactor the resulting object-oriented structures. The refactoring tool will improve the object-oriented structures by, for example, consolidating many statements into one, decomposing long methods into shorter ones, eliminating redundancies, etc. However, the operation of the code will not be affected. Once refactoring of the object-oriented code is completed, the object-oriented code may be translated back into its corresponding business application logic structures. In this way, the business application will reflect the improvements made by refactoring the object-oriented code.

Figure 10:
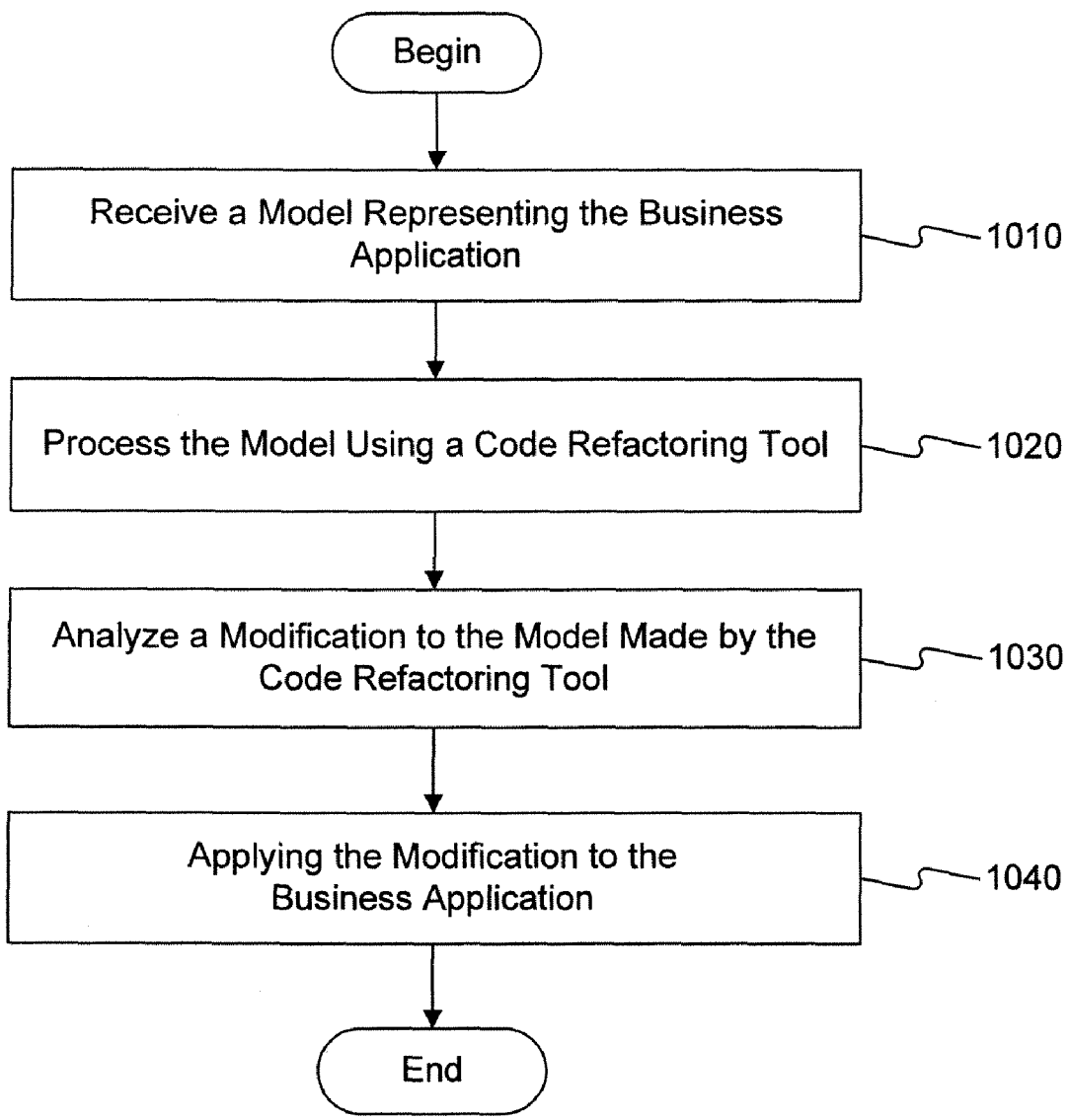

FIG. 10 is a flowchart showing an exemplary method for redesigning a business application composed in a first programming format consistent with an embodiment of the present invention. When a model representing the business application in a second programming format is received (step 1010), the model may be processed using a code refactoring tool in the second programming format (step 1020). In one example, the first programming format may be a table-based format, such as R/3, and the second programming format may be an object-oriented programming format, such as JAVA™.

Modifications to the model made or suggested by the code refactoring tool may then be analyzed (step 1030). Modifications suggested by the code refactoring tool may include, for example, removing redundant code, renaming variables or methods, breaking large routines into shorter ones, etc. Each modification may be analyzed before it is accepted, or modifications may be party or fully automated. After the modifications are accepted and/or applied to the object oriented model, the object-oriented code may be translated back into its corresponding business application logic structures to propagate the changes into the business application, thus effectively refactoring the business application itself. In this way, refactoring modifications may be applied, in the first programming format, to the business application (step 1040).

In one example, the code refactoring tool includes removing redundant code of the model in order to remove redundant code in the corresponding business application. In another example, the code refactoring tool includes consolidating many statements into one, which may in turn streamline the corresponding business application. In yet another example, the code refactoring tool includes decomposing long methods into shorter ones, making the corresponding business application easier to understand and work with.

Runtime Errors

Given the complexity of a business application, each change made to it may affect many logic entities within the business application, resulting in errors that may not be apparent until runtime. For example, changing configuration data related to a project may result in a call to a processing rule that does not exist for that project. However, because the business application is large and complex, the user making the change may be unaware that the call will result in an error during configuration. Instead, the user may not realize the error until runtime, when it is costly and time-consuming to correct. Traditional table-based business applications do not have any simple mechanism for identifying or removing runtime errors at design time.

Using methods and systems consistent with the present invention, runtime errors in a business application may be identified prior to runtime using an object-oriented model of the business application. By transforming business application structures into object-oriented structures, runtime errors (such as unresolved references) in the business application may be exposed using object-oriented referential integrity checking.

Each logic entity in a business application may be transformed into a corresponding object-oriented structure. An object-oriented compiler or debugger may then be used to identify errors, such as syntax errors or broken references, in the object-oriented structures. Although the object-oriented compiler thinks it is finding problems in object-oriented code, it is actually identifying problems in the underlying business application. For example, the object-oriented debugger may identify a reference to a branch of code that does not exist. By correlating the identified branch of code with its corresponding logic entity in the business application, a problem with dependencies in between business application structures may be identified. In one embodiment, a user may correct the problems in the object-oriented code and translate the corrections back to the business application before running the business application.

A runtime error in the business application may be, for example, calling a rule that does not exist for a project, such as a country, or attempting to create a wagetype that does not exist for a project, such as a country. In one embodiment, when business application structures are transformed into object-oriented structures, a referential error might be revealed by a class that is declared but empty. These errors, once identified using the object-oriented model, may be displayed using, for example, red underline to show that runtime errors will occur in the business application. The identifier may be propagated up through a number of user interfaces to show potential problems at any level of the system.

Figure 29:
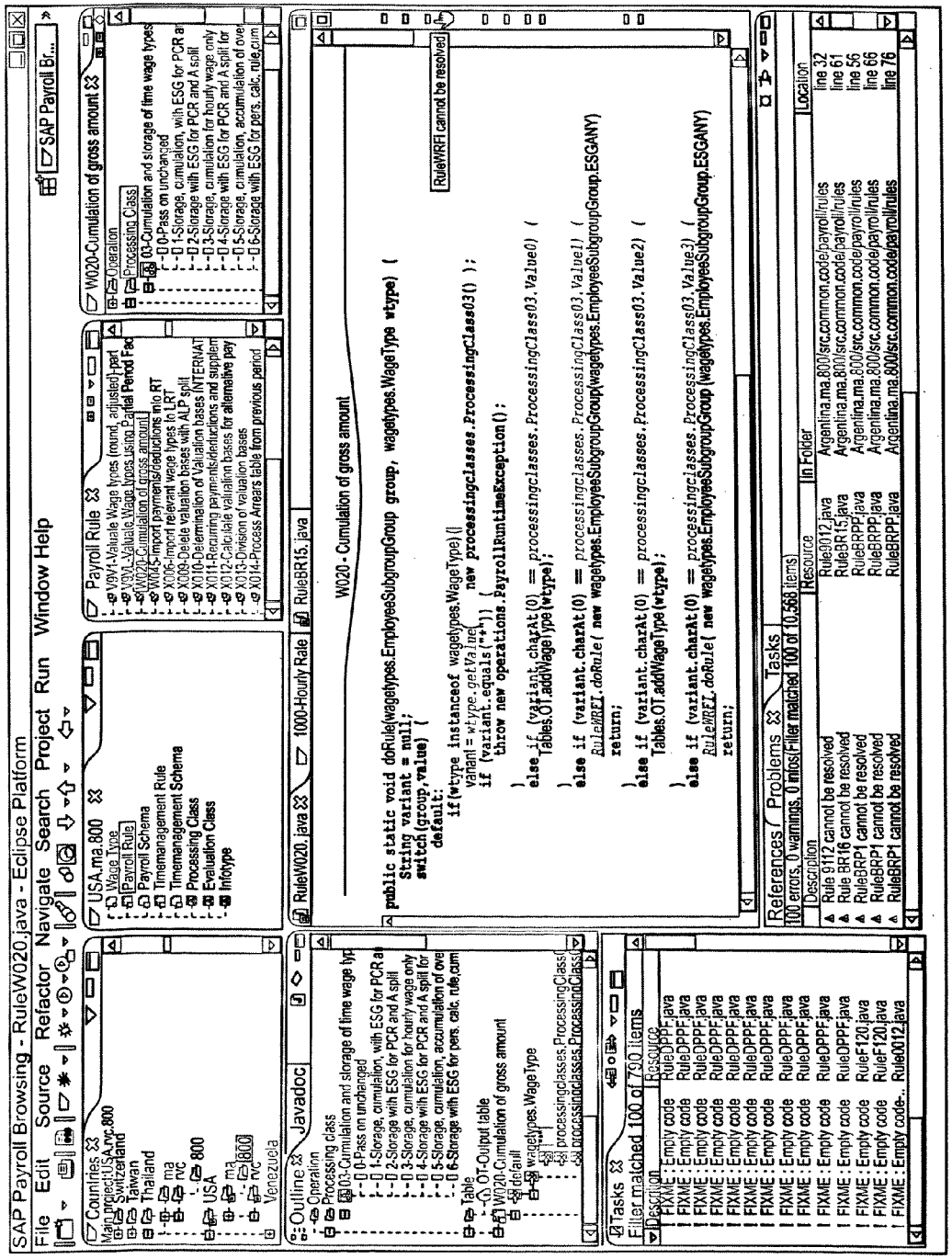

A sample screen shot of how potential errors may be displayed is included in FIG. 29. In the integrated configuration environment of FIG. 29, a business application rule, "W020—Cumulation of gross amount," is displayed for project USA.rna.800 using an object-oriented model in a large window. To the right side of the large window is a series of rectangular flag markers indicating possible problems identified by a code debugger applied to the object-oriented model. When the cursor is placed over a flag marker, a pop-up box may be displayed reading, for example, "RuleWRFI cannot be resolved." This may indicate to a user that the business application logic entity corresponding to the object-oriented model has a potential runtime error. The display also includes a list of problems (e.g., "Rule 9112 cannot be resolved") in the lower right portion. The problems may be further displayed up the hierarchy of menus using, e.g., a red "X" to show the problem in the list of Payroll Rules, the list of logic entities within project USA.rna.800, and the list of all projects. By propagating the error flag up the menu hierarchy, users may be alerted of many potential runtime errors quickly and effectively.

In traditional table-based business applications, a log file may be created to trace the path of processing during a sample run (e.g., a payroll run) of the business application. The log file may note errors present in the business application. However, the log file is typically long and difficult to debug. By using object-oriented programming constructs, debugging is greatly simplified. The sequential view of a log file is replaced by an object-oriented data representation view that is familiar to developers today. In this way, the same data used for debugging may be presented in a much more user-friendly fashion. In one embodiment, the debugging may be performed offline, increasing efficiency and flexibility of maintaining the business application.

Figure 11:
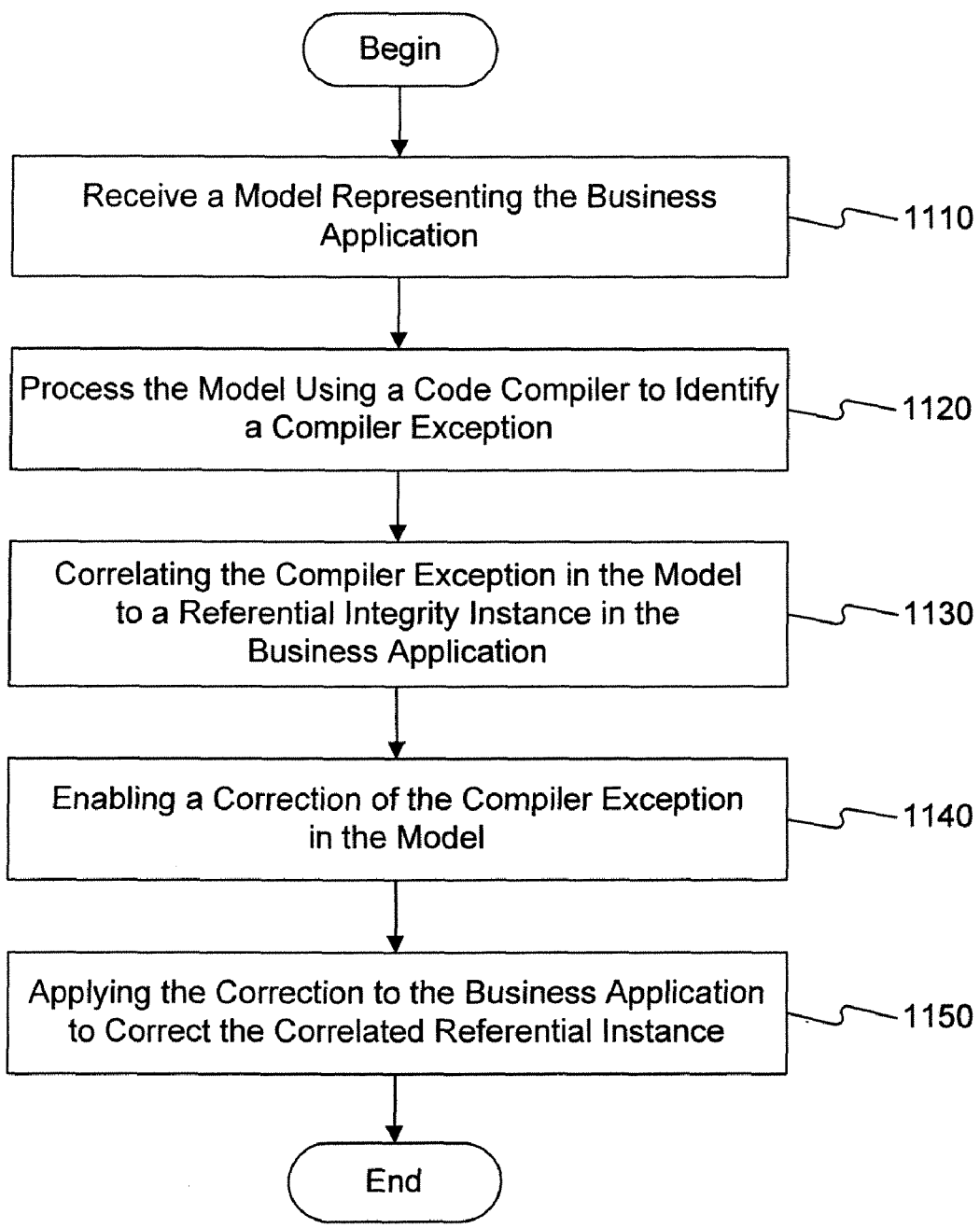

FIG. 11 is a flowchart for a process for analyzing referential integrity of a business application consistent with embodiments of the present invention. A model representing the business application may be received (step 1110) and processed using a code compiler to identify a compiler exception (step 1120). The compiler exception may be, for example, a broken reference, an infinite loop, etc. The compiler exception in the model may be correlated to a referential integrity instance in the business application (step 1130), and correction of the compiler exception in the model may be enabled (step 1140). Correction may be enabled through displaying flags or other indicators to call the problems to the user's attention and providing configuration tools via an integrated configuration environment. Finally, the correction to the business application is applied to correct the correlated referential instance (step 1150).

One skilled in the art will recognize that many different object-oriented code analyzers, including debuggers, interpreters, compilers, etc. may be used to identify possible runtime errors in the business application and that many different ways of marking and correcting these errors may be employed consistent with embodiments of the present invention.

Interactive Development Environment (IDE)

Business applications, such as the R/3 system created by SAP, often involve large, table-based systems and evolve over many years as businesses grow and change. Highly trained consultants may be employed to implement, configure, and maintain a business application for a company. Due to the complexity of traditional business applications, it may take years to configure an application for a single company. Because of their legacy nature and highly customized usage, business applications typically have limited development tools to assist in the configuration and maintenance of the applications.

To assist in the configuration and management of such business applications, systems and methods consistent with the present invention enable business application consultants to configure and maintain business applications using an interactive configuration environment that offers the simplicity and usability of an IDE.

An IDE is a set of tools available to assist a software developer in writing and maintaining software code. IDEs enable users to design and manipulate code, such as object-oriented code, in an easy-to-understand manner. An IDE may include multiple programs that are run from a single user interface. For example, programming languages often include a text editor, compiler and debugger, which are all activated and function from a common menu. Other IDE tools may include a version control system, GUI design tools, a class browser, an object inspector, and a class hierarchy diagram. IDEs are available for specific programming languages, e.g., the Visual Basic IDE, or for multiple languages, e.g., the Eclipse IDE.

An interactive configuration environment consistent with the present invention integrates and displays a table-based business application using a single, interactive display. For example, users can write a new business rule using familiar object-oriented code, and that code may be converted into logic entities to apply the new rule in the business application. In another example, users may view existing business applications using an IDE interface. In this way, users may not need to worry about the format or structure of the business application but may still be able to understand and configure it.

When business application structures are displayed using object-oriented code structures, the business meaning of the object-oriented code structures may also be displayed in the integrated environment. For example, when a user rolls a mouse over an item in the object-oriented code, documentation of the underlying business meaning may be displayed in a pop-up box. This aids the user in understanding a complex business application using familiar, easy-to-understand object-oriented programming constructs.

Using an object-oriented user interface, the user may browse business application logic entities and related objects using a single integrated display. Object-oriented code assists and templates may be available to assist users in writing new object-oriented code in order to add new logic entities to the business application. A template may consult a translation key to determine syntax, parameters, etc. and display these options in a drop-down list in the object-oriented code display. Using IDE tools, a state of the business application may be compared with a changed-state of the business application, for example, by using a side-by-side display.

Figure 12:
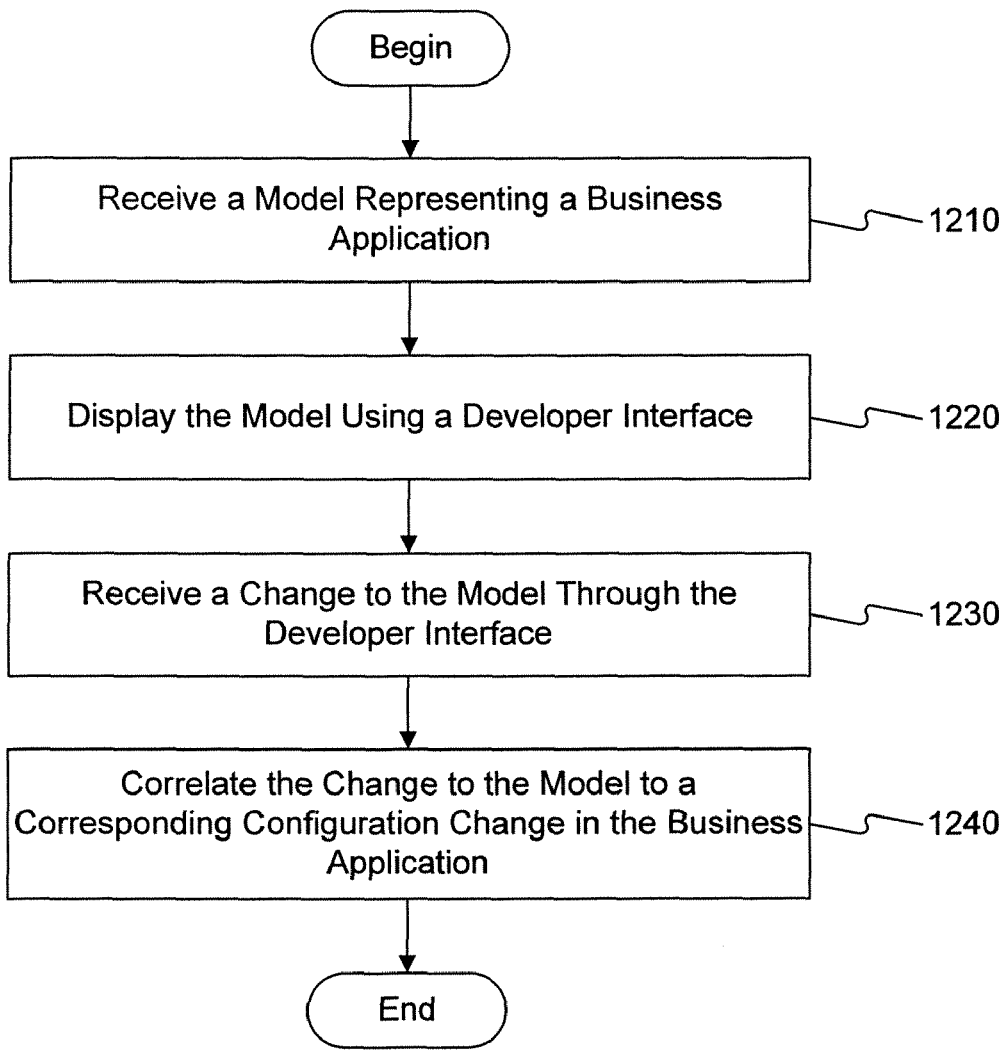

FIG. 12 is an exemplary flowchart of a method for analyzing the configuration of a business application consistent with embodiments of the present invention. When a model representing the business application is received (step 1210), the model may be displayed using a developer interface (step 1220). The model and corresponding business application may be integrated and displayed using a single, dynamic display, e.g., the integrated configuration environment shown in FIG. 17. The integrated configuration environment may include, for example, a series of windows displaying business application entities as a hierarchy of projects, rules, and schema. The environment may also include an object-oriented model of a business application object displayed together with documentation pulled from the business application.

When a change to the model is received through the developer interface (step 1230), the change to the model may be correlated to a corresponding configuration change in the business application (step 1240). The corresponding configuration change may be applied to the business application or it may simply be used to model possible changes.

For example, a consultant may wish to modify a rule in the business application. Rather than analyzing the table-based structure of the business application to determine the tables that hold different parts of the rule, the consultant may use the integrated configuration environment to edit the rule using its object-oriented model counterpart. As part of the integrated configuration environment, the proper syntax or available parameters may be automatically displayed to assist the consultant in making his edits. Once the edit is complete in the object-oriented model, the change may be translated back to the underlying business application and automatically applied, e.g., to the many tables that hold different parts of the rule.

In another example, a consultant may wish merely to determine the effects that a potential change to the business application would have. Using an object-oriented model of the business application, the consultant could try out the potential change by applying it in the integrated configuration environment to see what the effects would be if the change were committed back to the business application.

A skilled artisan will appreciate that many other configuration tools would be made available to users of a business application by displaying and manipulating an object-oriented model of the business application using an integrated configuration environment consistent with the present invention.

Checking Validity of Business Applications

As described above, business applications often involve large, complex legacy systems. Over time, these systems evolve to accommodate changing business rules, user needs, etc. Each change to a business application may affect many logic entities within the business application. Furthermore, changes to the business application can make an already complex system even more difficult to maintain. These difficulties are compounded by the fact that table-based business applications do not allow the use of design and optimization techniques available in other types of systems.

For example, changing a processing rule may result in another logic entity, such as configuration data, being inconsistent with underlying business logic. However, because business applications are large and complex, the user making the change may be unaware that the logic entity now contains a logic structure error. Traditional table-based business applications do not have a mechanism for identifying or optimizing inconsistencies in underlying business logic. Thus, many problems, such as broken or circular links in logic entities, may be undetected in the business application.

A number of well-known programming techniques may be used to optimize the design of existing software code without altering the code's behavior. For example, a software debugger, such as Validity Check, True Time, or Bounce Checker may improve code by testing it and modifying the values of variables where necessary. Optimized code is generally easier to read and understand and more efficient to maintain.

Methods and systems consistent with the present invention enable the use of known software tools, such as debuggers, to optimize the configuration of a business application by eliminating inconsistencies in underlying business logic of the business application. In one embodiment, each logic entity in a business application may be transformed into a corresponding object-oriented structure. An object-oriented language tool, such as a compiler, may then be used to check the structural consistency of the object-oriented structures and flag identified logic structure errors. Although the object-oriented language tool literally identifies problems, such as broken links, in object-oriented code, it also identifies problems in the underlying logic of a business application because the code models the business application. For example, an object-oriented compiler may identify a circular reference within a branch of code. By correlating that branch of code with its corresponding logic entity in the business application, the inconsistent logic entity may be identified. In one embodiment, inconsistent logic entities in the business application may be corrected after they have been identified using the object-oriented model, and the model translated back into business application entities that will function in the business application system.

For example, a debugging tool will optimize the object-oriented structures, for example, by "repairing" circular links. However, the operation of the code will not be affected. Once correction of identified logic structure errors in the object-oriented code is completed, the object-oriented code may be translated into corresponding business application logic structures. As a result, the business application will reflect the improvements made by optimizing the object-oriented code.

Figure 13:
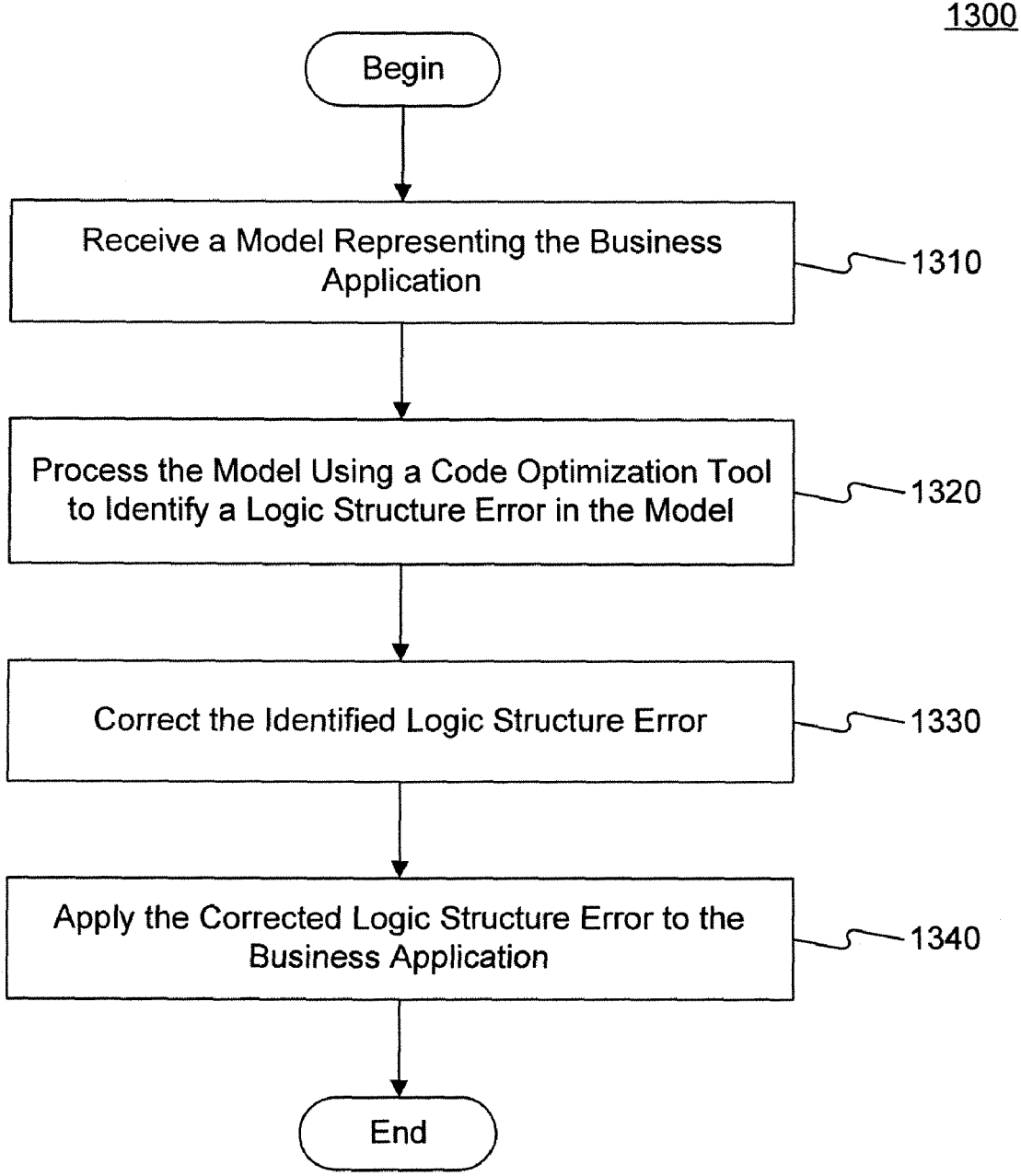

In one method consistent with the present invention shown in FIG. 13, a business application composed in a first programming format may be analyzed by receiving a model representing the business application in a second programming format (stage 1310) and processed by using a code optimization tool to identify logic structure errors (stage 1320). Identified logic structure errors may then be corrected (stage 1330) and applied in the first programming format, to the business application (stage 1340).

Using CASE Tools to Verify Business Application

As described above, business applications often involve large and very complex table-based systems. To configure and implement a business application, a company may need to employ highly trained consultants. Due to the complexity of traditional business applications, it may take years to configure an application for a single company. Business applications typically have limited range of development tools to assist in development of the business applications configuration.

Computer-aided software engineering (CASE) tools assist a software developer in developing and maintaining software code. CASE tools enable users to design and manipulate code, such as object-oriented code, in an easy-to-understand manner. For example, data dictionaries and diagramming tools aid developers in analyzing and designing software systems. In another example, application generators may assist in actual programming of a system. Other CASE tools may assist with data modeling, reverse engineering, simulations, etc. Though CASE tools are available to assist programmers in analyzing and designing traditional software systems, such generic tools are not capable of being applied to a large, legacy system that might be customized to suit the needs of a single company.

Systems and methods consistent with the present invention enable the use of CASE tools to analyze and verify the configuration of a business application. By transforming business application structures into object-oriented structures, object-oriented CASE tools may be used to verify the underlying business application configuration. For example, CASE-tool-generated diagrams representing business application layers may assist an architect of a business application in visualizing a matrix of a project. As a result, the architect of a business application may more efficiently design and optimize a business process. For example, such diagrams may help a user to identify an amount of wagetypes, and how those wagetypes are related. In another example, simulation or modeling CASE tools may be used to test the effects of potential configuration changes in a business application. In this way, CASE tools could be applied to assist a consultant in configuring a business application or verifying an existing business application configuration.

Systems and methods consistent with the present invention enable business application consultants to generate and analyze the structure of business applications using tools from a CASE environment. For example, a developer may use a Modified Modeling Language (MML) tool to build a high level diagram of a logic entity, such as a business object class.

By transforming business application structures into object-oriented structures, object-oriented CASE tools may be applied to generate similar business application structures. For example, a user can write a new business rule using familiar object-oriented code, and that code may be converted into logic business entities to apply the new rule in the business application. As a result, users may configure the business application without worrying about its native format or structure.

In some embodiments, when business application structures are displayed using object-oriented code structures, the business meaning of the object-oriented code structures may also be displayed. This aids the user in understanding a complex business application in the format of familiar, easy-to-understand object-oriented programming constructs.

Figure 14:
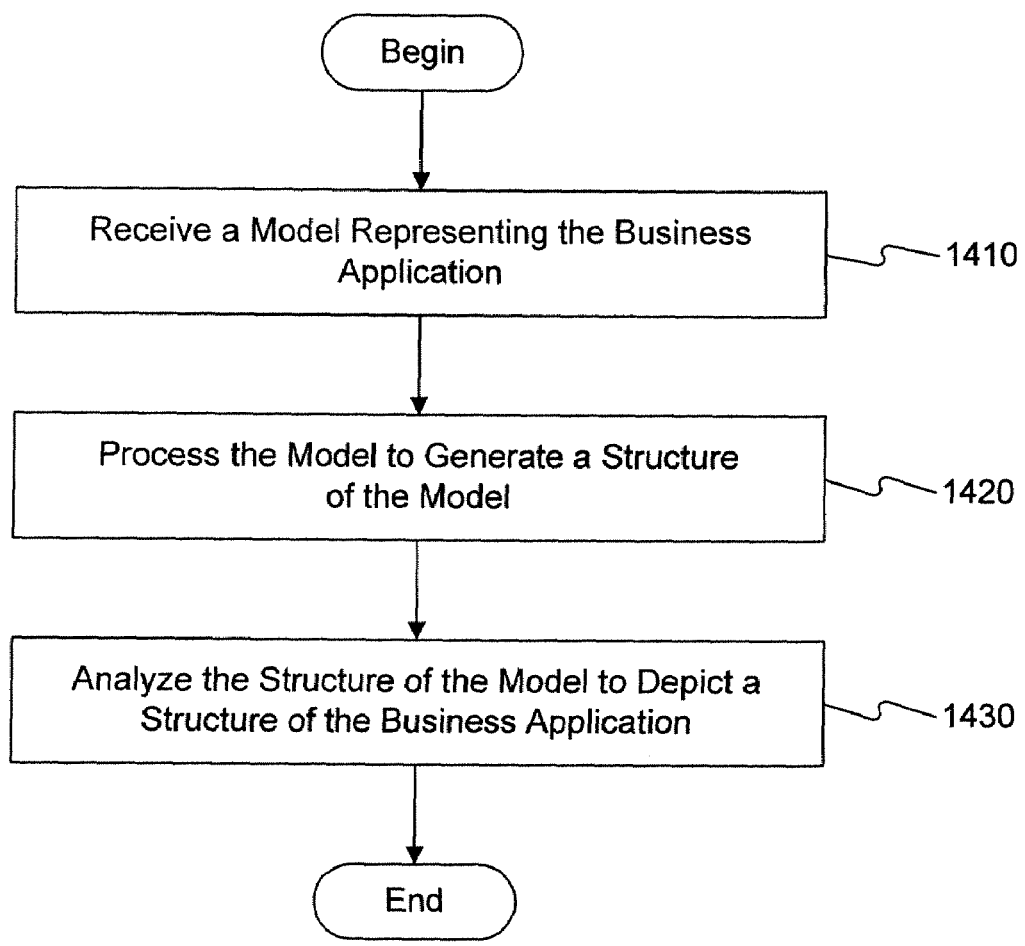

FIG. 14 is an exemplary flowchart of a process for analyzing and verifying an application configuration using CASE tools. In certain embodiments consistent with the present invention, a business application composed in a first programming format is analyzed by receiving a model representing the business application in a second programming format (step 1410). The first programming format may be, for example, a table-based format, and the second programming format may be, for example, an object oriented programming format. The model is then processed using CASE tools to generate its structure, including, for example, the structure of the business application configuration data and rules (step 1420). In another example, processing may include generating a diagram of the model's object classes which represent logic entities within the business application. The generated structure of the model may be analyzed to depict a structure of the business application (step 1430).

In certain embodiments, a table-based business application is represented by an object-oriented programming model. Because the model appears to contain object-oriented code statements, traditional CASE tools may be applied to it for a number of purposes, such as designing new structures (e.g., business application rules), testing proposed changes (e.g., a new tax category in the business application), and simulating a business application run (e.g., an end-of-month payroll run in the business application). Once these CASE tools have been applied to the object-oriented model, the results can be applied back to the business application to make appropriate modifications to the business application.

Comparing and Merging Business Applications

Large, complex legacy systems require almost constant updating and maintenance to keep up with the changing business environment. These changes may include, for example, software patches fixing technical glitches or improving the usability or the performance of a business application; new code to support changing business rules or evolving user needs, etc. For example, changing tax laws in one of the countries in a payroll business application may require changing many business rules within the application. Each change to a business application may affect many logic entities within the business application, possibly changing an outcome, for example, an amount of calculated payroll.

Traditional table-based business applications do not have any simple mechanism for modeling changes or identifying changes between different versions of a business application. A user attempting to compare two different versions of a business application and identify, for example, different tables or differences in a code, would have to compare each business rule separately, one by one. Because the business application is large and complex, this process may be extremely time-consuming and require a user with extensive training. Even then, small but important changes may be hard to recognize in a large table-based application.

Methods and systems consistent with the present invention allow a user to compare different versions of a business application using an object-oriented model of the business application. By transforming business application structures into object-oriented structures, such as object-oriented language constructs, individual differences between versions of the business applications may be identified and displayed to a user, for example, on a user interface.

To aid users in identifying differences between different versions of a business application, multiple versions of a business application configuration may be stored in a database, such as a configuration control database like CVS. Each version of a business application may be stored in a configuration control database as a transformed corresponding object-oriented structure.

Using methods and systems consistent with the present invention, to compare an updated version of the configuration of a business application with its previous versions, a user may extract the latest control version of an object-oriented model of the application from a configuration control database. Then, a user may extract the latest deployed version of a business application from a server database containing the deployed version of the business application, including recent updates, such as, for example, patches. The extracted deployed version may be transformed into a corresponding object-oriented structure. Finally, the user may extract a version of the business application including user-made current changes from the user's storage space. The object-oriented models of the business application may be capable of autonomous existence from the business application. Having all three versions represented in an object-oriented structure may allow a user to perform a three-way comparison between the object-oriented structure edited by the user and two retrieved versions copied from the configuration control database and the deployed server database.

Using methods and systems consistent with the present invention, a user may automatically compare all three versions of the business application model in a visually enabled mode by, for example, selecting a "Show Changes" button. As a result, business objects, for example, wage types, that differ between the three configurations may be displayed on an user interface marked with an icon to show where changes have been made. In one example, an icon may be shown to highlight each change and list values of the business object before and after the change.

Comparing the object-oriented structures of the model's three different versions, object-by-object, may allow a user to identify, for example, configuration data (e.g., wagetypes), business rules, schemas, and other logic entities where changes have been made. In each instance, a user may choose a value of the business object for preservation and subsequent storage as a new version of the business application model. Thus, as a result of the three-way comparison, a new version of the object-oriented structure may be created containing a user's chosen values for each business object.

When a user completes the three-way comparison and decision process, the newly-created version of the object-oriented model may be transformed into a newest version of the business application. That version may also be tagged as the "latest" and forwarded to a configuration control database for storage and/or to a target business system for deployment.

Figure 15:
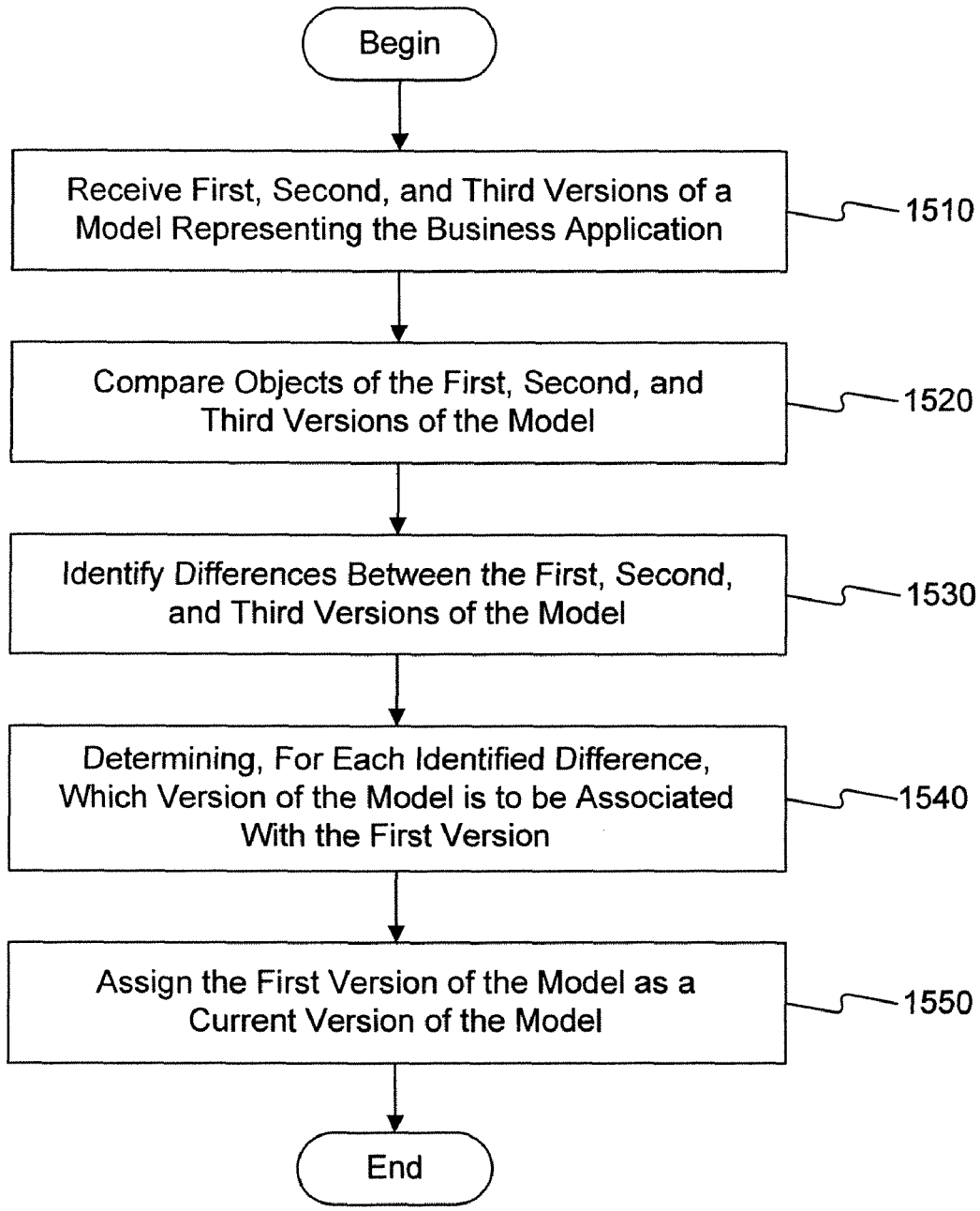

FIG. 15 is a flowchart of a process for comparing and merging versions of a business application using methods consistent with the present invention. A current version of a business application is determined by receiving a first version, a second version, and a third version of an object-oriented programming model representing the business application (stage 1510). The objects of each of the first, the second, and the third versions of the object-oriented programming model are compared (stage 1520) to identify differences between any objects in these models (stage 1530). For each identified difference, a determination is made as to which version of the model is to be associated with the first version of the object-oriented model (stage 1540). The first version of the object-oriented model is then assigned as the current version of the model (step 1550). Using methods and systems consistent with the invention, the current version of the model may be translated back into the business application format, thus creating a current version of the business application.

Customer Support

As described above, OOP language tools, such as compilers, analyzers, optimizers, etc. can be used to find errors or problems in the configuration model of a business applications. Such errors or problems may include errors in relationships, calls, interactions, design, etc. associated with the modeled null functions.

Figure 16:
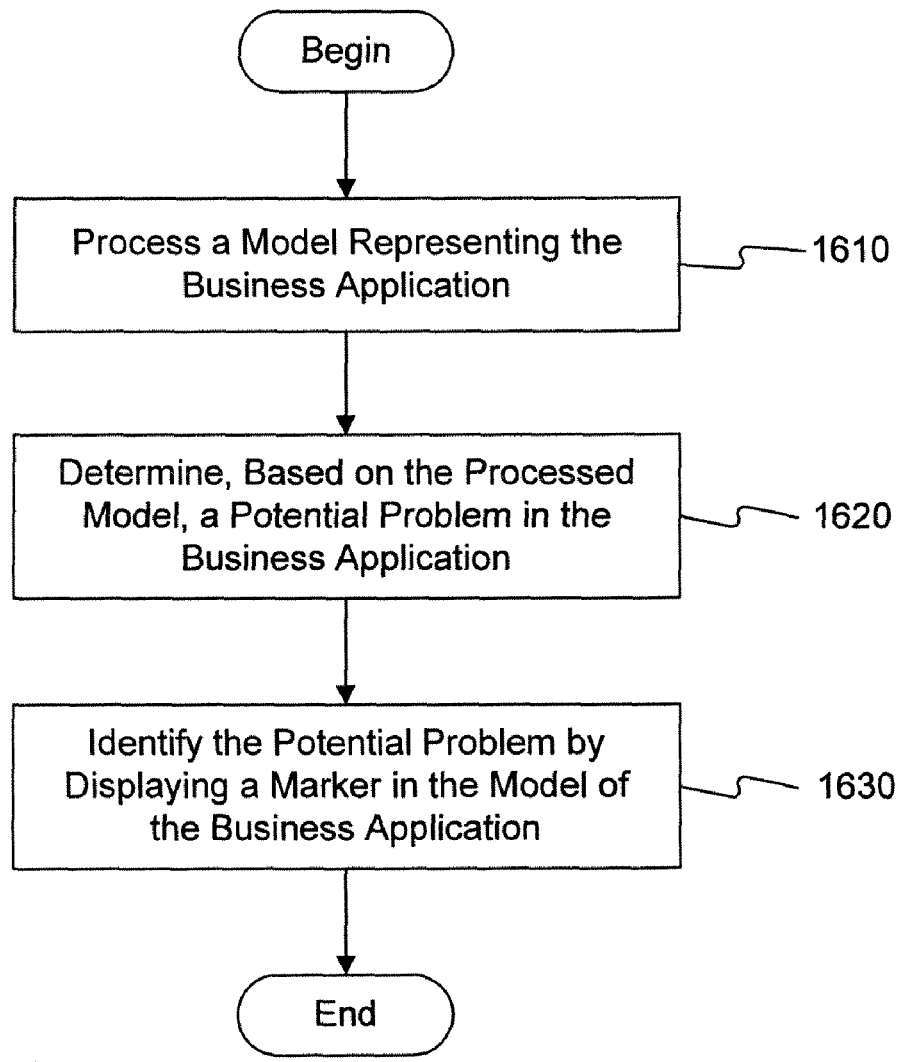
FIG. 16 illustrates an exemplary process consistent with the invention.

FIG. 16 is a flowchart of an exemplary process consistent with the present invention. As shown in FIG. 16, a model representing the business application composed in a second programming format is processed (stage 1610). Systems consistent with the invention may then determine, based on the processed model, a potential problem in the business application (stage 1620) and identify the determined potential problem by displaying a marker in the model of the business application (stage 1630). In exemplary embodiments, the marker may be displayed in the model at a location where the potential problem occurs. Furthermore, the displayed marker may be associated with information describing the determined potential problem.

User Interfaces

FIGS. 17 to 56 illustrate exemplary user interfaces consistent with the invention for enabling a user to process a model representing a business application, as described above with respect to FIGS. 1 to 16.

Consistent with methods and systems of the invention, a user interface displaying all the relevant information on one graphical and productive screen may be used. As shown in FIGS. 17 to 56, user interfaces consistent with the invention may enable a user to easily navigate within an object-oriented structure from one object to another. The user interface may provide an instant visual alert of a potential problem, for example, with a source code. The user interface may also provide an intelligent code assistance and wizards. For example, all the references to a selected object, such as a schema or a rule, may be instantly displayed facilitating an instant dependency analysis. In another example, a user interface may have superior error detection and reporting capabilities, such as instantly reporting errors or enabling a user to find an exact error location just after one click.

Figure 17:
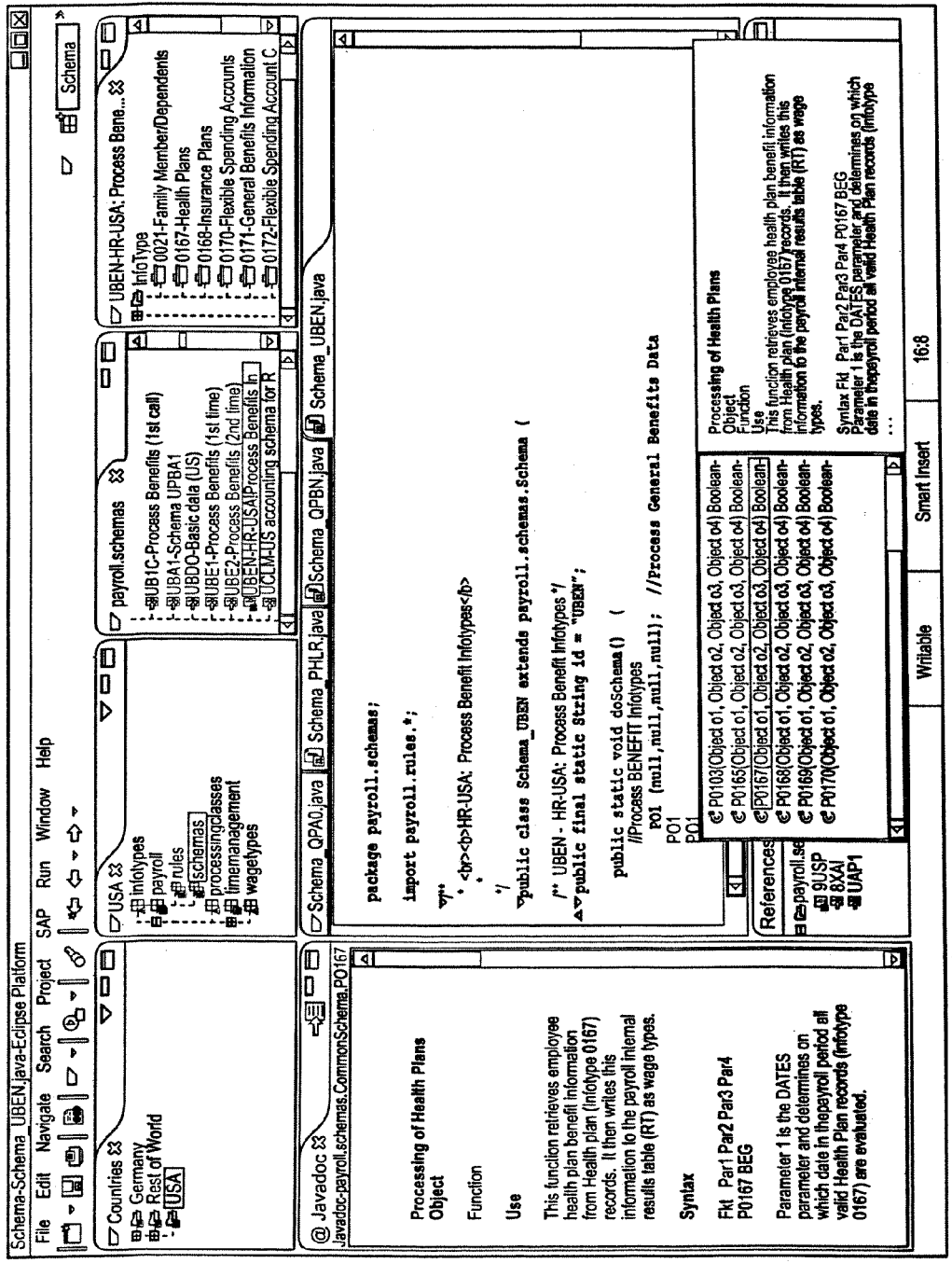

Consistent with methods and systems of the invention, a user interface shown in FIG. 17 illustrates auto-complete capabilities in an Integrated Configuration Editor (ICE) environment. As shown in FIG. 17, the user interface may list all the business objects and provides documentation for each of them. The user interfaces may depict grouping of the projects in ICE environment. The integrated configuration environment may include, for example, a series of windows displaying business application entities as a hierarchy of projects, rules, and schema. The environment may also include an object-oriented model of a business application object displayed together with documentation pulled from the business application.

Figure 18:
Figure 19:
Figure 20:
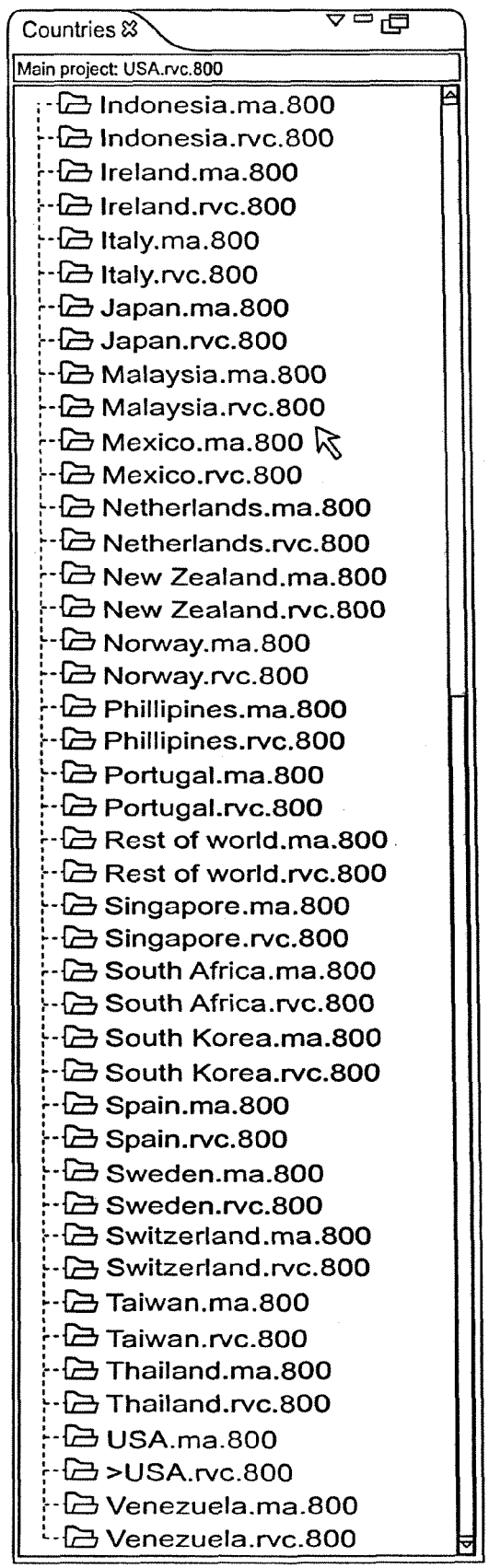

For example, FIG. 18 depicts grouping of the projects defined by a country, and FIGS. 19 and 20 depict grouping of the projects defined by a system and a client, respectively, which has the least possible amount of attributes allowing to enforce uniqueness for all managed objects within a project. For example, using three attributes as the minimum set of attributes to define uniqueness, as shown in FIG. 19, may allow the system to rearrange attributes and build hierarchies with better workspace organization. The user interface shown in FIG. 20 may depict a linear project layout when all key attributes are shown in a project name. A little block with a cross inside appearing next to a project type may indicate an existing potential problem or an error. For example, a block next to Germany on FIG. 18, may indicate that an error in object "Germany" exists.

Figure 21:
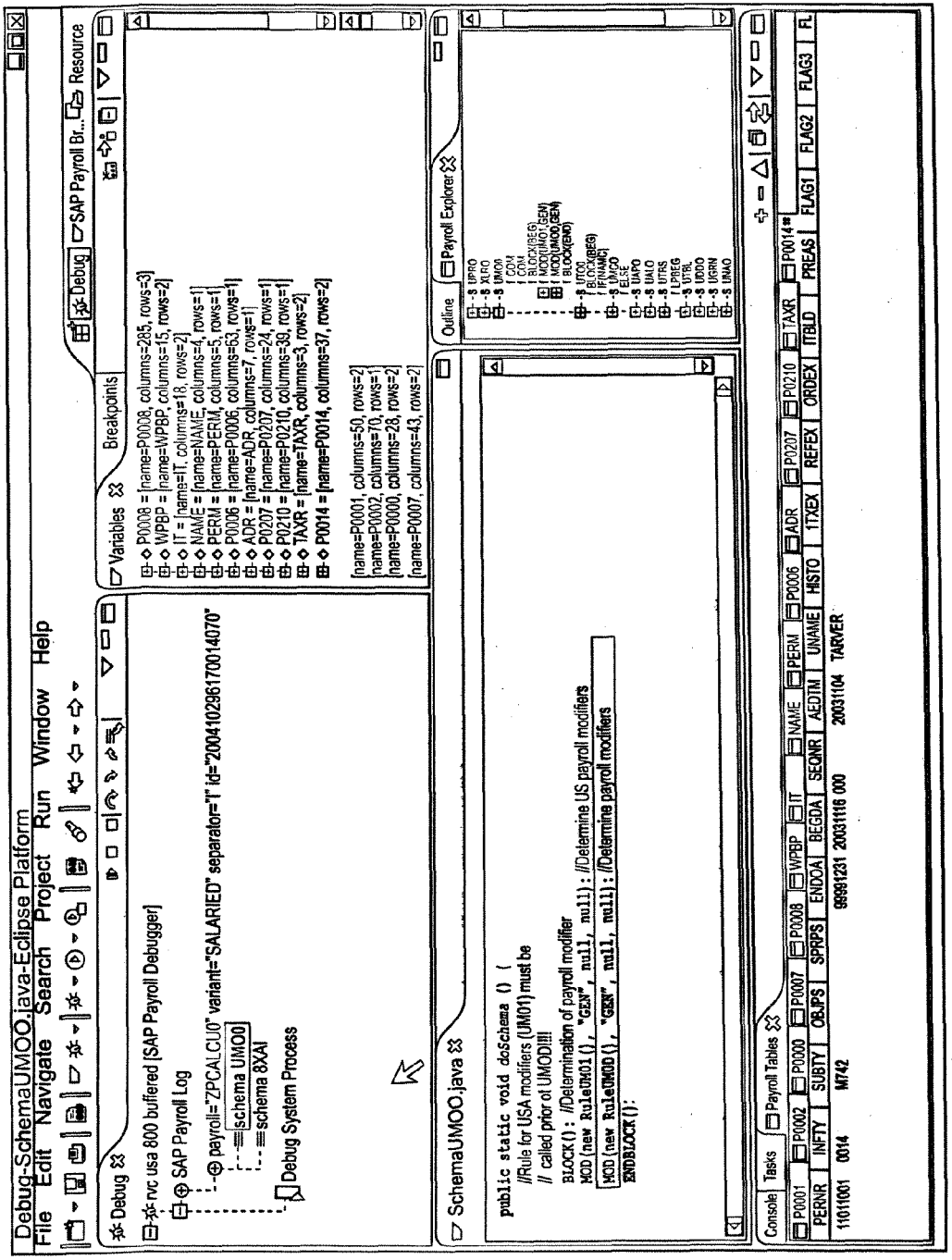

Consistent with methods and systems of the invention, a user interface shown in FIG. 21 may depict an offline debugger or log replay. Having an ability to see this screen may allow a user to look at dynamic and static views of payroll tables, full view of payroll steps, a source code displayed at a current execution point, and debugging controls.

Figure 22:
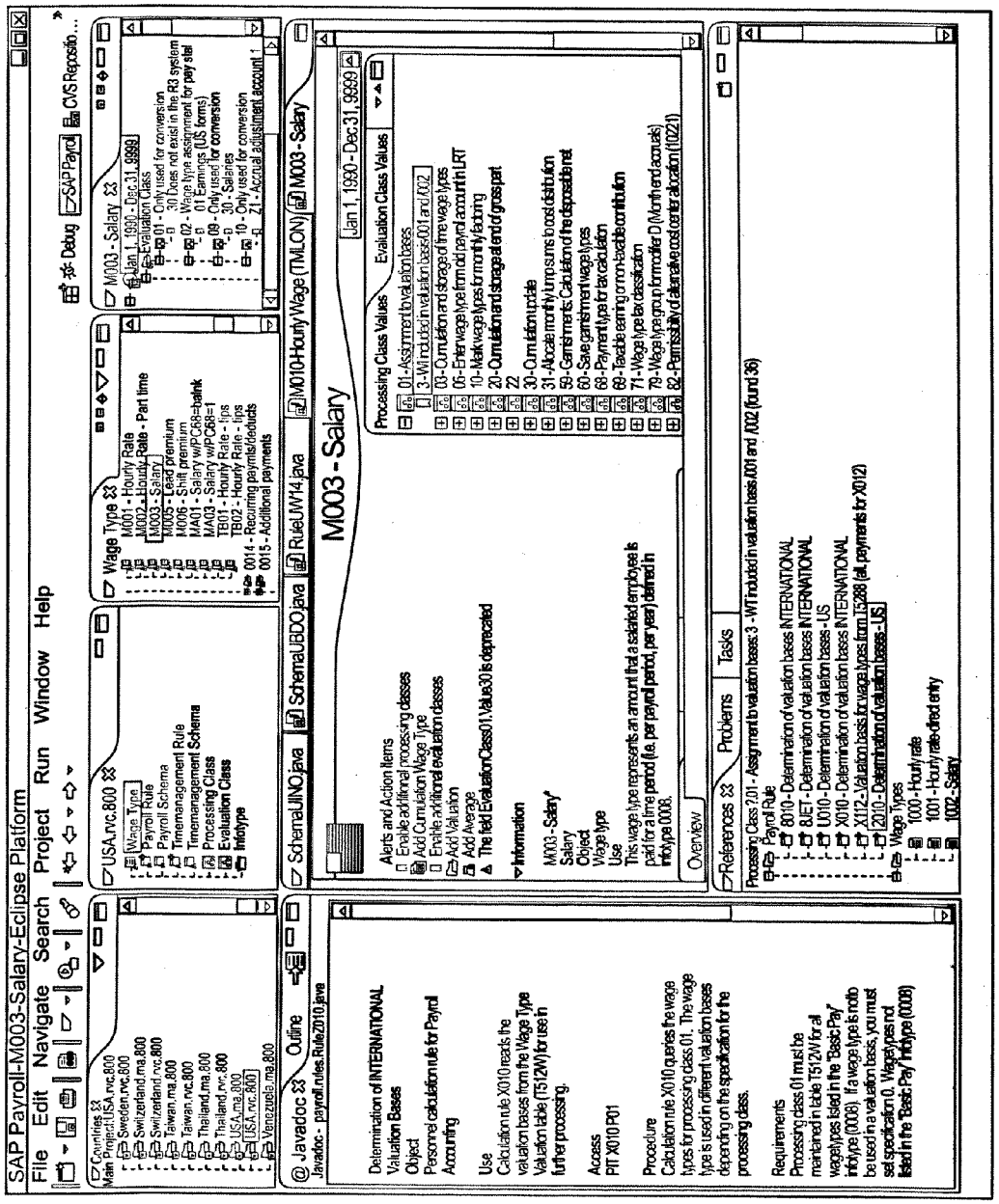

Consistent with methods and systems of the invention, a user interface shown in FIG. 22 may depict inter object relationships within a project. For example, a user highlighting processing class with value M003, such as salary wage type, may result in displaying different rules referenced to that wage type.

Figure 23:
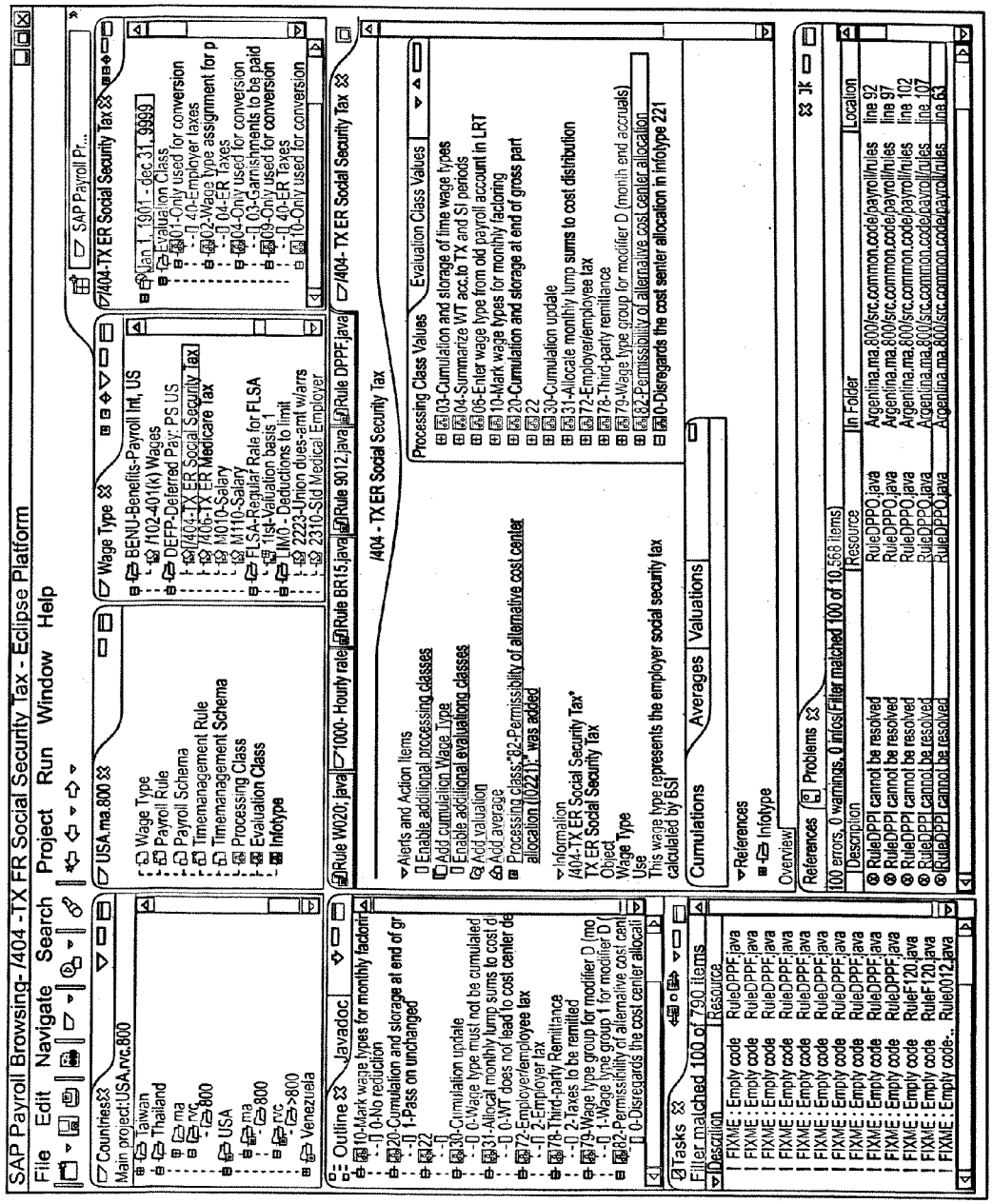

Consistent with methods and systems of the invention, a user interface shown in FIG. 23 may depict one or more problems or errors encountered when business application structures are transformed into object-oriented structures. If during the conversion an error occurred, the error may be marked as a task for the user to fix. For example, if the user typed in an invalid syntax in a "RuleDPPF.java" module, a task of "Empty code" is listed for the user to fix along with a complete description of the error, which in this example is that "RuleDPP1 cannot be resolved."

Figure 24:
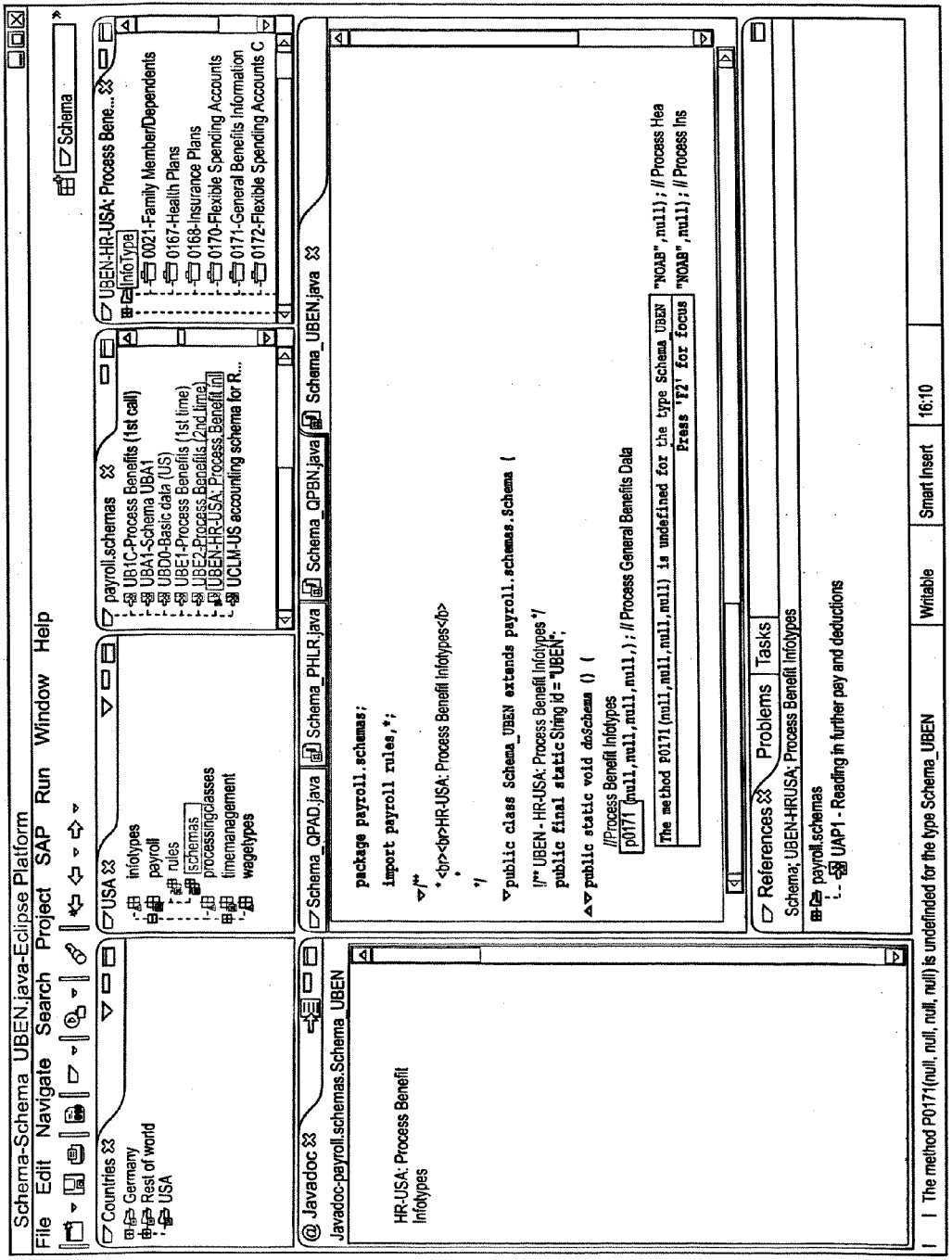

Consistent with methods and systems of the invention, a user interface shown in FIG. 24 may depict, in greater detail, one or more problems, or errors, encountered when business application structures are transformed into object-oriented structures. If in FIG. 23 a user double clicks on a error, the schema where the problem exists is displayed for the user and the portion of the schema with the error is highlighted. When a cursor is placed above the marker, a pop-up box may show the details of the error. For example, the user may be notified that the method P0171 is undefined.

Consistent with methods and systems of the invention, a user interface shown in FIG. 25 may depict all the errors encountered in when business application structures are transformed into object-oriented structures. Each error may be indicated by a marker (here a rectangular flag) on the far right of the user interface identified by a code debugger applied to the object-oriented model. When a cursor is placed above the marker, a pop-up box may show the details of the error, and a click on the marker takes the user to the exact location of the error within the schema. For example, in the schema "RuleW020.java," errors are indicated by the marker on the right side of the screen. If a user places a cursor above the marker indicating the error, the details of the error "Rule-WRFI cannot be resolved" is shown.

Figure 26:
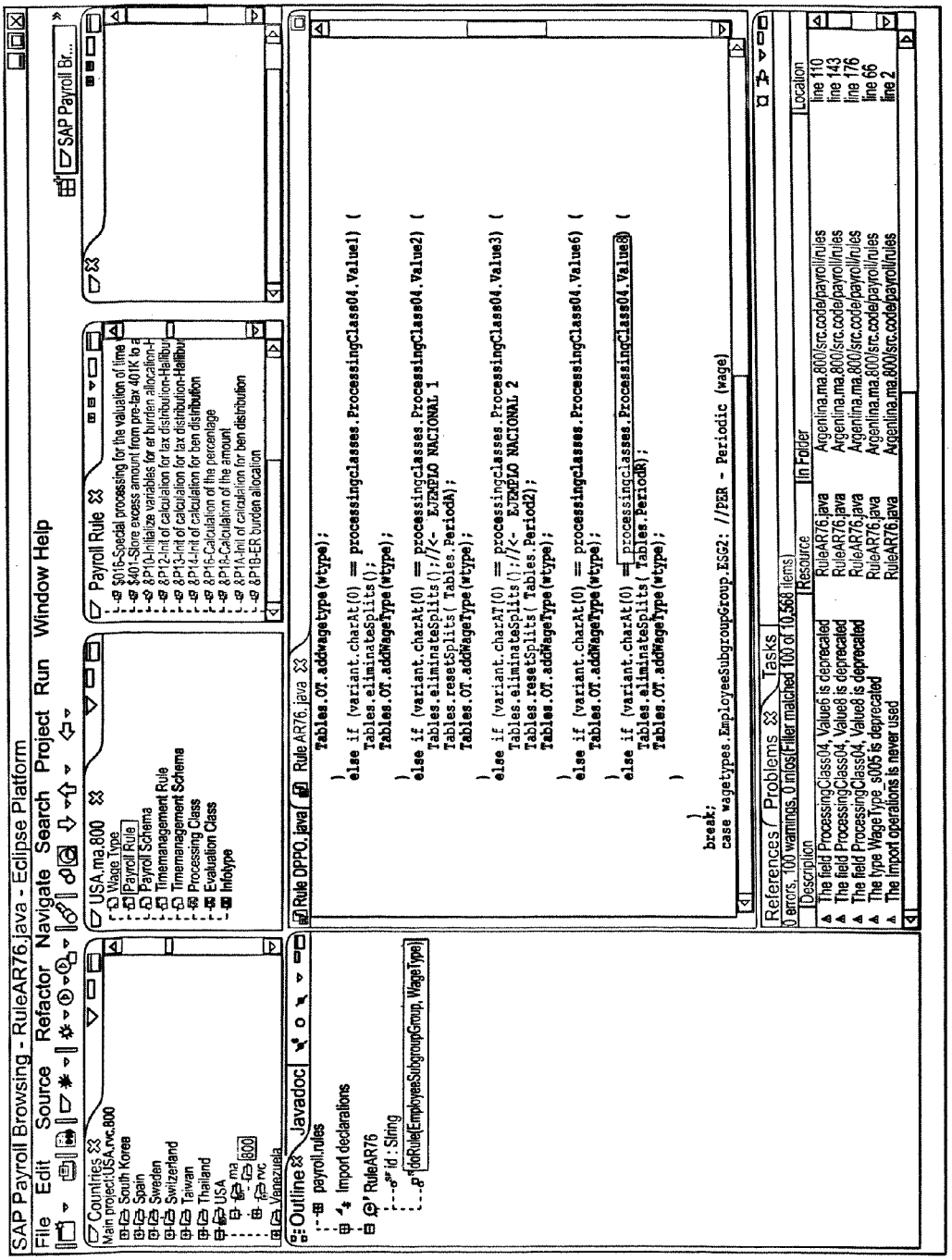

Consistent with methods and systems of the invention, a user interface shown in FIG. 26 may depict one or more warnings encountered when business application structures are transformed into object-oriented structures. A warning may consist of informing a user that a part of a module may be referencing a rule or value that is no longer used by the system. The warning is not an error and will not stop the conversion of the R3 structures to the Java structures. For example, if within a module a variant is checked to determine whether it equals a certain value, i.e., "processingclasses.ProcessingClasses04.Value8," the system may inform the user that "The field ProcessingClass04.Value8 is deprecated," in other words, ProcessingClass04.Value8 may not exist or is no longer used within the system.

Consistent with methods and systems of the invention, a user interface shown in FIG. 27 may also depict a problem, or error encountered when business application structures are transformed into object-oriented structures. The error is marked as a task for the user to fix with a description being given under the "Problems" tab. For example, the error of "empty code" is listed as a task for the user in the module "RuleDPPF.java" and the description of the error is that "Rule9112 cannot be resolved." Rule9112 may also be highlighted in the user interface.

Figure 28:
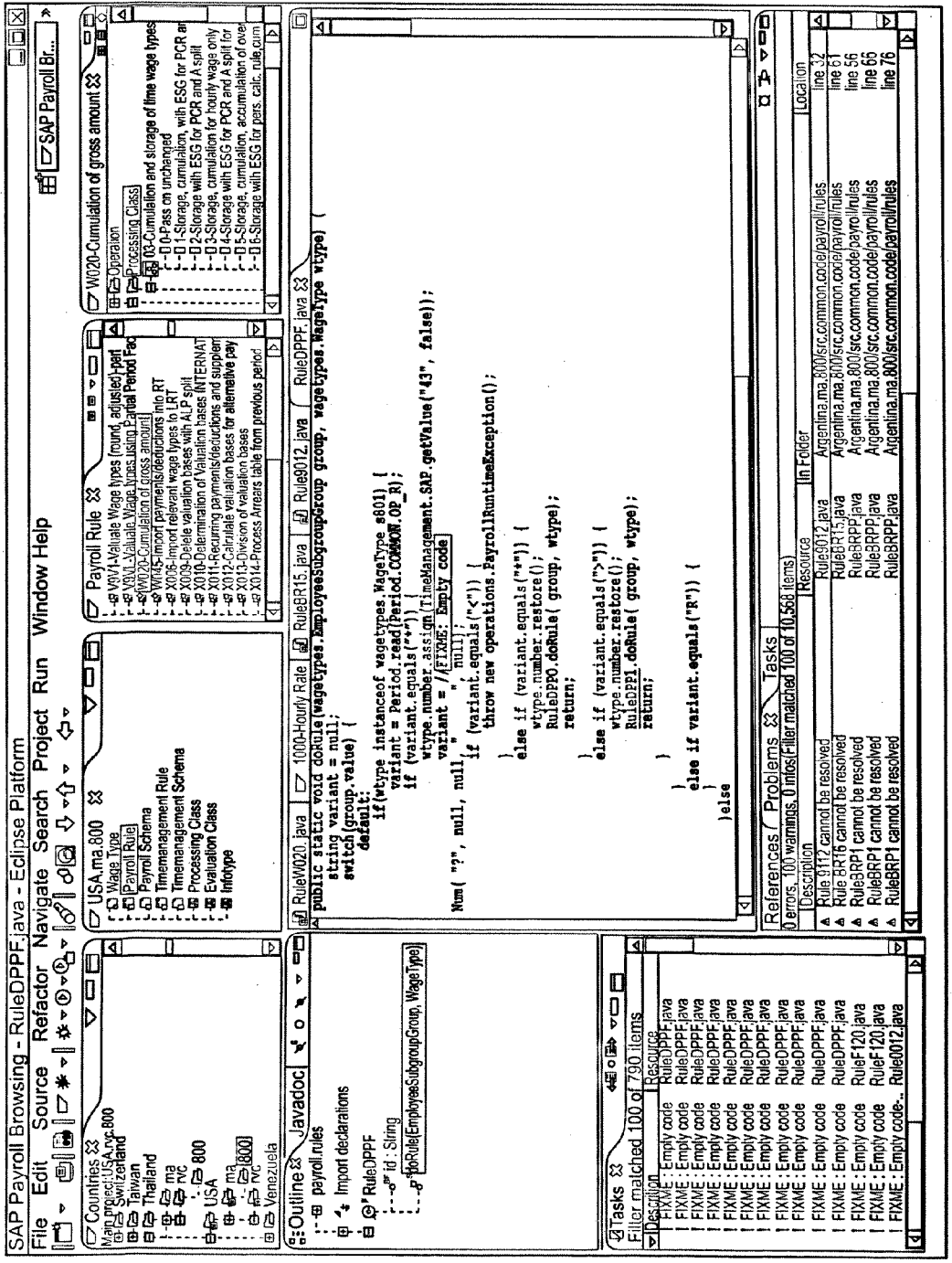

Consistent with methods and systems of the invention, a user interface shown in FIG. 28 may further illustrate details associated with a problem, or error encountered when business application structures are transformed into object-oriented structures where a rule in the transformation may not produce any result. For example, if the user clicks on the description of the error, the user may be directed to the portion of the "RuleDPPF.java" schema where the error occurred. In this example, a variable "variant" is set equal to nothing; therefore the user may have to enter a value to resolve the error.

Consistent with methods and systems of the invention, a user interface shown in FIG. 29 may also depict all the problems or errors when business application structures are transformed into object-oriented structures in one view. Each errors may be indicated by a marker on the far right of the user interface. When a cursor is placed above the marker, a pop-up box may show the details of the error. If a user clicks on the marker, the user is taken to the exact location of the error within the schema. For example, in the schema "RuleW020.java," there are problems indicated by the marker on the right side of the screen. If a user places a cursor above the marker indicating the problem, the details of the problem "RuleWRFI cannot be resolved" is shown.

Figure 30:
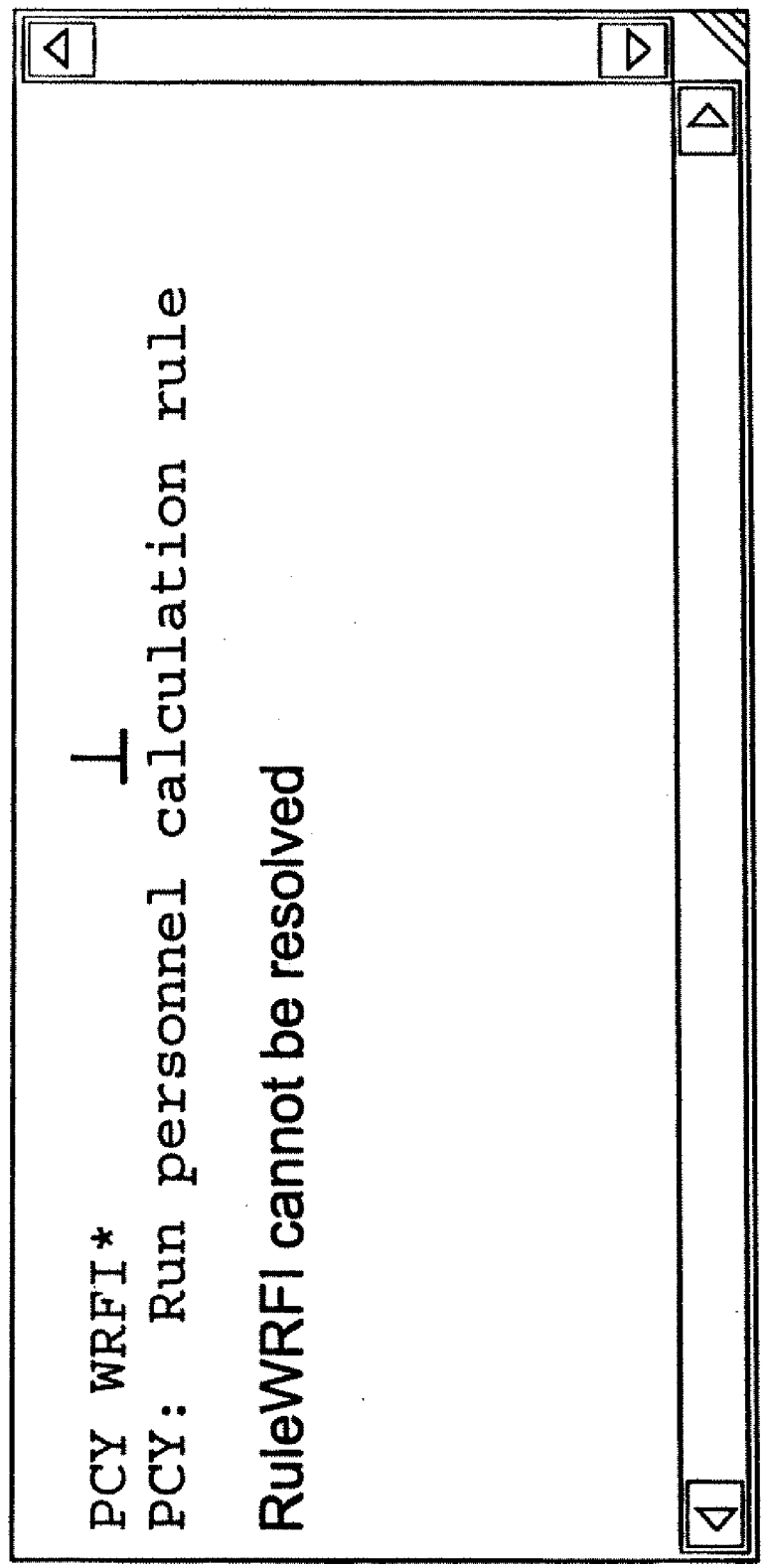

Consistent with methods and systems of the invention, a user interface shown in FIG. 30 may depict the object-oriented structure that has encountered an error during the transformation of the business application structures into the object-oriented structures, and give a description of the error.

Consistent with methods and systems of the invention, a user interface shown in FIG. 31 may depict one or more evaluation classes within a project. A user may select an evaluation class business object, such as evaluation class 02, "Wage type assignment for pay statement," as shown in the upper center right pane with the tab labeled "Evaluation class." By processing the OOP object model of the business application using common OOP tools and methods, the system finds and displays all the business objects that are related to or reference the selected "Wage type assignment for pay statement" evaluation class 02 object, as shown in the bottom right hand pane with the tab labeled "References."

Figure 32:
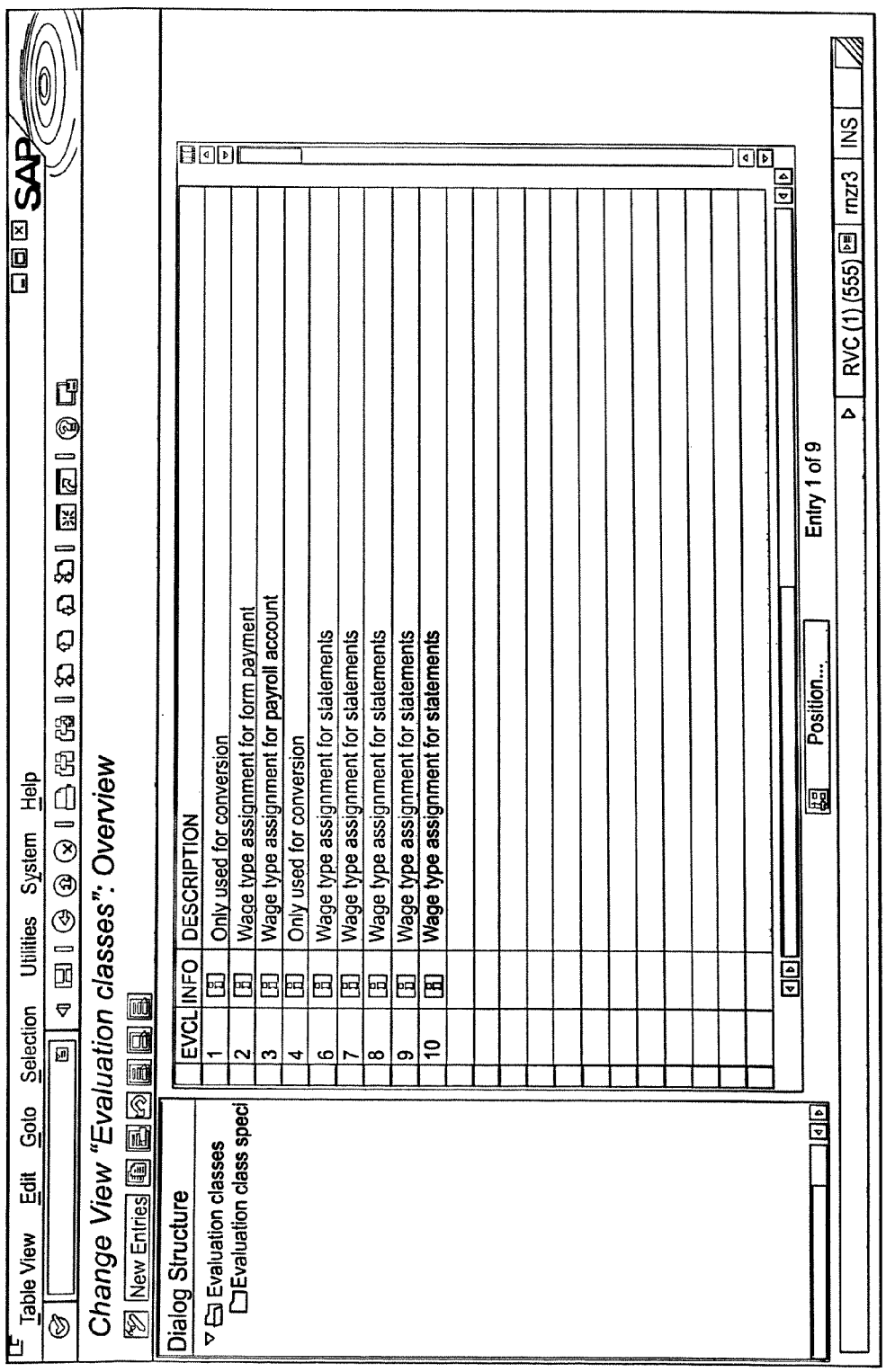

Consistent with methods and systems of the invention, a user interface shown in FIG. 32 may depict an Evaluation class within a project in an R/3 view.

Figure 33:
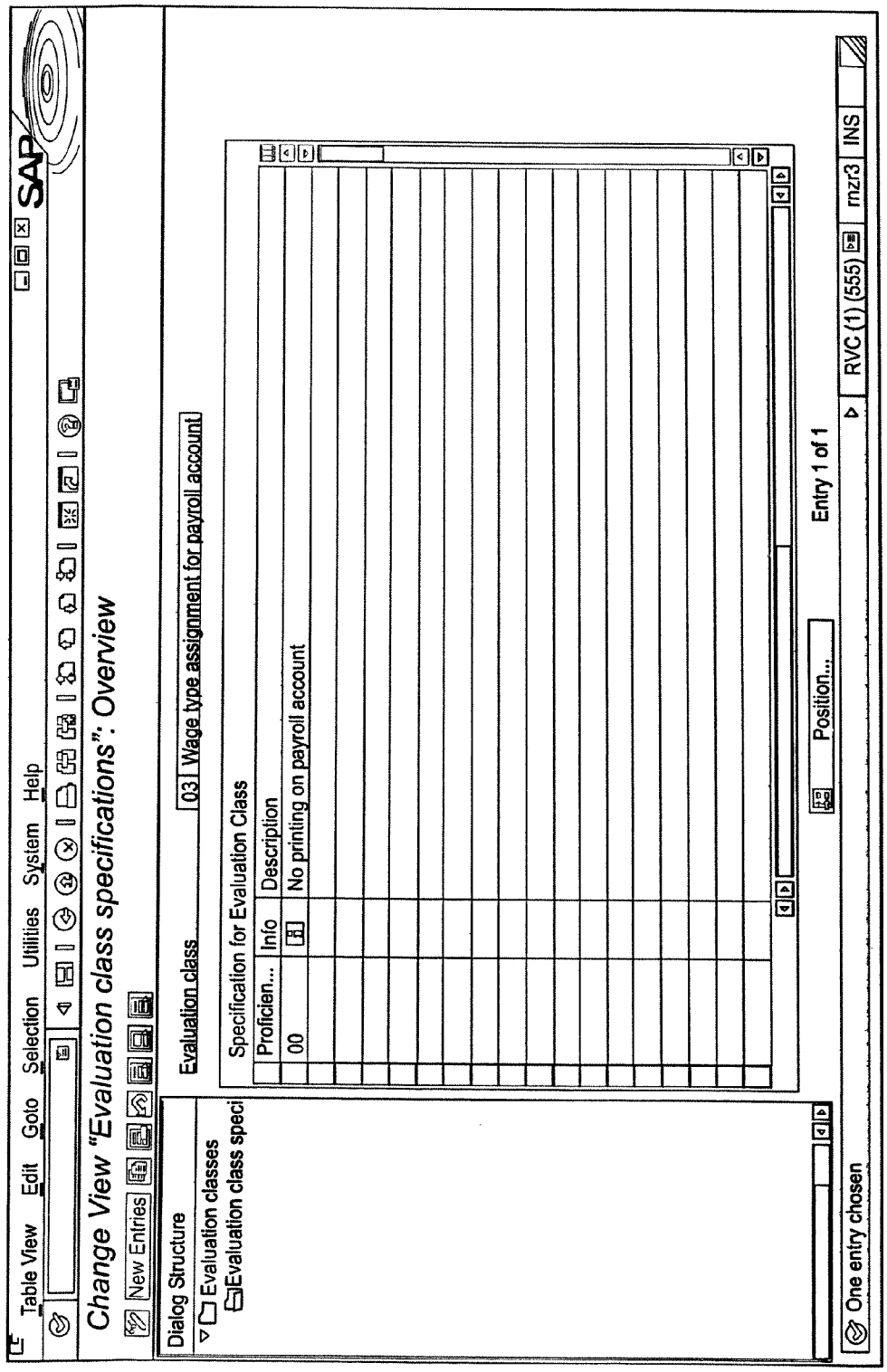

Consistent with methods and systems of the invention, a user interface shown in FIG. 33 may depict the specifications for an evaluation class business object such as an Evaluations class within a project in an R/3 view. For example, a user interface may depict the specifications of Evaluations class "Wage type assignment for payroll account."

Figure 34:
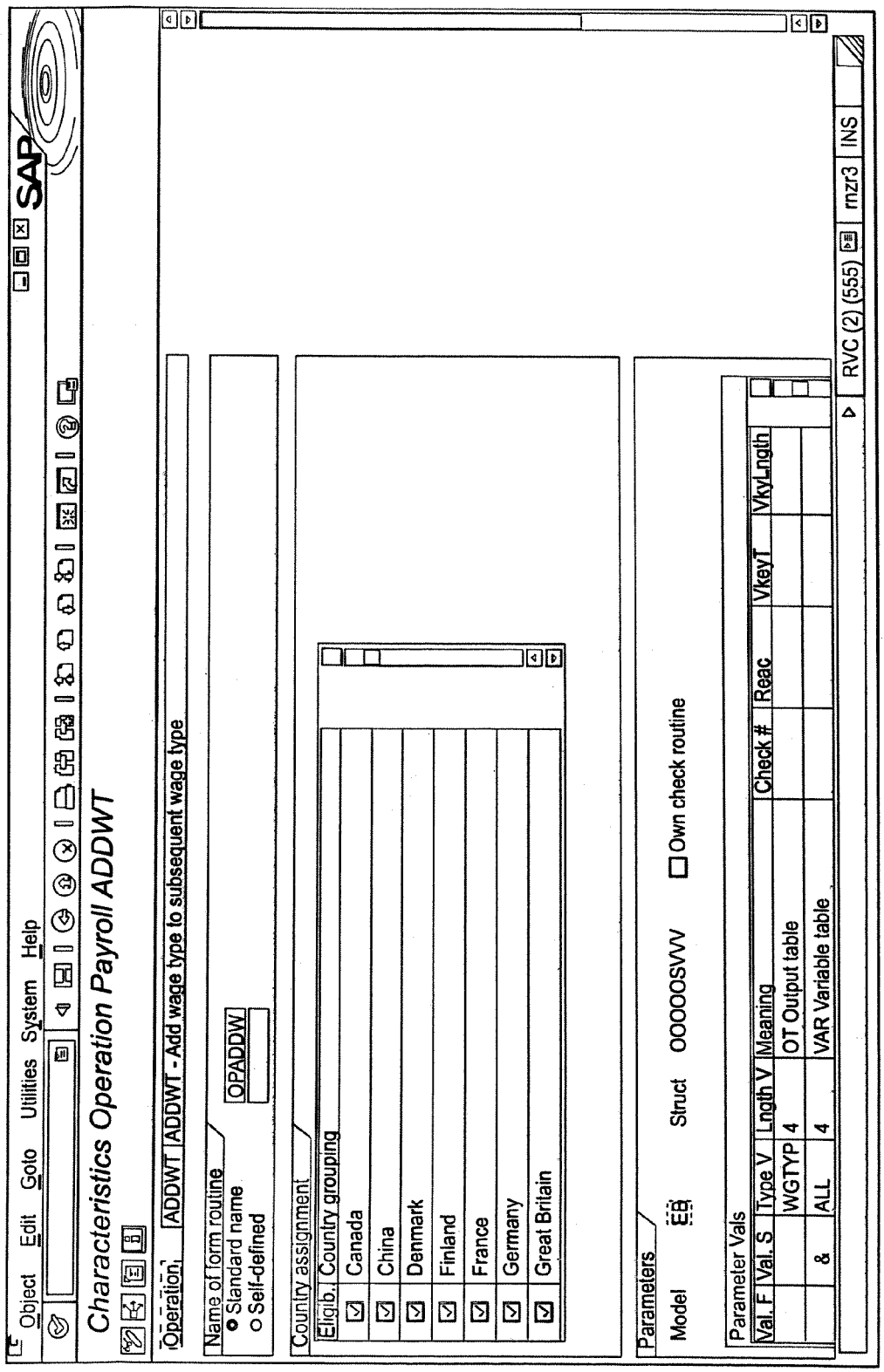
Figure 35:
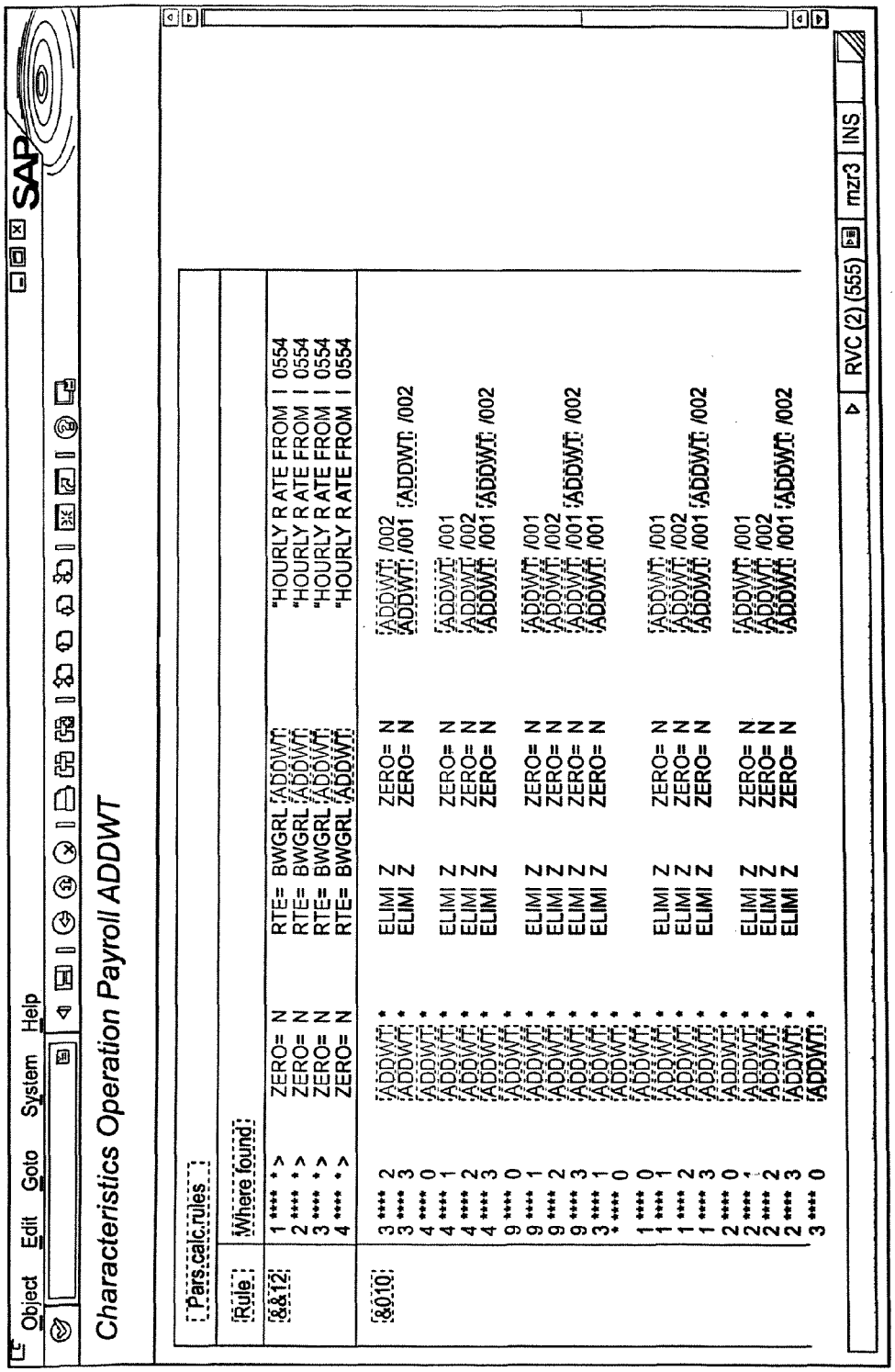

Consistent with methods and systems of the invention, a user interface shown in FIG. 34 may depict a screen where one or more operations are defined for one or more countries in an R/3 view. For example, the operation "ADDW Add wage type to subsequent wage type" may be defined for Canada, China, Denmark, Finland, France, Germany, and Great Britain. FIG. 35 is another user interface consistent with an embodiment of the invention.

Figure 36:
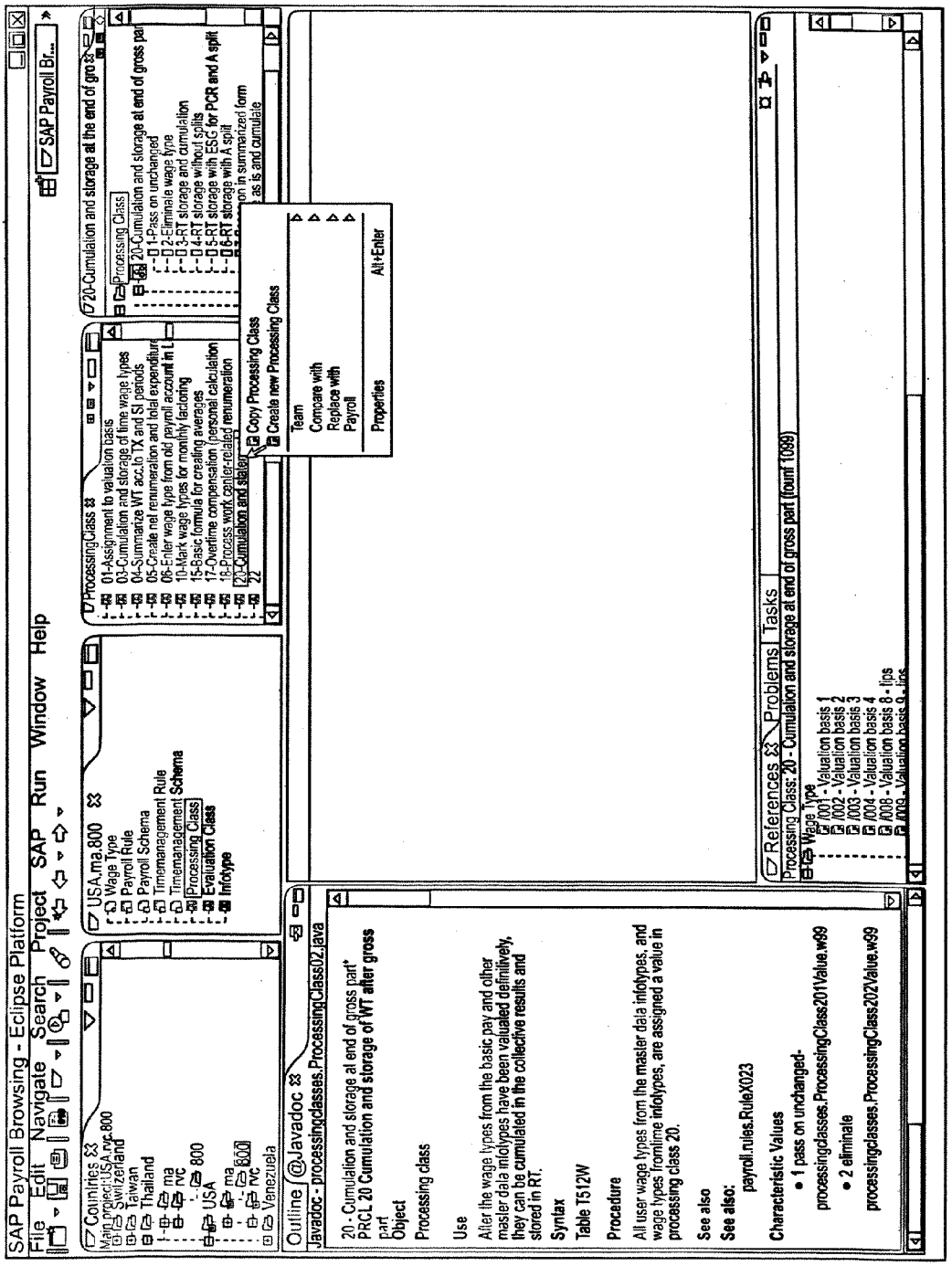

Consistent with methods and systems of the invention, a user interface shown in FIG. 36 may depict one or more processing classes within a project, and the various operations that can be performed on each processing class is also depicted. For example, the processing class "Cumulation and storage at end of gross part" is shown in the user interface, and with a right click on that processing a menu is shown where a user may choose from one of many options such as "Copy Processing Class."

Figure 37:
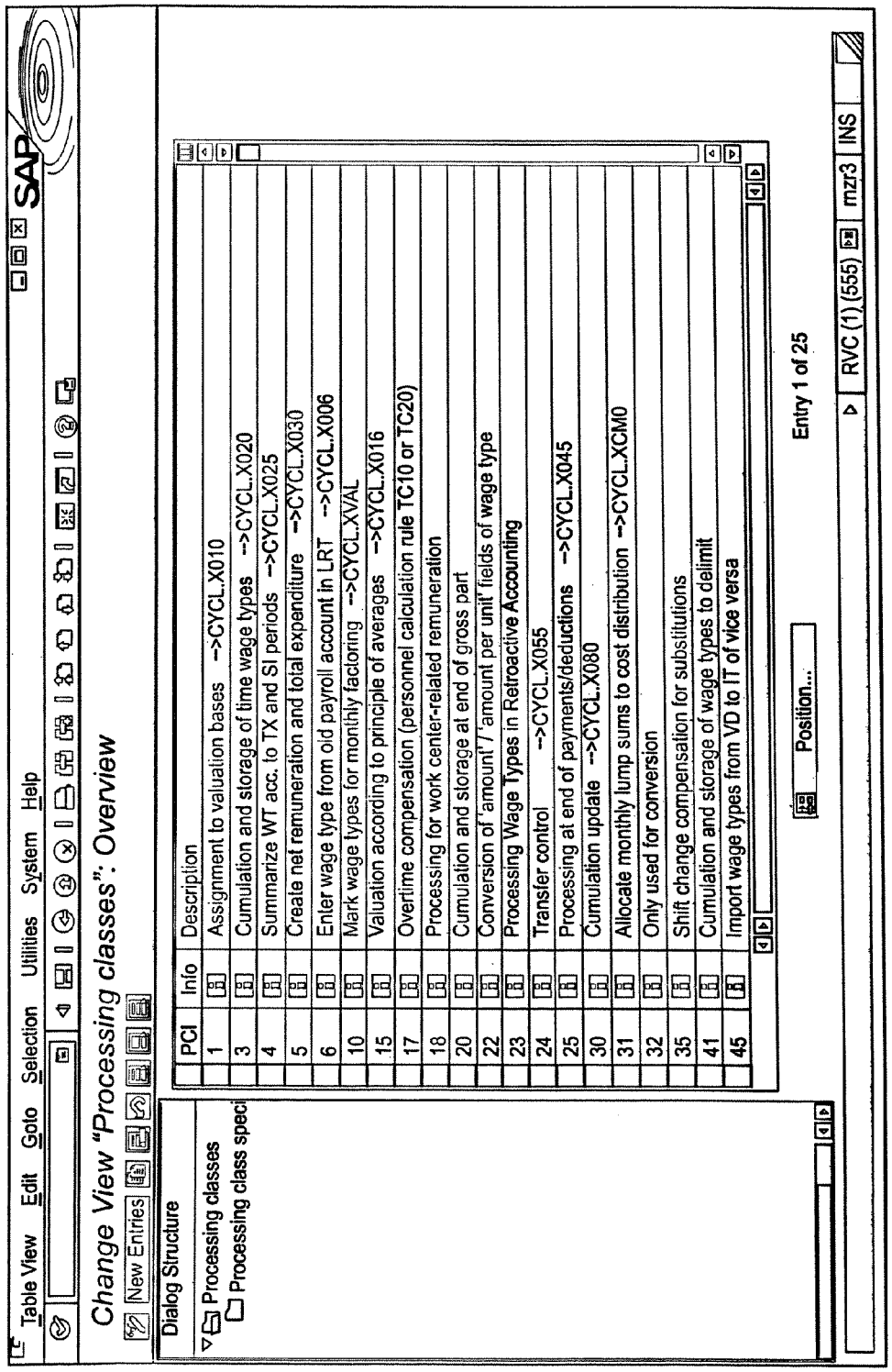

Consistent with methods and systems of the invention, a user interface shown in FIG. 37 may depict a Processing class within a project in an R/3 view.

Figure 38:
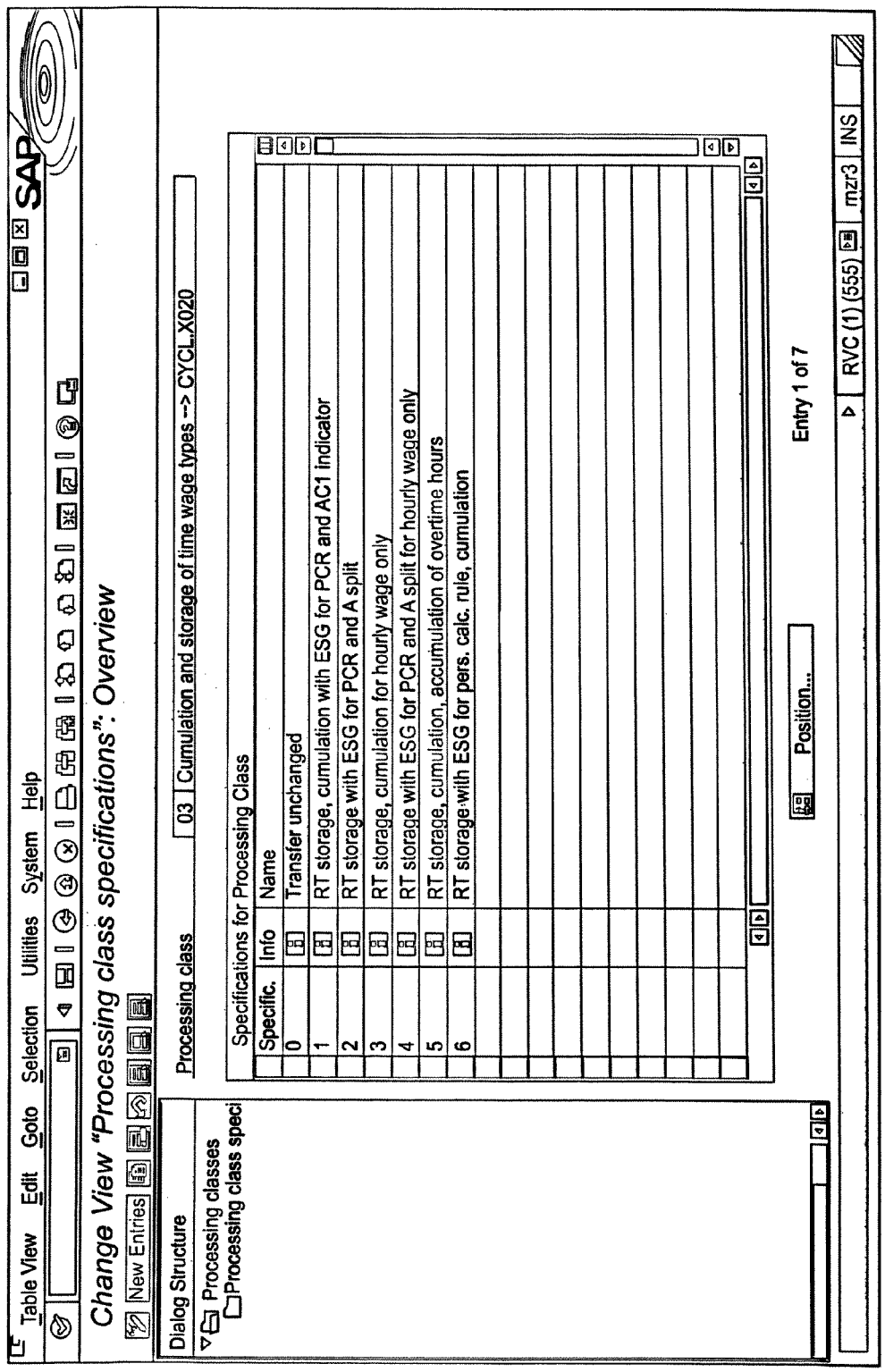

Consistent with methods and systems of the invention, a user interface shown in FIG. 38 may depict the specifications for a Processing class within a project in an R/3 view. For example, a user interface may depict the specifications of Processing class "Cumulation and storage of time wage types."

Figure 39:
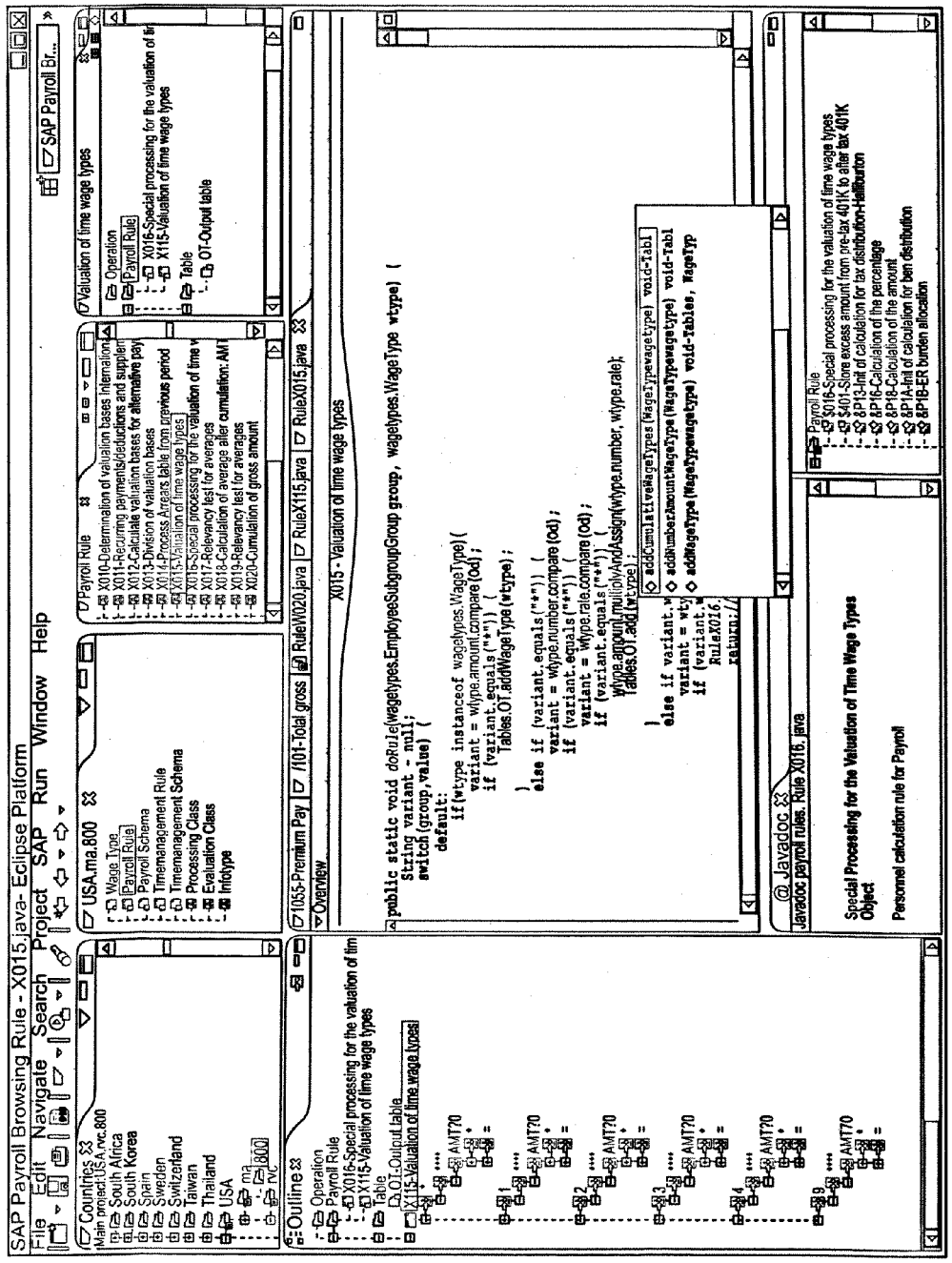

Consistent with methods and systems of the invention, a user interface shown in FIG. 39 may depict an R/3 outline view of a rule representation along with the converted object-oriented code. For example, for the Payroll Rule "X015—Valuation of time wage types" the business application outline is on the left hand side of the screen and the middle of the screen shows the converted object-oriented code for the same rule.

Figure 40:
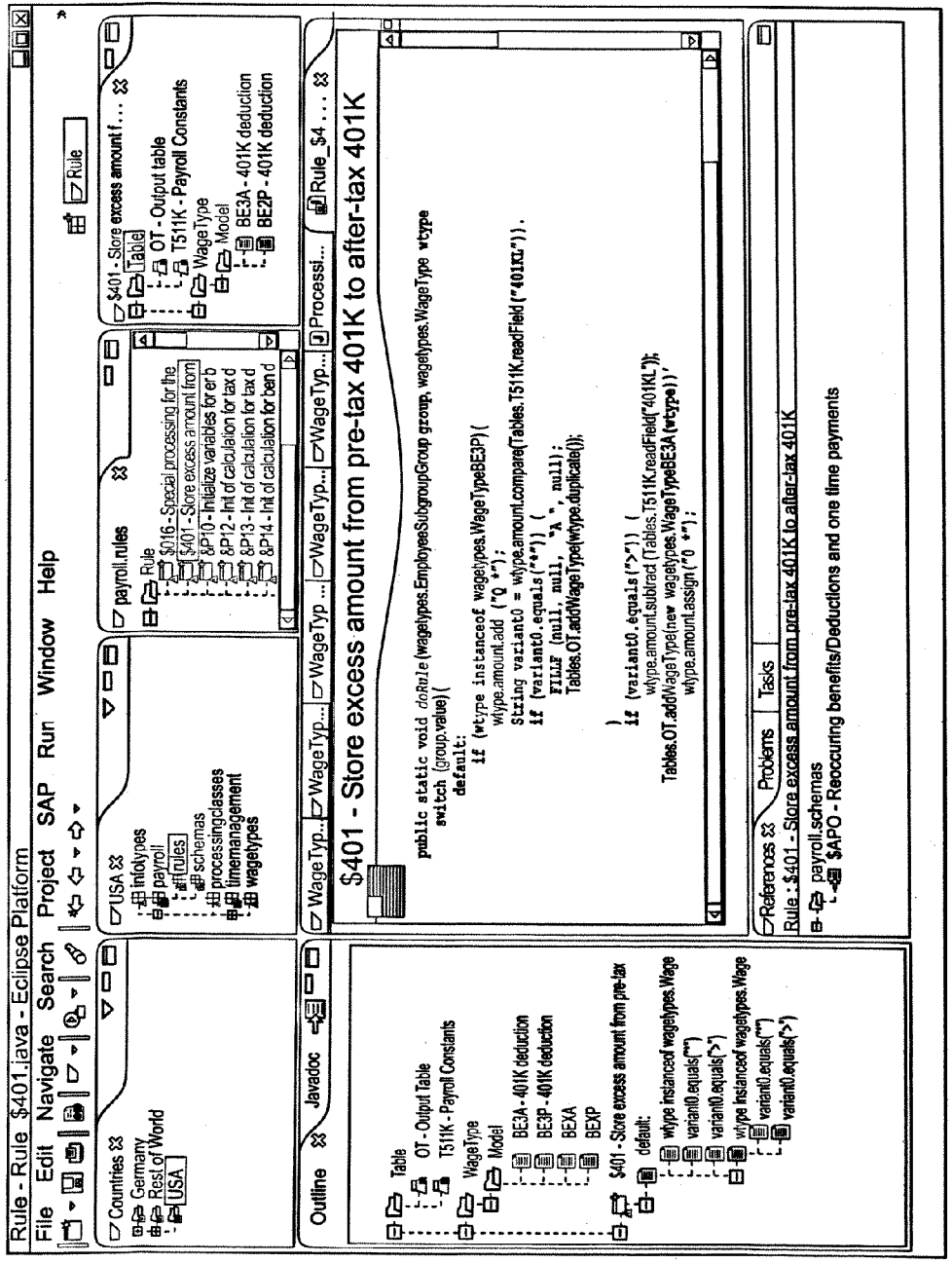

Consistent with methods and systems of the invention, a user interface shown in FIG. 40 may depict an object-oriented outline view of a rule representation along with the object-oriented code. For example, the object-oriented outline of the rule "$401—Store excess amount from pre-tax 4-01K to after-tax 401-K" is shown on the left side with the converted object-oriented code for the same rule is in the middle of the screen.

Figure 41:
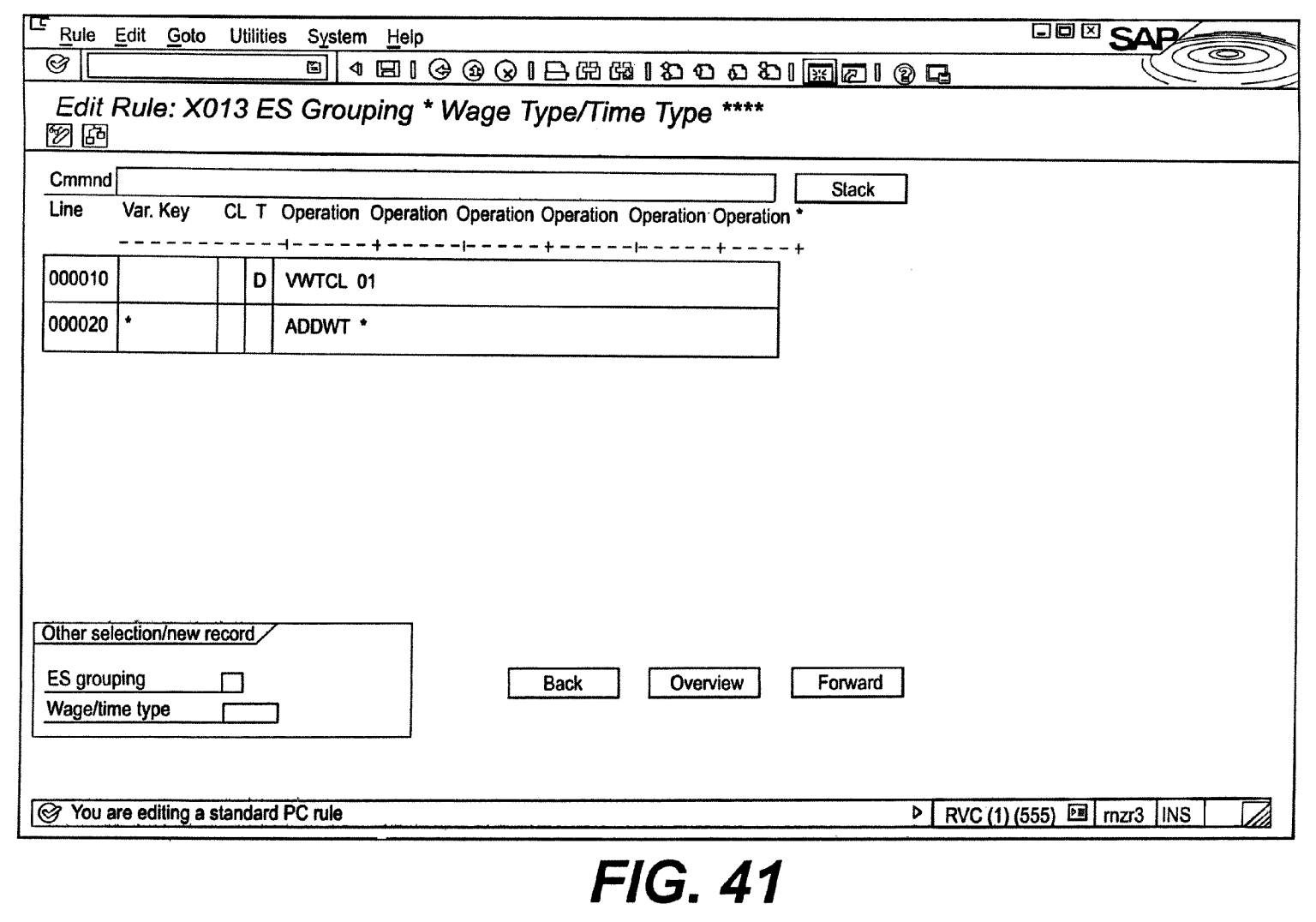

Consistent with methods and systems of the invention, a user interface shown in FIG. 41 may depict a rule in a business application view. For example, the rule "X013 Es Grouping" is depicted as an R/3 business application.

Figure 42:
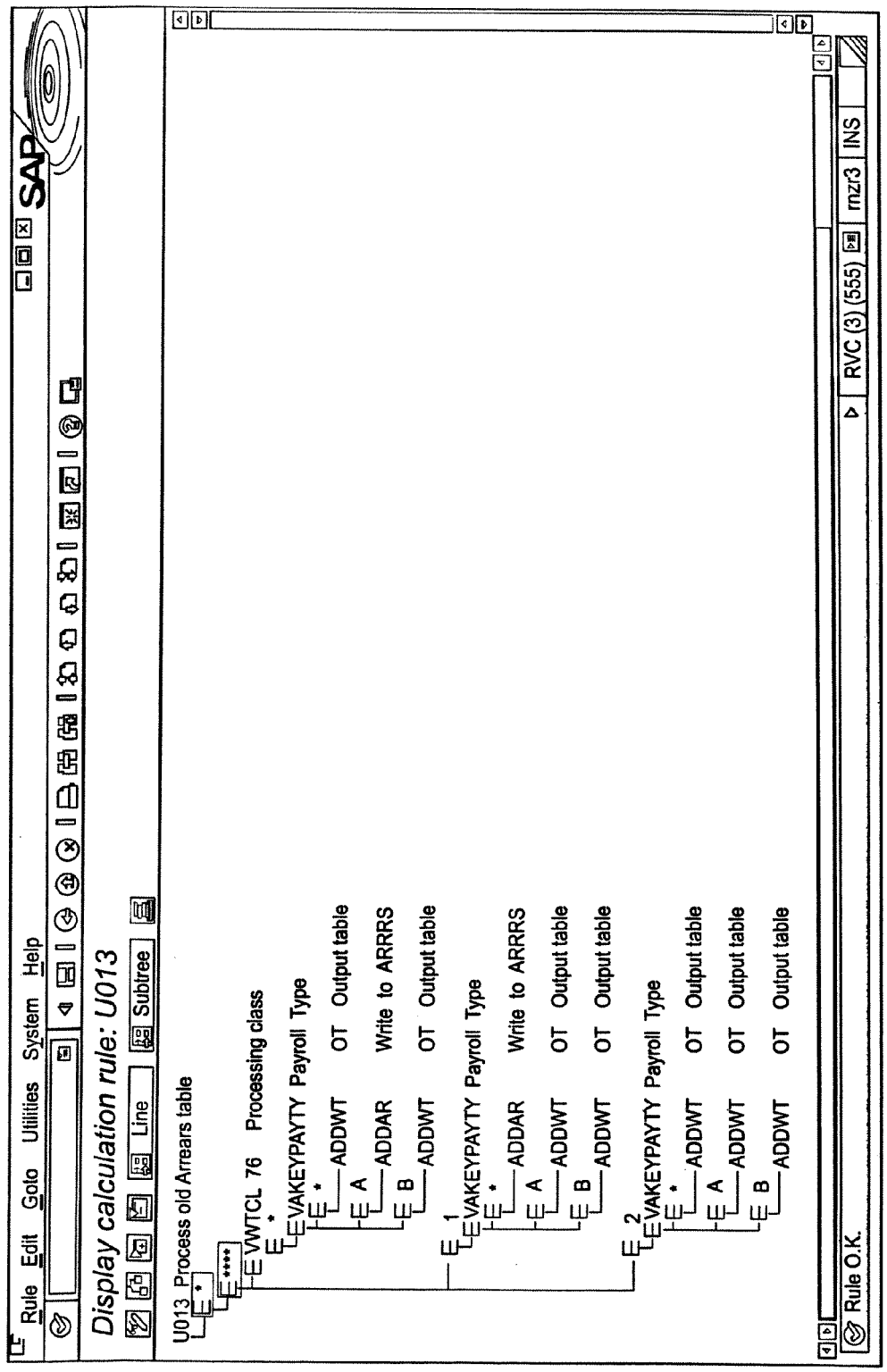

Consistent with methods and systems of the invention, a user interface shown in FIG. 42 may depict a table instance of the rule in a business application view. For example, a table instance of the rule "U013" is depicted as an R/3 data structure.

Figure 43:
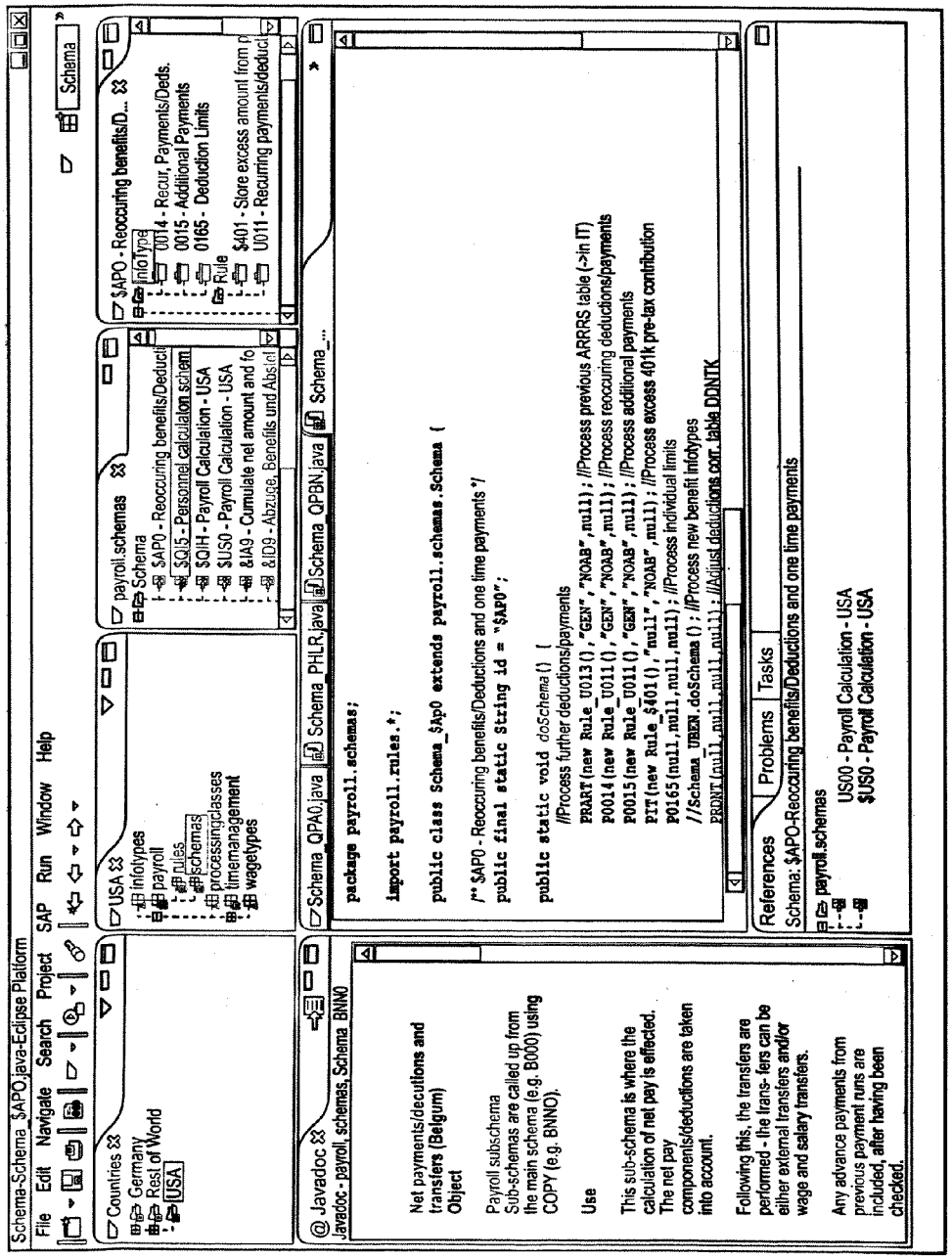

Consistent with methods and systems of the invention, a user interface shown in FIG. 43 may depict an R/3 data structure schema, the object-oriented code of that schema, and the various references where the schema is used. For example, the schema "$APO—reoccurring benefits/Deductions and one time payments" is depicted along with the references that use the schema, which are "US00—Payroll Calculation" and "$US0—Payroll Calculation."

Figure 44:
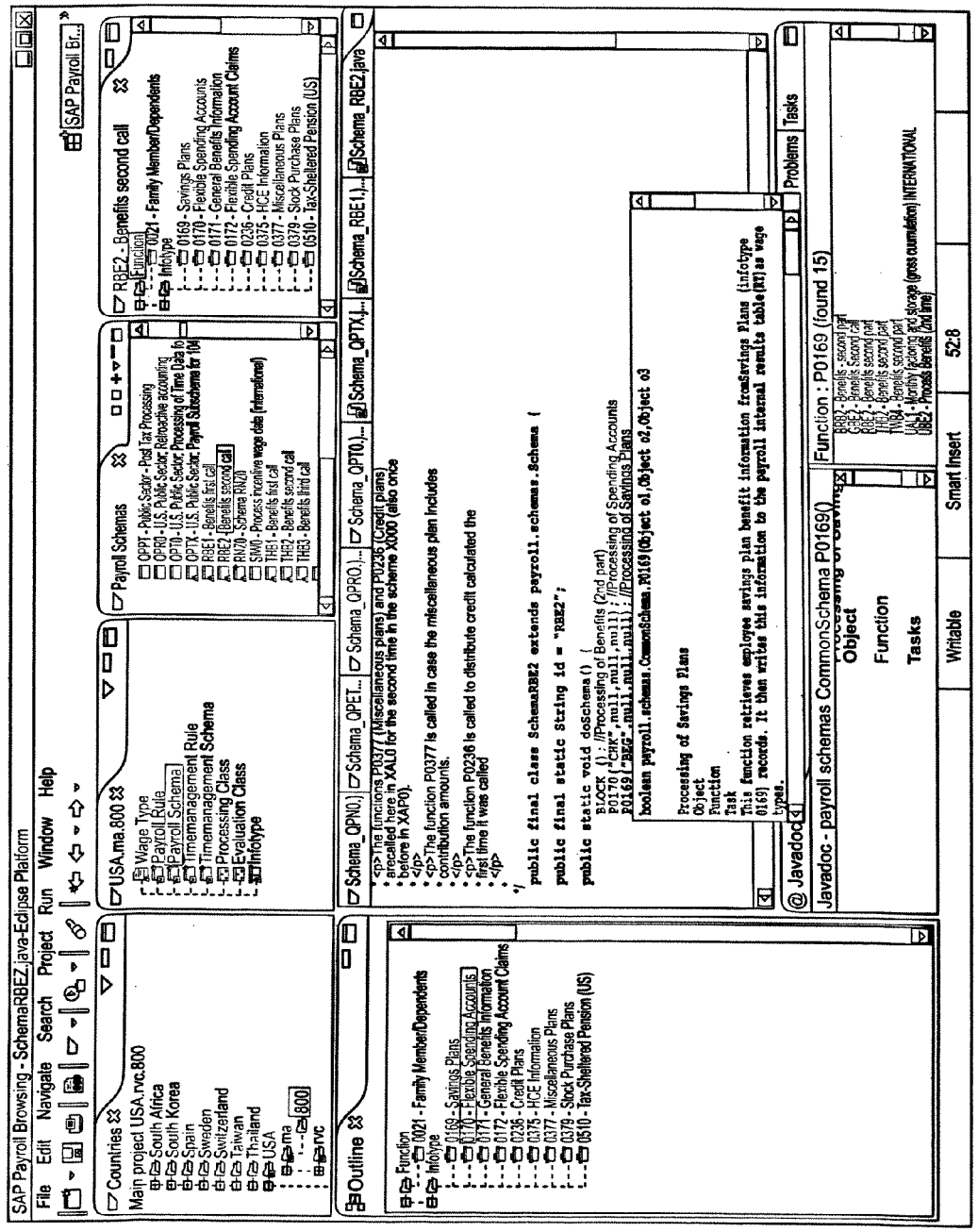

Consistent with methods and systems of the invention, a user interface shown in FIG. 44 may depict a function within an R/3 data structure schema, the implementation of the function, and other schemas where the function is used. For example, the function "P0377" may be shown along with the implementation of the function in the middle of the screen and the bottom right may show other schemas (ex: "BRB2," "BGE2," etc.) that use the function "P0337."

Figure 45:
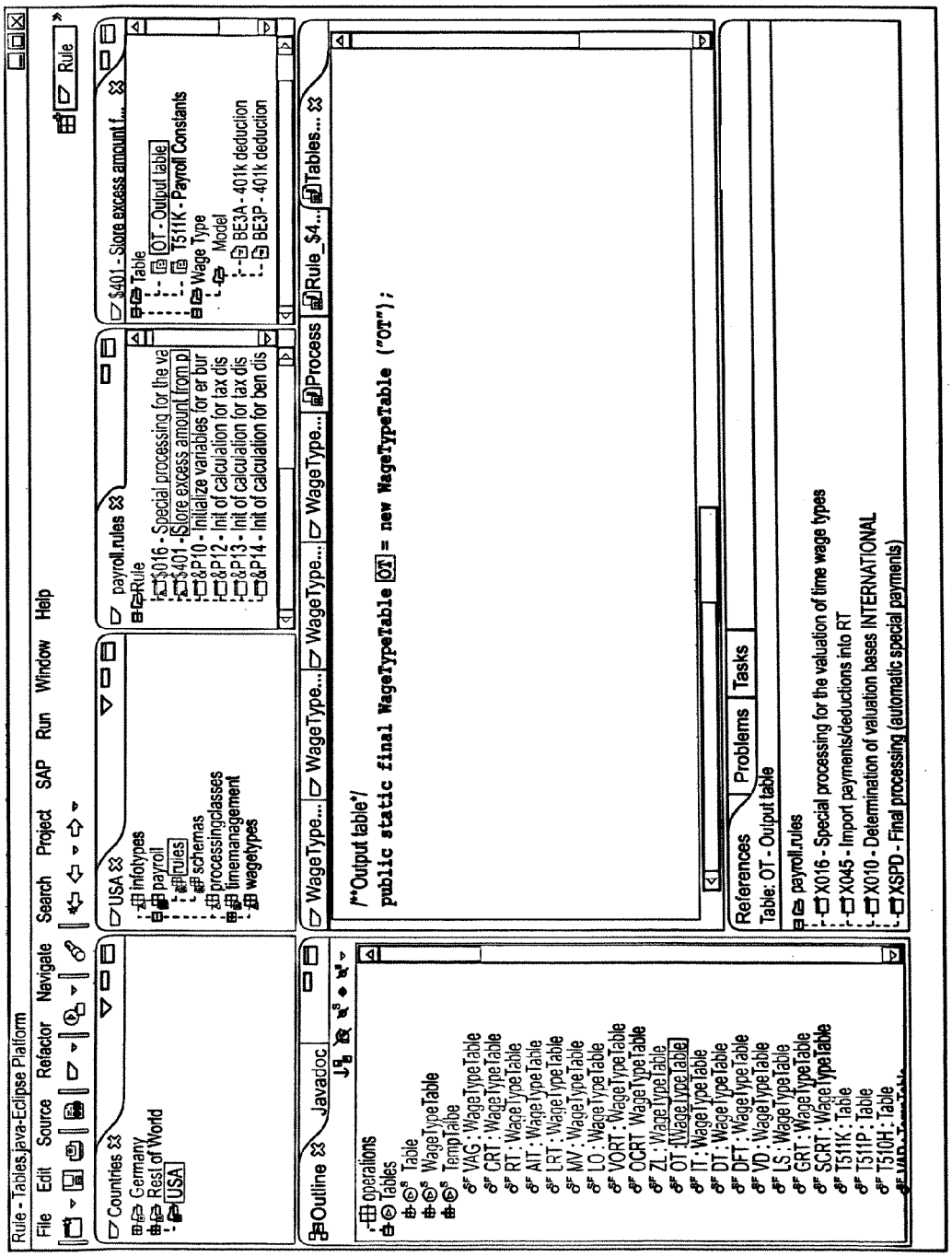

Consistent with methods and systems of the invention, a user interface shown in FIG. 45 may depict a table within a project and all the rules that use that table. For example, the table "Output table" is depicted and under "References," all the payroll rules that use the "Output table" are listed.

Figure 46:
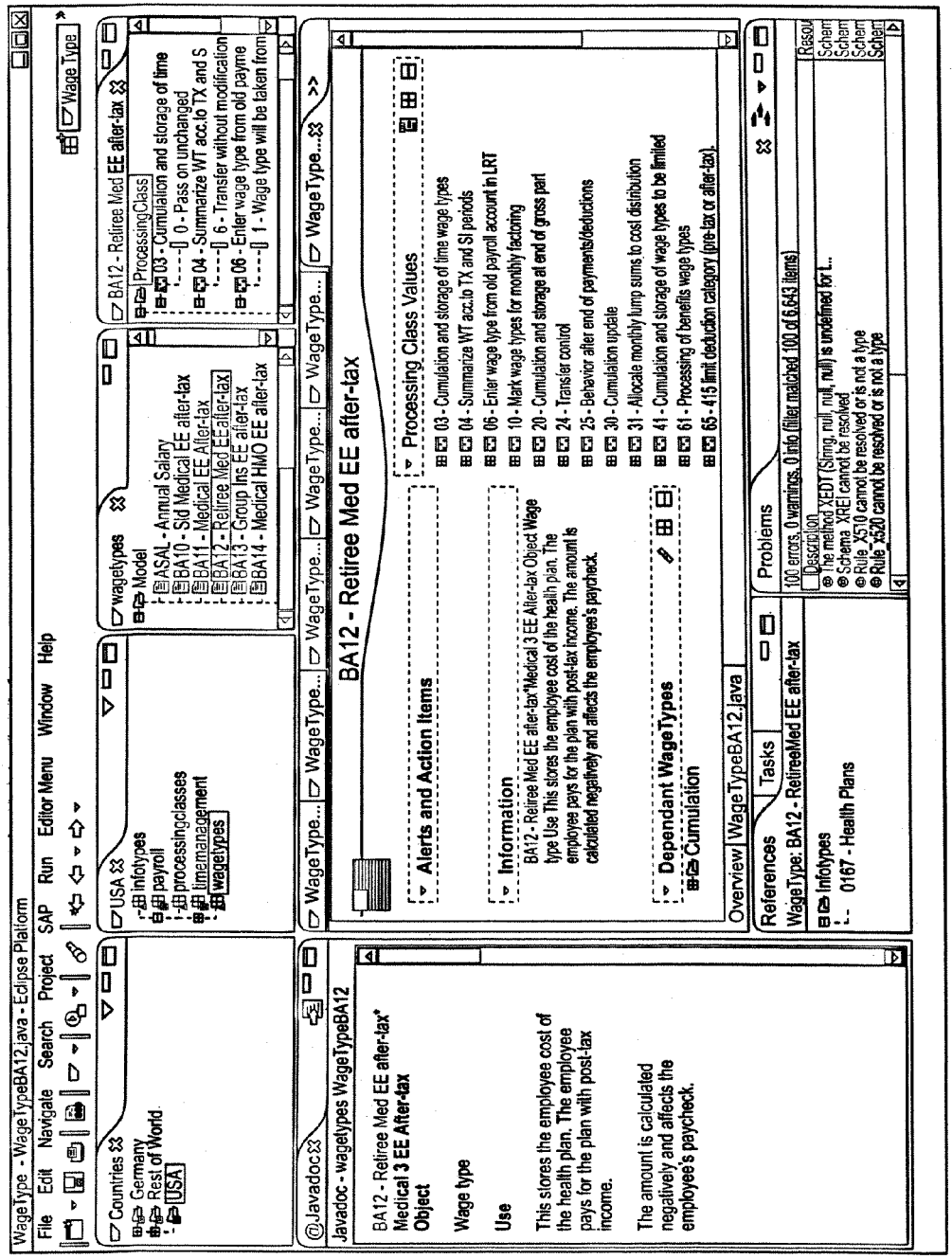
Figure 47:
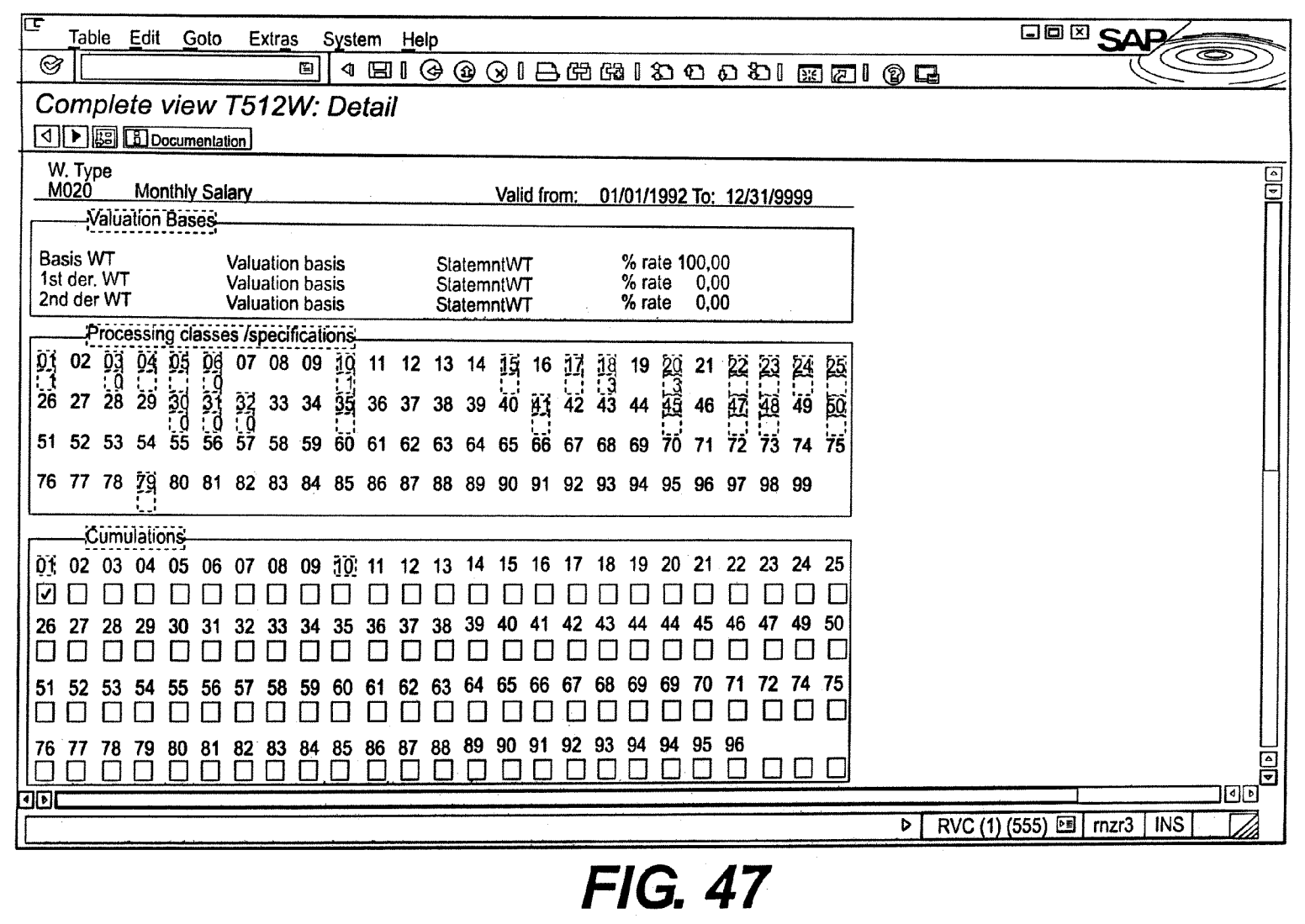
Figure 48:
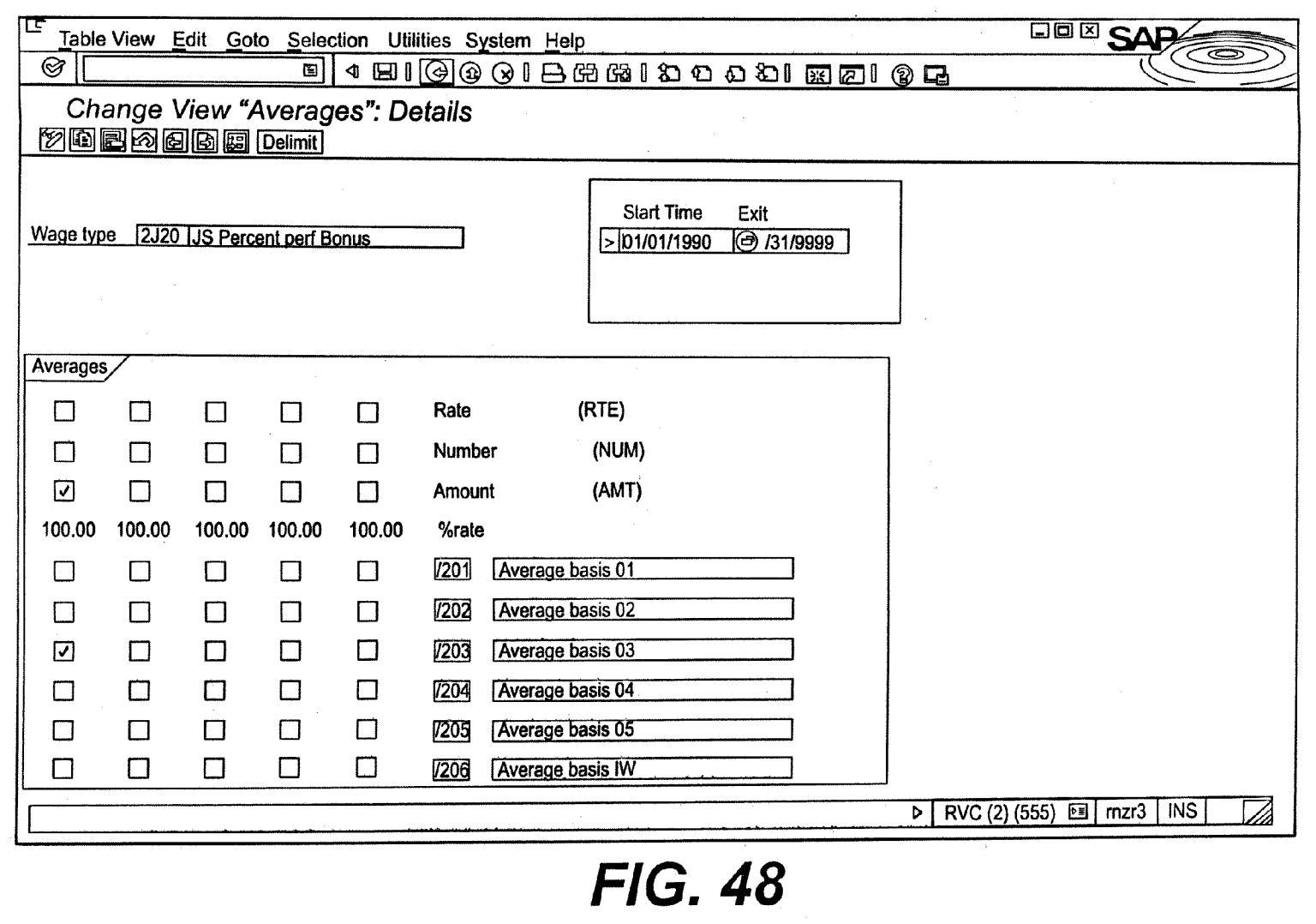
Figure 49:
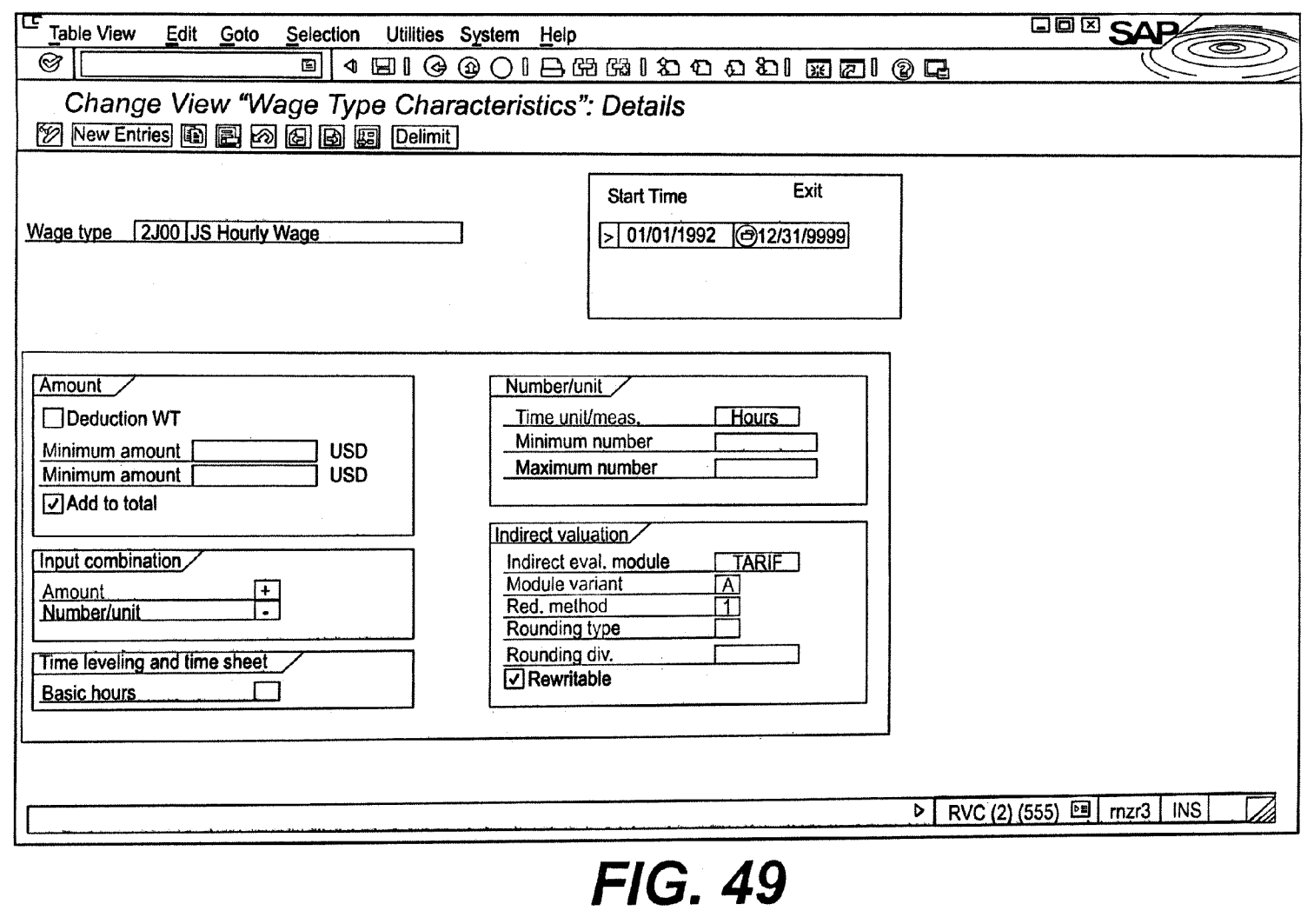
Figure 50:
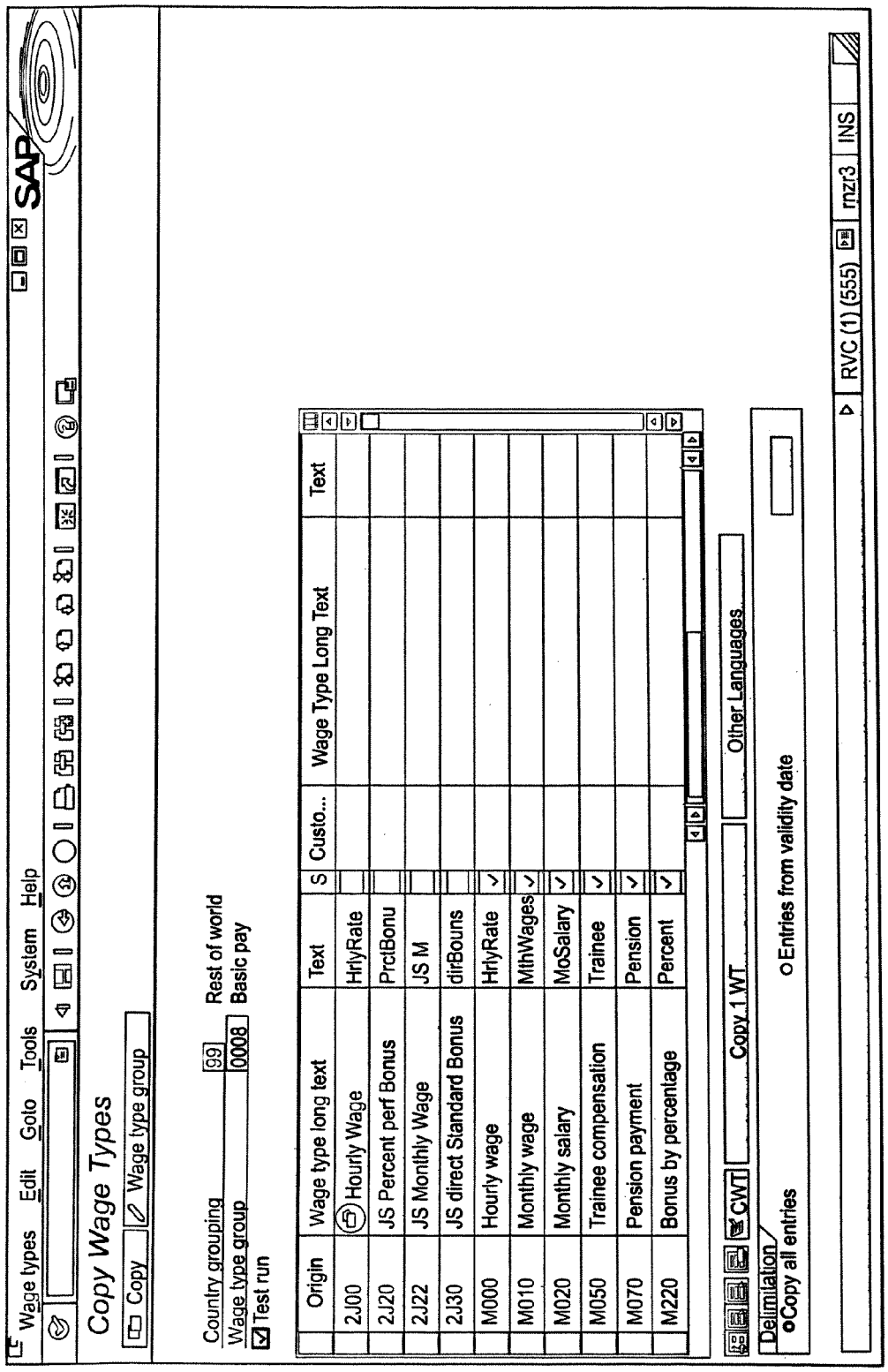
Figure 51:
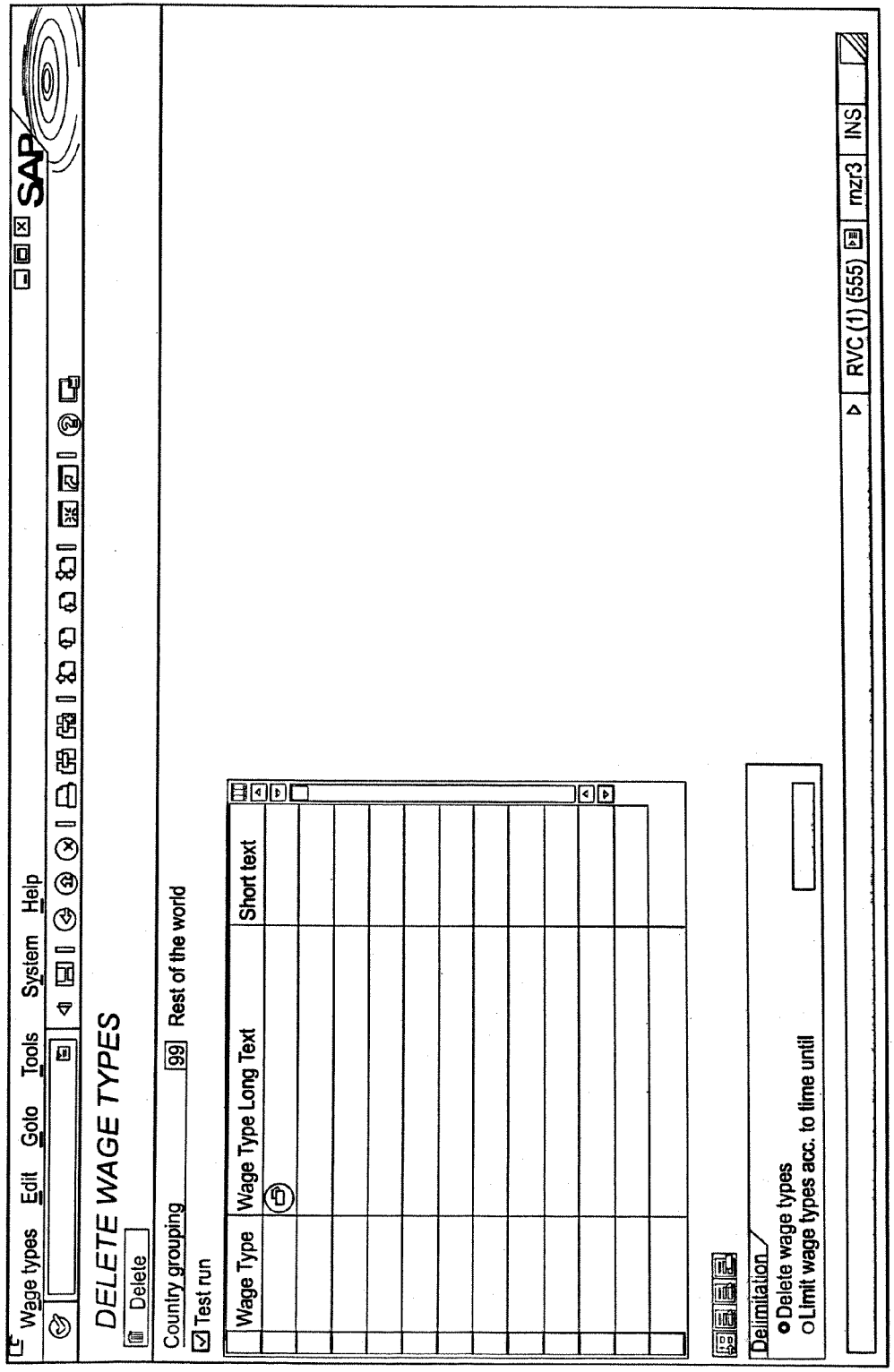
Figure 52:
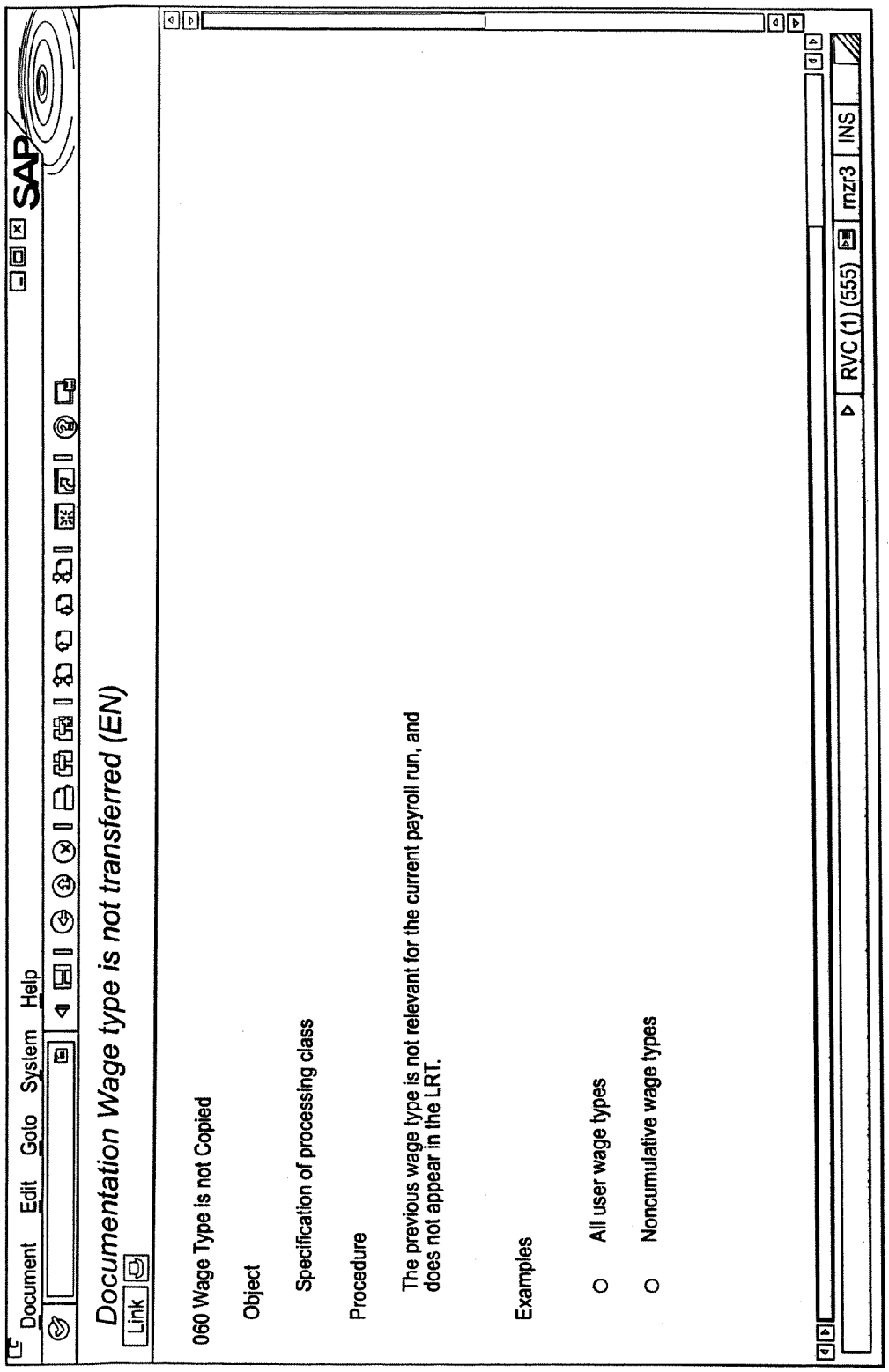

Consistent with methods and systems of the invention, a user interface shown in FIG. 46 may depict the object-oriented representation of R/3 data structure features shown in FIGS. 47-52.

Figure 53:
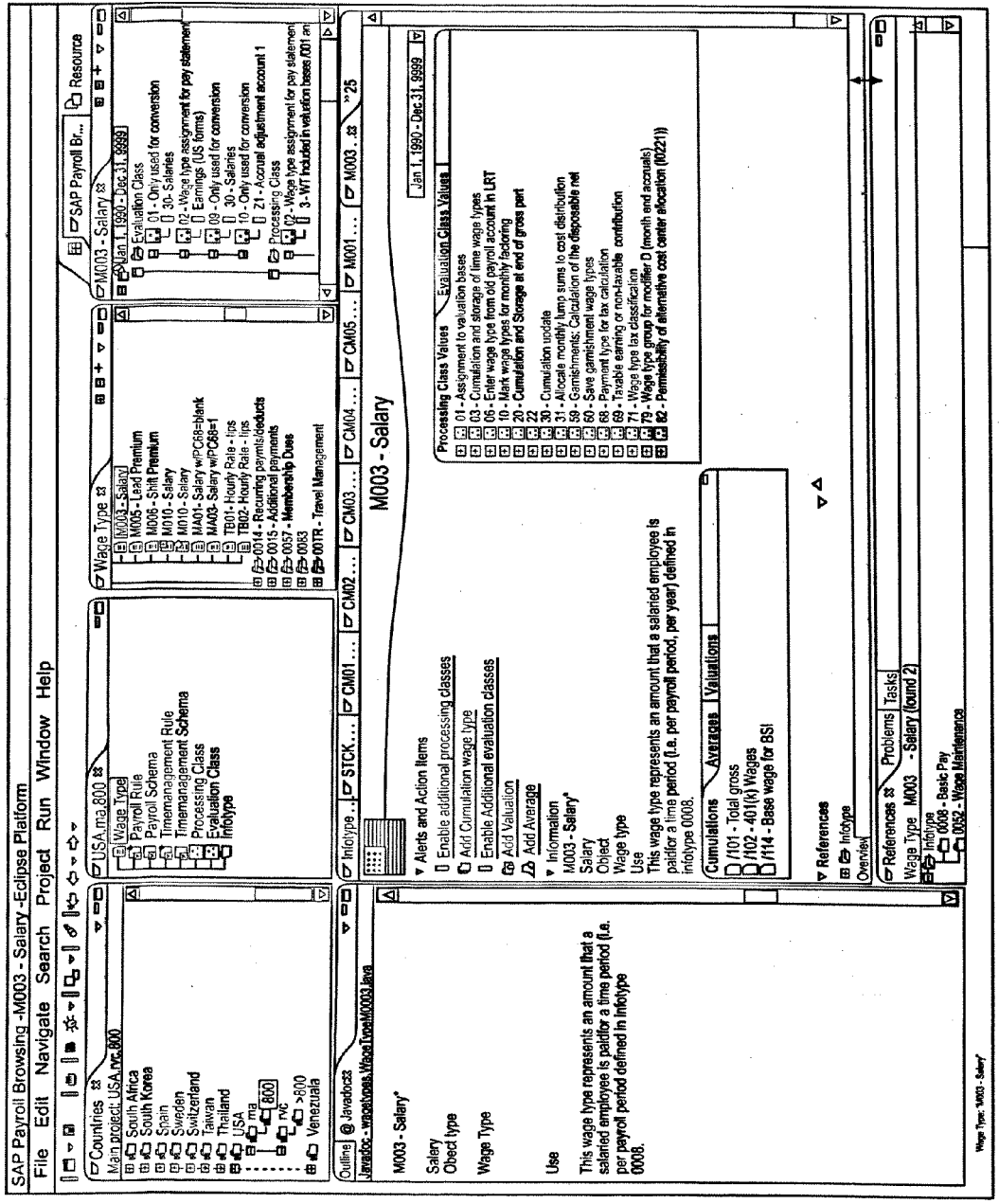

Consistent with methods and systems of the invention, a user interface shown in FIG. 53 may depict a wage type of a project. For example, the wage type "M003—Salary" may be displayed to the user. The references at the bottom of the interface may show others schemas that use this particular wage type within the same project.

Figure 54:
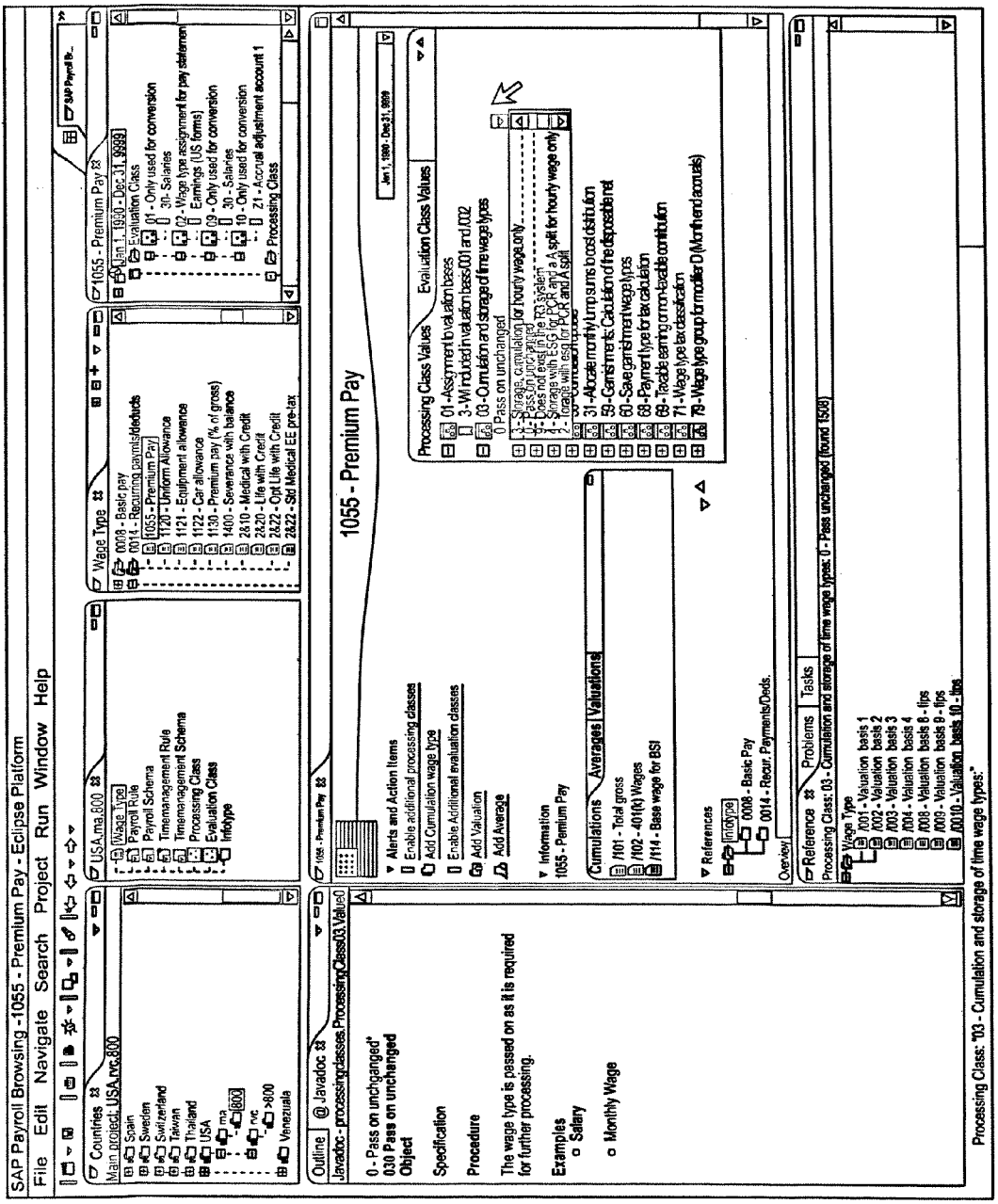

Consistent with methods and systems of the invention, a user interface shown in FIG. 54 may depict another example of a wage type of a project. For example, the wage type "1055—Premium Pay" may be displayed to the user. The references at the bottom of the interface may show other schemas that use this particular wage type.

Figure 55:
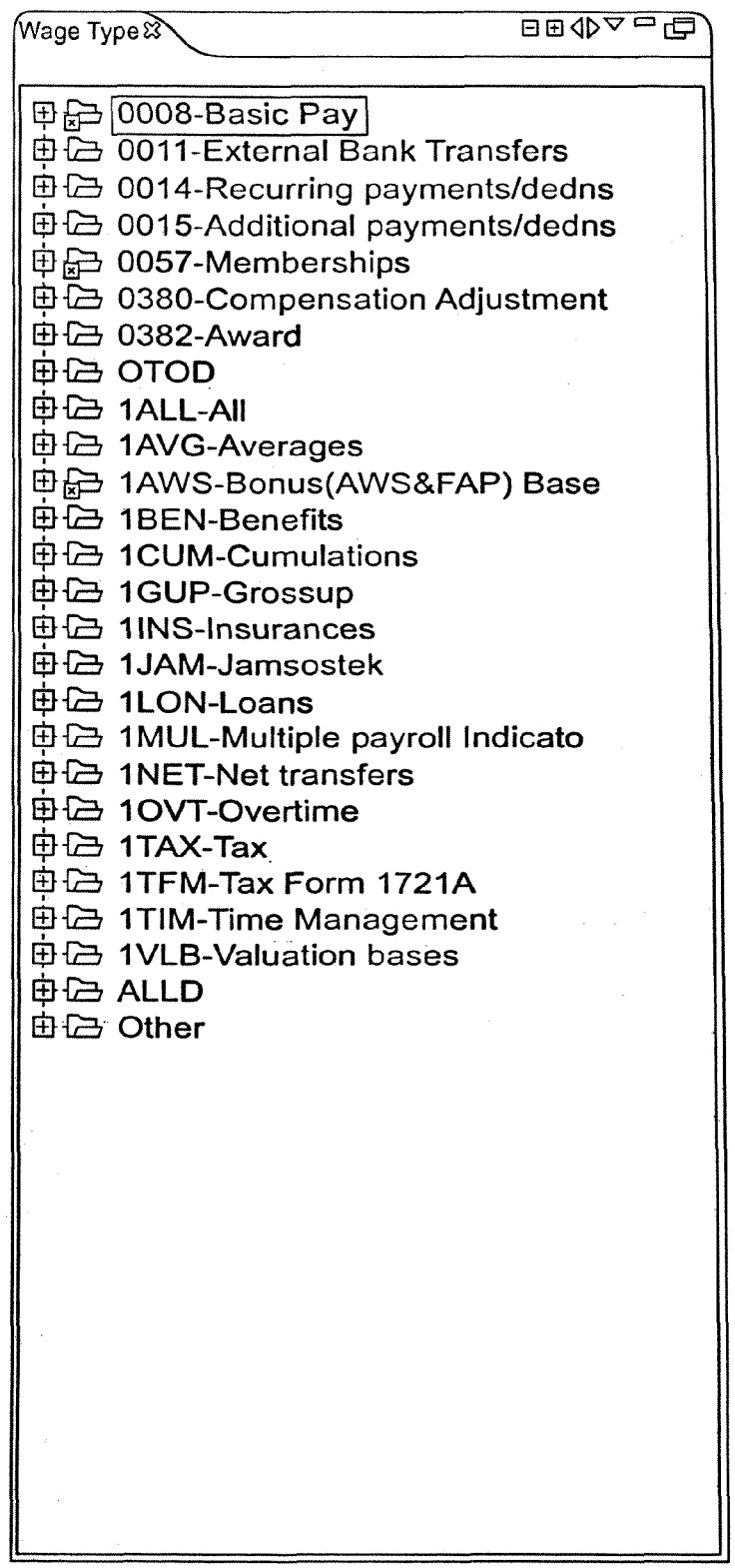
Figure 56:
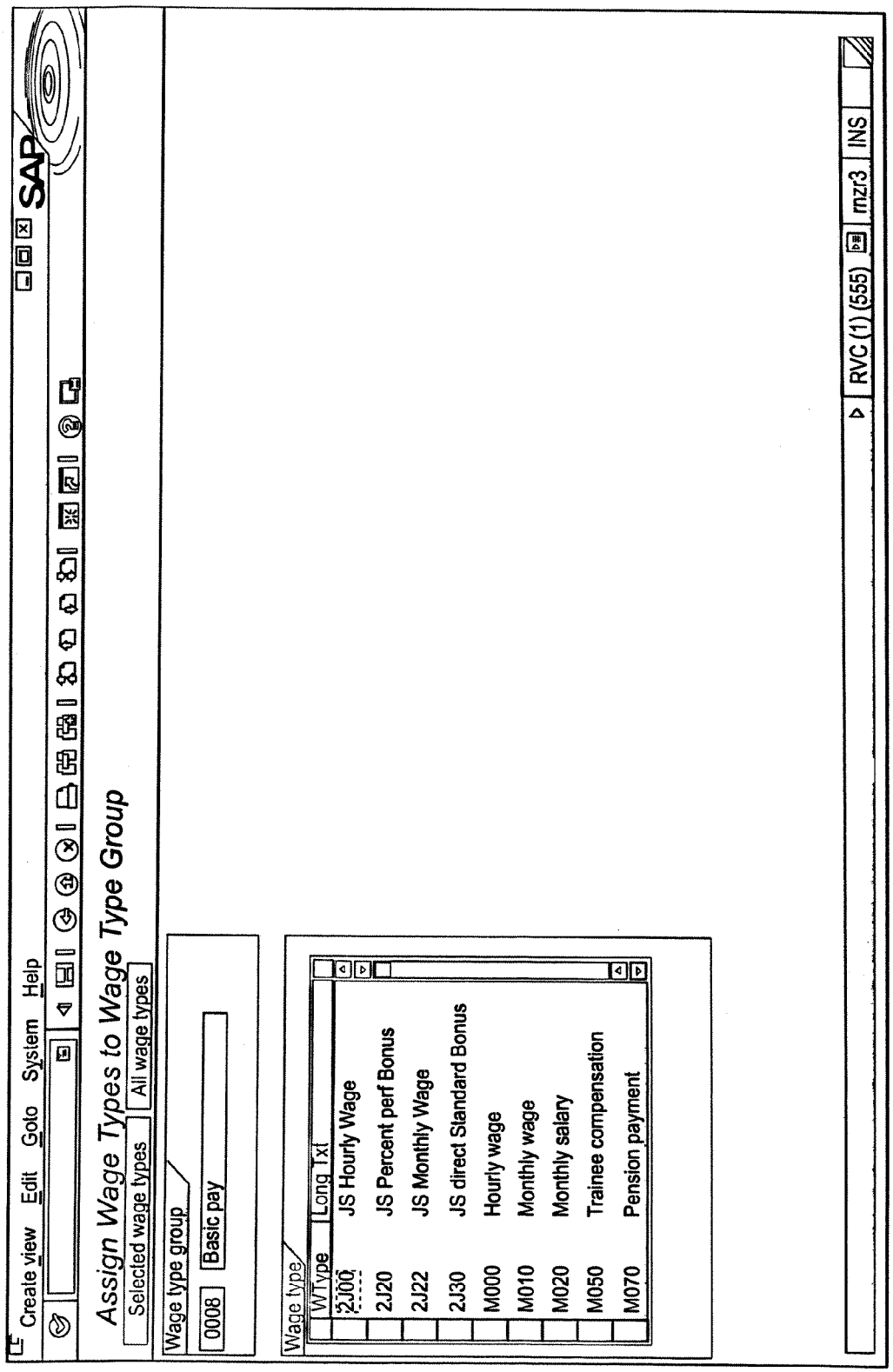

Consistent with methods and systems of the invention, a user interface shown in FIG. 55 may show an object-oriented version of the R/3 data structure "Wage type group" as shown in FIG. 56. Each wage type group may have one or more wage types associated with it. For example, the wage type group "0008 Basic Pay" may be associated with the wave types "SJ00 JS Hourly Wage, "2J20 JS Perfect perf bonus," etc.

Conclusion

Accordingly, as disclosed, systems and methods are provided for analyzing a business application's data, operations, and relationships and creating a corresponding object oriented programming (OOP) object model, comprising OOP objects, functions, and operators corresponding to the business application entities, and various uses involving the OOP model for improving the business application. The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method for modeling data structures from a business application in an object-oriented programming language, comprising:
    identifying a plurality of table-based data structures for the business application;
    identifying a plurality of attributes common to the plurality of table-based data structures;
    defining an object-oriented programming language superclass to model the plurality of table-based data structures, wherein the superclass includes a plurality of variables corresponding to the plurality of attributes common to the plurality of table-based data structures;
    defining an object-oriented programming language subclass to model a table-based data structure from the plurality of table-based data structures in the business application, wherein the subclass includes a variable corresponding to an attribute not common to the plurality of table-based data structures;
    instantiating an object from the subclass, wherein the object represents the table-based data structure;
    manipulating the object using an object-oriented programming tool;
    converting, using a processor, the manipulated object into a manipulated table-based data structure usable by the business application; and
    loading the manipulated table-based data structure into the business application to affect an operation of the business application.

2. The method of claim 1, further comprising:
    displaying the object using the object-oriented programming tool.

3. The method of claim 1, further comprising:
    detecting a problem associated with the object using the object-oriented programming tool, wherein the problem corresponds to a problem in the table-based data structure.

* * * * *